(12) United States Patent
Jennings et al.

(10) Patent No.: US 12,265,243 B2
(45) Date of Patent: Apr. 1, 2025

(54) CURVED REFLECTIVE POLARIZER

(71) Applicant: 3M INNOVATIVE PROPERTIES COMPANY, St. Paul, MN (US)

(72) Inventors: Robert M. Jennings, Shoreview, MN (US); Gregg A. Ambur, River Falls, WI (US); Jo A. Etter, Kirkland, WA (US); Benjamin G. Sonnek, Mahtomedi, MN (US); Zhisheng Yun, Sammamish, WA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 141 days.

(21) Appl. No.: 18/060,033

(22) Filed: Nov. 30, 2022

(65) Prior Publication Data

US 2023/0089314 A1 Mar. 23, 2023

Related U.S. Application Data

(63) Continuation of application No. 16/652,626, filed as application No. PCT/IB2018/057569 on Sep. 28, 2018, now Pat. No. 11,543,572.

(Continued)

(51) Int. Cl.
*G02B 5/30* (2006.01)
*B32B 7/035* (2019.01)
(Continued)

(52) U.S. Cl.
CPC .............. *G02B 5/305* (2013.01); *B32B 7/035* (2019.01); *G02B 5/3041* (2013.01);
(Continued)

(58) Field of Classification Search
None
See application file for complete search history.

(56) References Cited

U.S. PATENT DOCUMENTS

| 5,882,774 A | 3/1999 | Jonza |
|---|---|---|
| 6,609,795 B2 | 8/2003 | Weber |

(Continued)

FOREIGN PATENT DOCUMENTS

| JP | 2003075643 A | 3/2003 |
|---|---|---|
| JP | 2005031614 | 2/2005 |

(Continued)

OTHER PUBLICATIONS

Adkins, "Large Elastic Deformations of Isotropic Materials, III. Some Simple Problems in Cylindrical Polar Co-ordinates", Philosophical Transactions of the Royal Society A, Feb. 1948, vol. 240, No. 823, pp. 509-525.

(Continued)

*Primary Examiner* — Richard H Kim
(74) *Attorney, Agent, or Firm* — Clifton F. Richardson

(57) ABSTRACT

A curved reflective has at least one location having a radius of curvature in a range from about 6 mm to about 1000 mm. Each location on the reflective polarizer has a maximum reflectance greater than about 70% for a block polarization state, a maximum transmittance greater than about 70% for an orthogonal pass polarization state, and a minimum transmittance for the block polarization state. For a continuous first portion of the reflective polarizer extending between different first and second edges of the reflective polarizer and defining disjoint second and third portions of the reflective polarizer, the minimum transmittance of the reflective polarizer for the block polarization state is higher at each location in at least 70% of the first portion than at each location in at least 70% of the second portion and at each location in at least 70% of the third portion.

6 Claims, 45 Drawing Sheets

Related U.S. Application Data

(60) Provisional application No. 62/577,474, filed on Oct. 26, 2017, provisional application No. 62/570,428, filed on Oct. 10, 2017.

(51) Int. Cl.
| | | |
|---|---|---|
| *G02B 6/27* | (2006.01) | |
| *G02B 6/293* | (2006.01) | |
| *G02B 17/08* | (2006.01) | |
| *G02B 27/01* | (2006.01) | |
| *G02B 27/14* | (2006.01) | |

(52) U.S. Cl.
CPC ....... *G02B 6/2713* (2013.01); *G02B 6/29361* (2013.01); *G02B 27/14* (2013.01); *G02B 27/141* (2013.01); *G02B 27/142* (2013.01); *G02B 17/0856* (2013.01); *G02B 2027/013* (2013.01)

(56) References Cited

U.S. PATENT DOCUMENTS

| | | | |
|---|---|---|---|
| 6,788,463 | B2 | 9/2004 | Merrill |
| 6,916,440 | B2 | 7/2005 | Jackson |
| 6,991,695 | B2 | 1/2006 | Tait |
| 8,917,448 | B2 | 12/2014 | Weber et al. |
| 9,555,589 | B1 | 1/2017 | Ambur |
| 9,557,568 | B1 | 1/2017 | Ouderkirk |
| 10,429,558 | B2 | 10/2019 | Nevitt et al. |
| 2002/0180916 | A1 | 12/2002 | Schadt |
| 2003/0028048 | A1 | 2/2003 | Cherkaoui |
| 2005/0072959 | A1 | 4/2005 | Moia |
| 2006/0226583 | A1 | 10/2006 | Marushin et al. |
| 2010/0254002 | A1 | 10/2010 | Merrill |
| 2013/0063818 | A1 | 3/2013 | Weber et al. |
| 2013/0301129 | A1 | 11/2013 | In et al. |
| 2017/0017117 | A1 | 1/2017 | Shimizu et al. |
| 2017/0068100 | A1 | 3/2017 | Ouderkirk |

FOREIGN PATENT DOCUMENTS

| | | |
|---|---|---|
| JP | 2012215866 | 11/2012 |
| WO | 9936257 A1 | 7/1999 |
| WO | WO 2000-07044 | 2/2000 |
| WO | 2007050433 A1 | 5/2007 |
| WO | WO 2017-039714 | 3/2017 |
| WO | WO 2017-040875 | 3/2017 |
| WO | 2017058562 A1 | 4/2017 |
| WO | WO 2017-213912 | 12/2017 |
| WO | WO 2017-213913 | 12/2017 |
| WO | WO 2018-163009 | 9/2018 |
| WO | WO 2019-073330 | 4/2019 |
| WO | WO 2019-159139 | 8/2019 |

OTHER PUBLICATIONS

Adkins, "Large Elastic Deformations of Isotropic Materials, IX. The Deformation of Thin Shells", Philosophical Transactions of the Royal Society A, May 1952, vol. 244, No. 888, pp. 505-531.

Azzam, R.M.A. and Bashara, N.M., "Ellipsometry and Polarized Light", Reflection and Transmission of Polarized Light by Stratified Planar Structures, North-Holland, Amsterdam (1987), pp. 269-277.

Love, A.E.H.: "A Treatise on the Mathematical Theory of Elasticity", 4th edition, Chapter XXIV, Dover Publications Inc, NY (1927), pp. 515-519.

Roe, "Orientation and Distribution Function of Statistical Segments in Deformed Polymer Networks", Journal of Applied Physics, 1964, vol. 35, No. 7, pp. 2215-2219.

International Search Report for PCT International Application No. PCT/IB2018/057569, mailed on Mar. 19, 2019, 12 pages.

CURVED REFLECTIVE POLARIZER

BACKGROUND

Optical films, such as reflective polarizer films, are used in a variety of optical systems. In some cases, the optical film may be curved.

SUMMARY

In some aspects of the present description, a method of shaping an optical film including a plurality of alternating polymeric layers is provided. The method includes the steps of: securing at least portions of a perimeter of the optical film in a first plane so that the secured portions do not move relative to one another; and stretching the optical film by displacing a portion of the optical film along at least a first direction perpendicular to the first plane such that one of a radial and circumferential stretching of the optical film is substantially constant from a center to the perimeter of the optical film, and the other one of the radial and circumferential stretching of the optical film substantially changes from the center to the perimeter of the optical film.

In some aspects of the present description, a method of shaping an optical film comprising a plurality of alternating polymeric layers is provided. The method comprising the steps of: disposing the optical film such that at least a first portion of the optical film is disposed substantially in a first plane adjacent a curved mold surface; and stretching the optical film to conform the first portion of the optical film to at least a portion of the curved mold surface such that each point in the first portion has a location on the curved surface that is within a cone having an apex at a location of the point in the first plane prior to the stretching step, where the cone is centered along an axis perpendicular to the first plane and having a cone angle of no more than 10 degrees.

In some aspects of the present description, the optical film shaped by a method of the present description is a reflective polarizer. In some aspects of the present description, a shaped reflective polarizer resulting from a method described herein of shaping an optical film is provided.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For normally incident light having a predetermined wavelength, each location on the reflective polarizer has a maximum reflectance greater than about 70% for a block polarization state and a maximum transmittance greater than about 70% for an orthogonal pass polarization state. A thickness of the reflective polarizer is at least 5% larger at a center of the reflective polarizer than at at least one edge location. The thickness of the reflective polarizer substantially monotonically decreases from the center of the reflective polarizer to the at least one edge location.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For normally incident light having a predetermined wavelength, each location on the reflective polarizer has a maximum reflectance greater than about 70% for a block polarization state and a maximum transmittance greater than about 70% for an orthogonal pass polarization state. A thickness of the reflective polarizer is at least 5% smaller at a center of the reflective polarizer than at at least one edge location. The thickness of the reflective polarizer substantially monotonically increases from the center of the reflective polarizer to the at least one edge location.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For normally incident light having a predetermined wavelength in a first reflection band, each location on the reflective polarizer has a maximum reflectance greater than about 70% and a corresponding minimum transmittance less than about 5% for a block polarization state, and a maximum transmittance greater than about 70% for an orthogonal pass polarization state. The first reflection band has a long wavelength band edge that is at least 5% larger at a center of the reflective polarizer than at at least one edge location. The long wavelength band edge of the reflective polarizer substantially monotonically decreases from the center of the reflective polarizer to the at least one edge location.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For normally incident light having a predetermined wavelength in a first reflection band, each location on the reflective polarizer has a maximum reflectance greater than about 70% and a corresponding minimum transmittance less than about 5% for a block polarization state, and a maximum transmittance greater than about 70% for an orthogonal pass polarization state. The first reflection band has a long wavelength band edge that is at least 5% smaller at a center of the reflective polarizer than at at least one edge location. The long wavelength band edge of the reflective polarizer substantially monotonically increases from the center of the reflective polarizer to the at least one edge location.

In some aspects of the present description, a curved reflective polarizer is provided. The reflective polarizer includes a plurality of alternating polymeric interference layers. Each polymeric interference layer reflects or transmits light primarily by optical interference. At least one location on the curved reflective polarizer has a radius of curvature in a range from about 6 mm to about 1000 mm. For light having a predetermined wavelength and incident on the reflective polarizer along a direction parallel to an axis normal to and passing through the reflective polarizer at a center location, each location on the reflective polarizer has a maximum reflectance greater than about 70% for a block polarization state, a maximum transmittance greater than about 70% for an orthogonal pass polarization state, and a minimum transmittance for the block polarization state, such that for orthogonal first and second axes intersecting each other at a center location of the reflective polarizer and orthogonal third and fourth axes intersecting each other at the center location of the reflective polarizer, an angle between the first and third axes being about 45 degrees, the minimum transmittance of the reflective polarizer for the block polarization state: at a first location along the first axis between the center location and a first edge of the reflective polarizer is T1; at a second location along the second axis between the center location and a second edge of the reflective polarizer is T2; at a third location along the third axis between the center location and a third edge of the reflective polarizer is T3; and at a fourth location along the fourth axis between the center location and a fourth edge of the reflective polarizer is T4. A maximum of T1 and T2 is less than a minimum of T3 and T4.

In some aspects of the present description, a curved reflective polarizer is provided. The reflective polarizer includes a plurality of alternating polymeric interference layers. Each polymeric interference layer reflects or transmits light primarily by optical interference. At least one location on the curved reflective polarizer has a radius of curvature in a range from about 6 mm to about 1000 mm. For light having a predetermined wavelength and incident on the reflective polarizer along a direction parallel to an axis normal to and passing through the reflective polarizer at a center location, each location on the reflective polarizer has a maximum reflectance greater than about 70% for a block polarization state, a maximum transmittance greater than about 70% for an orthogonal pass polarization state, and a minimum transmittance for the block polarization state. For a continuous first portion of the reflective polarizer extending between different first and second edges of the reflective polarizer, having a minimum width of at least 3% of a largest lateral dimension of the reflective polarizer, and defining disjoint second and third portions of the reflective polarizer, the minimum transmittance of the reflective polarizer for the block polarization state is higher at each location in at least 70% of the first portion than at each location in at least 70% of the second portion and at each location in at least 70% of the third portion.

In some aspects of the present description, a curved reflective polarizer including a plurality of polymeric layers is provided. At least one location on the curved reflective polarizer has a radius of curvature in a range from about 6 mm to about 1000 mm. For light having a predetermined wavelength and incident on the reflective polarizer along a direction parallel to an optical axis normal to and passing through the reflective polarizer at a center location, each location on the reflective polarizer has a maximum reflectance greater than about 0.7 for a block polarization state, a maximum transmittance greater than about 0.7 for an orthogonal pass polarization state, and a minimum transmittance for the block polarization state. A region of the reflective polarizer within a radius R from the optical axis has a maximum variation of the minimum transmittance of the block polarization state that is in a range of about 0.001 to about 0.005. The reflective polarizer has a maximum radius Rm from the optical axis and R is in a range of 0.4 to 0.7 times Rm.

In some aspects of the present description, a curved reflective polarizer including a plurality of polymeric layers is provided. At least one location on the curved reflective polarizer has a radius of curvature in a range from about 6 mm to about 1000 mm. For light having a predetermined wavelength and incident on the reflective polarizer along a direction parallel to an axis normal to and passing through the reflective polarizer at a center location, each location on the reflective polarizer has a maximum reflectance greater than about 0.7 for a block polarization state, and a maximum transmittance greater than about 0.7 for an orthogonal pass polarization state. The maximum transmittances for the pass polarization state of at least one first and second locations are different from one another by at least 3.8%, where the at least one first and second locations are near an edge of the reflective polarizer and subtend an angle in a range from about 70 degrees to about 110 degrees at the center location.

In some aspects of the present description, a curved reflective polarizer including a plurality of polymeric layers is provided. At least one location on the curved reflective polarizer has a radius of curvature in a range from about 6 mm to about 1000 mm. For light having a predetermined wavelength and incident on the reflective polarizer along a direction parallel to an axis normal to and passing through the reflective polarizer at a center location, each location on the reflective polarizer has a maximum reflectance greater than about 0.7 for a block polarization state, and a maximum transmittance greater than about 0.7 for an orthogonal pass polarization state. The maximum transmittances for the pass polarization state of at least one first and second locations, where the at least one first location near the center location and the at least one second location near an edge of the reflective polarizer, are different from one another by at least 3.8%.

In some aspects of the present description, a curved reflective polarizer including a plurality of polymeric layers is provided. At least one location on the curved reflective polarizer has a radius of curvature in a range from about 6 mm to about 1000 mm. For light having a predetermined wavelength and incident on the reflective polarizer along a direction parallel to an axis normal to and passing through the reflective polarizer at a center location, each location on the reflective polarizer has a maximum reflectance greater than about 70% for a block polarization state, and a maximum transmittance greater than about 70% for an orthogonal pass polarization state. In plan view, the maximum transmittance for the pass polarization state at each of at least 70% of locations in a substantially rectangular region substantially centered on the center is within 1.5% of the maximum transmittance for the pass polarization state at the center of the reflective polarizer and the maximum transmittance for the pass polarization state for at least a majority of locations of the reflective polarizer outside the substantially rectangular region is at least 1.5% lower than the maximum transmittance for the pass polarization state at the center of the reflective polarizer.

In some aspects of the present description, a curved reflective polarizer including a plurality of alternating polymeric interference layers is provided. Each polymeric interference layer reflects or transmits light primarily by optical interference. At least one location on the curved reflective polarizer having a radius of curvature in a range from about 6 mm to about 1000 mm. For light having a predetermined wavelength, each location on the reflective polarizer has a maximum reflectance greater than about 70% for a block polarization state, a maximum transmittance greater than about 70% for an orthogonal pass polarization state, and a minimum transmittance for the block polarization state. For orthogonal first and second axes intersecting each other at a center location of the reflective polarizer, the maximum transmittance of the reflective polarizer for the pass polarization state: at the center location is Tc; at a first edge location along the first axis near a first edge of the reflective polarizer is T1; at a second edge location along the first axis near a second edge, opposite the first edge, of the reflective polarizer is T2; at a third edge location along the second axis near a third edge of the reflective polarizer is T3; and at a fourth edge location along the second axis near a fourth edge, opposite the third edge, of the reflective polarizer is T4. Tc is greater than a maximum of T1 and T2, and less than a minimum of T3 and T4.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For light having a predetermined wavelength and incident on the reflective polarizer along a direction parallel to an axis normal to and passing through the reflective polarizer at a center location, each location on the reflective polarizer has a maximum reflectance greater than about 70% and a corresponding minimum transmittance less than about 5% for a block polarization state. In a projection onto a plane tangent to the reflective polarizer at a center of the reflective polarizer, a block polarization state of at least one first edge location is rotated clockwise from an a block polarization state at the center of the reflective polarizer and a block polarization state of at least one second edge location is rotated counterclockwise from the block polarization state at the center of the reflective polarizer, where the at least one first and second edge locations subtend an angle in a range from about 70 degrees to about 110 degrees at the center of the reflective polarizer.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For light having a predetermined wavelength and incident on the reflective polarizer along a direction parallel to an axis normal to and passing through the reflective polarizer at a center of the reflective polarizer, each location on the reflective polarizer has a maximum reflectance greater than about 70% and a corresponding minimum transmittance less than about 5% for a block polarization state. In a projection onto a plane tangent to the reflective polarizer at the center of the reflective polarizer, a block polarization state of at least one first and second edge locations are rotated relative to each other by greater than 2 degrees, the at least one first and second edge locations subtending an angle in a range from about 70 degrees to about 110 degrees at the center of the reflective polarizer.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For light having a predetermined wavelength and incident on the reflective polarizer along a direction parallel to an optical axis normal to and passing through the reflective polarizer at a center of the reflective polarizer, each location on the reflective polarizer has a maximum reflectance greater than about 70% and a corresponding minimum transmittance less than about 5% for a block polarization state, such that a region of the reflective polarizer within a radius R from the optical axis has a maximum variation of the block polarization state in a projection onto a plane tangent to the reflective polarizer at the center of the reflective polarizer that is: less than about 1 degree for R less than R1; and greater than about 2 degrees for R greater than R2. The reflective polarizer has a maximum radius Rm from the optical axis. R1 is at least 0.4 Rm, and R2 is greater than R1 and no more than 0.95 Rm.

In some aspects of the present description, a curved reflective polarizer comprising a plurality of alternating polymeric interference layers is provided. Each polymeric interference layer reflects or transmits light primarily by optical interference. At least one location on the curved reflective polarizer has a radius of curvature in a range from about 6 mm to about 1000 mm. For light having a predetermined wavelength and incident on the reflective polarizer along a direction parallel to an optical axis normal to and passing through the reflective polarizer at a center of the reflective polarizer, each location on the reflective polarizer has a maximum reflectance greater than about 70% for a block polarization state, a maximum transmittance greater than about 70% for an orthogonal pass polarization state, and a circular diattenuation. For orthogonal first and second axes intersecting each other at a center location of the reflective polarizer, the circular diattenuation of the reflective polarizer: at the center location is CDc; at a first edge location along the first axis near a first edge of the reflective polarizer is CD1; at a second edge location along the first axis near a second edge, opposite the first edge, of the reflective polarizer is CD2; at a third edge location along the second axis near a third edge of the reflective polarizer is CD3; and at a fourth edge location along the second axis near a fourth edge, opposite the third edge, of the reflective polarizer is CD4. CDc is less than a minimum of CD3 and CD4, and greater than a maximum of CD1 and CD1.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For light having a predetermined wavelength and incident on the reflective polarizer along a direction parallel to an optical axis normal to and passing through the reflective polarizer at a center of the reflective polarizer, each location on the reflective polarizer has a maximum reflectance greater than about 70% and a corresponding minimum transmittance less than about 5% for a block polarization state. A region of the reflective polarizer having an area less than or equal to a total area of the reflective polarizer has a maximum variation of a circular diattenuation that is at least 0.04.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For light having a predetermined wavelength and incident on the reflective polarizer along a direction parallel to an optical axis normal to and passing through the reflective polarizer at a center of the reflective polarizer, each location on the reflective polarizer has a maximum reflectance greater than about 70% and a corresponding minimum transmittance less than about 5% for a block polarization state, such that a region of the reflective polarizer having an area of greater than half of a total area of the reflective polarizer has a maximum variation of a circular diattenuation that is no more than 0.015.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For light having a predetermined wavelength and incident on the reflective polarizer along a direction parallel to an optical axis normal to and passing through the reflective polarizer at a center of the reflective polarizer, each location on the reflective polarizer has a maximum reflectance greater than about 70% and a corresponding minimum transmittance less than about 5% for a block polarization state, such that a region of the reflective polarizer having an area of greater than half of a total area of the reflective polarizer has a maximum absolute value of a circular diattenuation that is no more than 0.007.

In some aspects of the present description, a curved reflective polarizer is provided. The reflective polarizer includes a plurality of polymeric layers stretched and shaped along at least orthogonal first and second directions so that at least one location on the curved reflective polarizer has a radius of curvature in a range from about 6 mm to about 1000 mm along each of the first and second directions. For light having a predetermined wavelength and incident on the reflective polarizer along a direction parallel to an optical axis normal to and passing through the reflective polarizer at a center of the reflective polarizer, each location on the reflective polarizer has a maximum reflectance greater than about 70% and a corresponding minimum transmittance less than about 5% for a block polarization state, such that a region of the reflective polarizer within a radius R from the optical axis has a maximum variation of the block polarization state in a projection onto a plane tangent to the reflective polarizer at the center of the reflective polarizer that is less than about 1 degree for R less than 0.8 Rm.

BRIEF DESCRIPTION OF THE DRAWINGS

FIGS. 48A-49B are plots of the circular diattenuation of reflective polarizer samples shaped in a pressurization process;

FIG. 49B is a plot of the maximum variation in a region having a radius R of the circular diattenuation of reflective polarizer samples;

DETAILED DESCRIPTION

Figure 1:
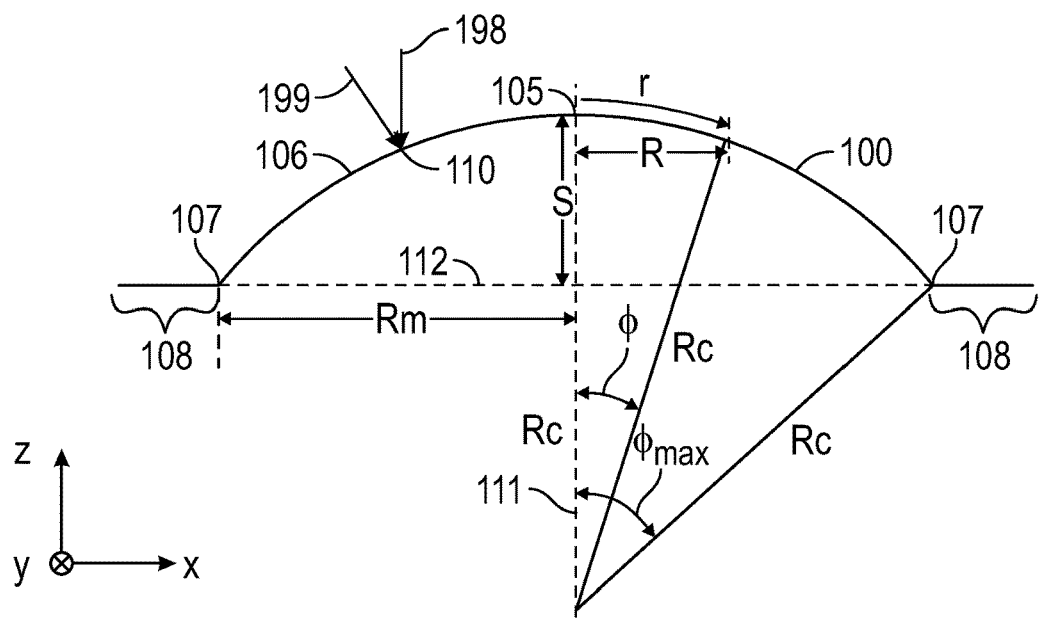
FIG. 1 is a schematic cross-sectional view of an optical film.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Thermoforming an optical film by stretching the film onto a mold surface is known. According to some aspects of the present description, it has been found that providing certain constraints on the stretching of the optical film can result in desired optical properties of the film. According to some embodiments, methods of shaping an optical film are provided where one, but not the other, of a radial and circumferential stretching of the optical film is substantially constant as the film is stretched into a useful shape. In some embodiments, the optical film is a reflective polarizer. In other embodiments, the optical film may be a mirror film, for example. It has been found that when a reflective polarizer is stretched such that the radial stretching is substantially constant, various properties of the resulting shaped and curved reflective polarizer, which are described further elsewhere herein, are desirable for some applications; and when a reflective polarizer is stretched such that the circumferential stretching is substantially constant, various properties of the resulting shaped and curved reflective polarizer, which are described further elsewhere herein, are desirable for some applications. Some of the properties resulting from keeping the radial stretching substantially constant may differ from the properties resulting from keeping the circumferential stretching constant, while other properties may be similar.

Substantially constant stretching from a center to a perimeter of an optical film can be understood to mean that a maximum strain from the center to the perimeter is less than 5% greater than a minimum strain from the center to the perimeter. Substantially changing stretching from a center to a perimeter of an optical film can be understood to mean that a maximum strain from the center to the perimeter is at least 5% greater than a minimum strain from the center to the perimeter. In some embodiments, a stretching of the optical film that is substantially constant from a center to a perimeter of the optical film, has a variation in stretching less than 5 percent, or less than 4 percent, or less than 3 percent, or less than 2 percent or less than 1 percent from the center to the perimeter. In some embodiments, a stretching of the optical film that substantially changes from a center to a perimeter of the optical film, has a variation in stretching of at least 5 percent, or at least 8 percent, or at least 10 percent, or at least 15 percent or at least 20 percent from the center to the perimeter.

The optical film (e.g., reflective polarizer) may be formed into a shape curved about two orthogonal axes and may have a curved shape of a lens surface, for example. After the optical film is shaped, an optical lens can be formed onto the optical film by insert molding, for example. The lens with the optical film can be used in an optical system utilizing a folded optical path such as those described, for example, in U.S. Pat. No. 9,557,568 (Ouderkirk et al.), which is hereby incorporated herein by reference to the extent that it does not contradict the present description. Such optical systems typically include a partial reflector adjacent to and spaced apart from a reflective polarizer and a retarder disposed between the partial reflector and reflective polarizer. A folded optical path is provided is such optical systems since a light ray can pass through the partial reflector, reflect from the reflective polarizer back toward the partial reflector, reflect from the partial reflector and then pass through the reflective polarizer. It is often desired that the reflective polarizer in such optical systems be curved about two orthogonal axes. The methods described herein can provide a reflective polarizer suitable for use in folded optical systems or in other optical systems where a curved reflective polarizer is desired (e.g., on a curved surface of a prism in a polarizing beam splitter). When a reflective polarizer is formed into a shaped curved about two orthogonal axes various optical properties (e.g., variation with position of one or more of the minimum transmittance of light having the block polarization state, the block axis, the linear diattenuation, the circular diattenuation, the thickness of the reflective polarizer, and a band edge) of the reflective polarizer are typically altered by the forming process. In some cases, some patterns of the altered optical properties are preferred over other patterns. Which pattern is preferred may depend on the design of the optical system. For example, a spatial variation in a property or properties of the reflective polarizer may compensate or partially compensate for spatial variations in properties of other optical elements in the optical system and the preferred spatial variation of the property or properties of the reflective polarizer may depend on the other optical elements in the optical system.

FIG. 1 is a schematic cross-sectional view of an optical film 100 which has been shaped. The optical film 100 has a center 105, a perimeter 107, and a boundary portion 108. The perimeter 107 is the perimeter of a portion 106 of the optical film 100 that may be, or that may include, an active portion of the optical film 100 when used in an optical system, for example. The boundary portion 108 is adjacent to the perimeter 107 and may be a portion of the optical film 100 which is clamped or otherwise secured when the optical film 100 is shaped. An axis 111 passing through the center 105 and a plane 112 perpendicular to the axis 111 are illustrated. The axis is normal to the optical film 100 at the center 105. The optical film 100 has a maximum lateral dimension of 2Rm and a maximum sag of S. The radial distance from the center 105 along the contour of the optical film 100 is r. The radial direction is along this radial distance. The circumferential direction is a direction along the contour of the optical film perpendicular to the radial direction. The circumferential direction in the illustrated cross-section is parallel to the y-axis referring to the x-y-z coordinate system of FIG. 1. Points on the optical film can be described using the radial arc length distance r, using the cylindrical coordinate radius R from the axis 111, or using the angle φ between the axis 111 and a line segment from a center of curvature of the optical film 100 to a point on the optical film 100. In the illustrated embodiment, the optical film 100 has a radius of curvature Rc. In some embodiments, the optical film 100 is aspherical and has a radius of curvature that varies with r or R. The angle φ has a maximum value $\phi_{max}$. In some embodiments, the optical film is used in an optical system and the axis 111 is an optical axis of the optical system. The angle 2 $\phi_{max}$ can be understood to be a field of view (FOV) of the optical film 100. In some embodiments, the boundary portion 108 of the optical film 100 is removed prior to using the optical film 100 in an optical system.

Properties of an optical film may be specified for light normally incident on the optical film or for light incident on the optical film along a direction parallel to an axis normal to and passing through the optical film at a center location. For example, properties of the optical film 100 at location 110 may be specified for a light 199 normal to the optical film 100 at location 110 and/or may be specified for a light 198 which is incident on the optical film 100 at location 110 along a direction parallel to axis 111. In some cases, properties of the reflective polarizer may be specified for normally incident light 199 and for light 198 incident on the optical film 100 along a direction parallel to axis 111. For example, the transmittance and reflectance for light polarized along block and pass axes may be specified for both light 199 and light 198. The reflectance and transmittance or other optical properties may be determined for light incident on the optical film 100 from either side of the optical film 100. In the illustrated embodiment, the optical film 100 is convex towards incident light 198 and incident light 199. If the direction of the incident light is not specified, it may be assumed that the light is normally incident on the film. Except where indicated differently, the transmittance and reflectance or other optical properties are determined for light incident on the reflective polarizer from the side of the reflective polarizer where the reflective polarizer is convex towards the incident light as illustrated in FIG. 1.

The center location of a curved optical film can be taken to be the point on the optical film at a greatest distance from a reference plane where the reference plane is a plane not intersecting the optical film and disposed so that at least a majority of the optical film is concave toward the reference plane, and the reference plane is such that the optical film has a maximum projected area in the reference plane.

Figure 2:
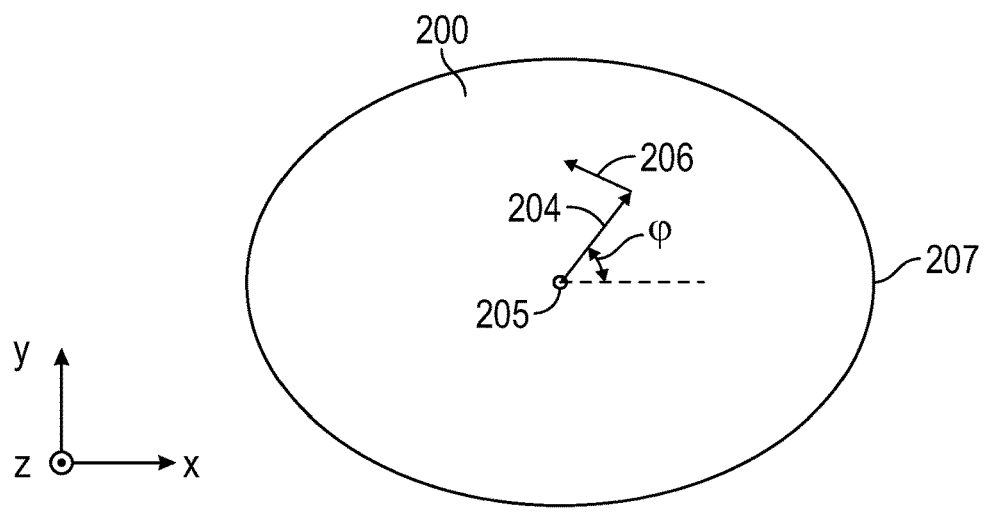
FIG. 2 is a schematic front view of an optical film.

FIG. 2 is a schematic front view of an optical film 200 which is curved about two mutually orthogonal axes (x- and y-axes). Optical film 200 has a center 205 and a perimeter 207. The radial direction 204 is from the center 205 generally toward the perimeter 207. The circumferential direction 206 is orthogonal to the radial direction 204. The center 205 of the optical film 200 may coincide with where an optical axis of the optical film 200 or the optical axis of an optical system including the optical film 200 intersects the optical film 200. An azimuthal angle φ is shown. In some cases, it is may be desired to characterize the optical film 200 in terms of azimuthally averaged quantities, such as an azimuthally averaged thickness or an azimuthally averaged band edge wavelength. An azimuthally averaged quantity is the unweighted average of the quantity over azimuthal angles for a fixed radius (distance from the center 205). The azimuthal range may depend on the radius. For example, for small radius in the illustrated embodiment, the azimuthal angle φ ranges from zero to 2π and an azimuthally averaged quantity can be expressed as the integral of that quantity over φ from 0 to 2π divided by 2π. For large radius, the azimuthal angle φ may only extend over some subset(s) of the range of 0 to 2π. For example, for radii near edges in the plus and minus x-directions in the illustrated embodiment, the range of the azimuthal angle φ is a relatively narrow range centered around 0 and π radians.

The stretching in the radial direction may be characterized by a radial stretch ratio $\lambda_r$ which is related to a radial strain $\varepsilon_r$ as $\lambda_r=1+\varepsilon_r$. Similarly, stretching in the circumferential direction may be characterized by a circumferential stretch ratio $\lambda_\theta$ which is related to a circumferential strain $\varepsilon_\theta$ as $\lambda_\theta=1+\varepsilon_\theta$. In some embodiments, an optical film prior to being shaped is disk shaped or has a disk-shaped portion which is shaped to conform to a portion of a spherical surface having a radius of curvature Rc. In the case of axisymmetric deformation, the radial stretch ratio $\lambda_r$ and the circumferential stretch ratio $\lambda_\theta$ are related by the following equation:

$$\lambda_r\left[Rc\frac{d\lambda_\theta}{dr}\sin\left(\frac{r}{Rc}\right)-\lambda_\theta\cos\left(\frac{r}{Rc}\right)\right]+\lambda_\theta^2=0 \qquad \text{(Equation 1)}$$

For a more general deformation, the stretch ratios $\lambda_r$ and $\lambda_\theta$ may not satisfy Equation 1. In conventional thermoforming methods, both $\lambda_r$ and $\lambda_\theta$ vary from the center 205 to the perimeter 207. According to some embodiments of the present description, it has been found that it is advantageous to utilize forming processes in which one, but not the other, of $\lambda_r$ and $\lambda_\theta$ is substantially constant during the forming process.

In some embodiments, the optical film 200 may not be rotationally symmetric about an axis through the center 205 that is normal to the optical film 200 at the center 205. In this case, one, but not the other, of $\lambda_r$ and $\lambda_\theta$ may be substantially constant along at least one direction from the center 205 to the perimeter 207. In some embodiments, one, but not the other, of $\lambda_r$ and $\lambda_\theta$ is substantially constant along each direction from the center 205 to the perimeter 207. This may be the case when the optical film 200 is rotationally symmetric about an axis through the center 205, for example.

In some embodiments, a mold is used in a method of shaping an optical film. In some embodiments, at least portions of a perimeter of the optical film is secured in a plane by securing at least portions of a boundary portion of the optical film between portions of a first mold and portions of a second mold. In some embodiments, the first mold has a curved mold surface and pressure (e.g., air pressure) is used to displace a portion of the optical film so that it conforms to the curved mold surface. Disposing the film in the appropriate position and/or securing portions of the optical film are typically preformed prior to stretching the optical film.

Figure 3A:
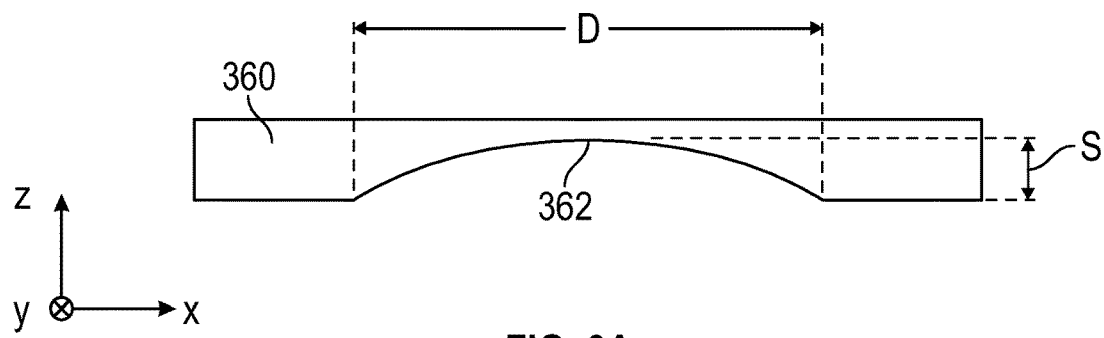
FIG. 3A is a schematic cross-sectional view of a first mold having a curved mold surface.

FIG. 3A is a schematic cross-sectional view of a first mold 360 having a curved mold surface 362. First mold 360 can be made via a machining operation (e.g., using diamond turning). The mold 360, and other molds described herein, maybe made of aluminum or an aluminum alloy, stainless steel, tool steel, or other suitable alloy, for example. In some embodiments, a mold is made from a porous material (e.g., porous aluminum) that includes open pore cells to allow air to flow through the mold (e.g., by applying a vacuum). The curved mold surface 362 has a maximum lateral dimension D, a maximum sag S, and a sag to diameter ratio of S/D. In some embodiments, S/D is at least 0.05, or at least 0.1, or at least 0.2, and may be less than 0.5, or less than 0.4. In some embodiments, the curved mold surface 362 has a best-fit spherical first radius of curvature Rs which, in some embodiments, is in a range from about 30 mm to about 1000 mm. In some embodiments, a ratio of the sag S to the best-fit spherical first radius of curvature Rs is in a range of about 0.02 to about 0.2, or in a range of about 0.02 to about 0.15, or in a range of about 0.02 to about 0.12, or in a range of about 0.03 to about 0.12, or in a range of about 0.04 to about 0.12. In some embodiment, the optical film 300 has a sag to radius ratio in any of these ranges after being formed into a curved shape.

Figure 3B:
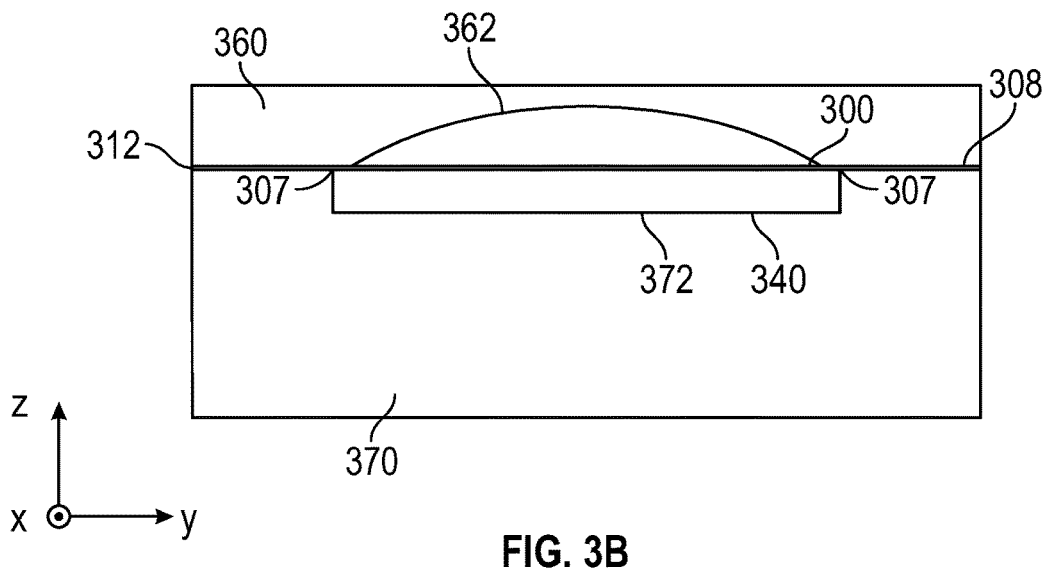
FIGS. 3B-3C are schematic cross-sectional views of an optical film disposed between the first mold of FIG. 3A and a second mold.
Figure 3C:
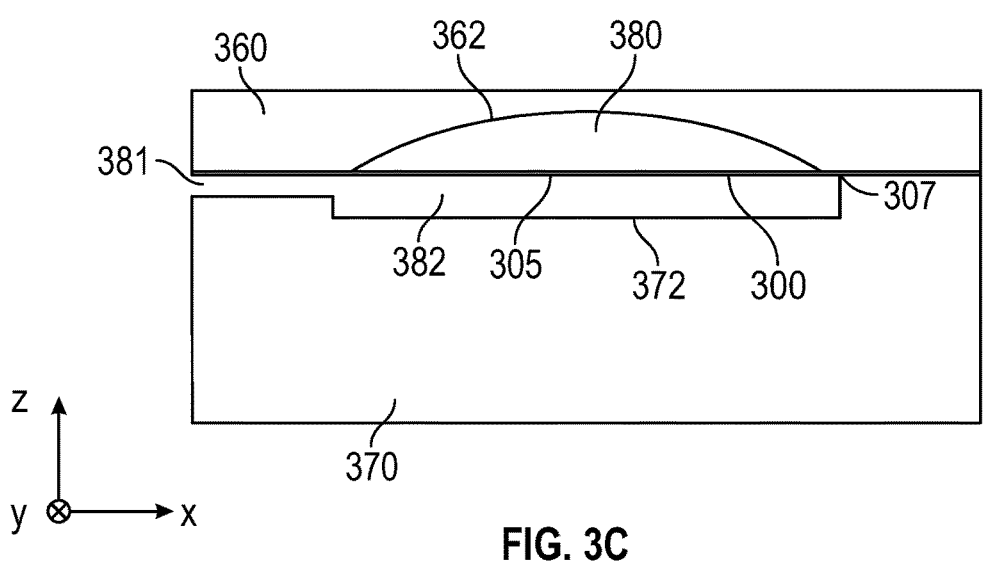

FIG. 3B is a schematic cross-sectional view of first mold 360 and second mold 370 having a mold surface 372 with an optical film 300 disposed between the first and second molds 360 and 370 with at least portions of a perimeter 307 of the optical film 300 secured in a first plane 312 so that the secured portions do no move relative to one another. In some embodiments, the secured portion is the entire perimeter 307. The perimeter 307 is secured due to boundary portions 308 of the optical film 300 being secured between portions of the first and second molds 360 and 370. In other embodiments, only portions of the perimeter 307 are secured. For example, the first and second mold 360 may include one or more channels where the perimeter 307 is not secured. This is illustrated in the cross-section of FIG. 3C, for example, where a channel 381 is shown and the portion of optical film 300 directly over the channel 381 is not secured between the first and second molds 360 and 370. In the illustrated embodiment, the boundary portion 308 is disposed in the first plane 312. In other embodiments, the perimeter 307 or at least a portion of the perimeter 307 is disposed in plane 312, but the boundary portions 308 are not disposed entirely in the first plane 312 due to a slope of the first and second molds 360 and 370 along the boundary portion 308, for example.

In some embodiments, the second mold 370 is heated, and pressure is applied in the space 380 between the first mold 360 and the optical film 300 to force the optical film 300 to contact the mold surface 372 of the second mold 370 thereby heating the optical film 300. Pressure (e.g., air pressure) can be applied through a channel (not illustrated) between the first mold 360 and the optical film 300. In other embodiments, the optical film 300 is preheated before being placed between the first and second molds 360 and 370 and/or the first mold 360 is heated and heats the optical film when the optical film is conformed to the curved mold surface 362.

In some embodiments, the optical film 300 is heated to a temperature greater than a glass transition temperature of the optical film 300 prior to stretching and forming the film. The glass transition temperature of the optical film 300 may refer the glass transition temperature of any layer of the optical film 300. For example, the glass transition temperature of the optical film 300 may be the highest glass transition temperature of any of the layers of the optical film 300, may be the lowest glass transition temperature of any of the layers of the optical film 300, may be the glass transition temperature of the birefringent interference layers of the optical film 300 when the optical film 300 includes alternating nonbirefringent and birefringent layers, or may be the glass transition temperature of the higher refractive index interference layers of the optical film 300 when the optical film 300 includes alternating higher and lower index interference layers.

Figure 3D:
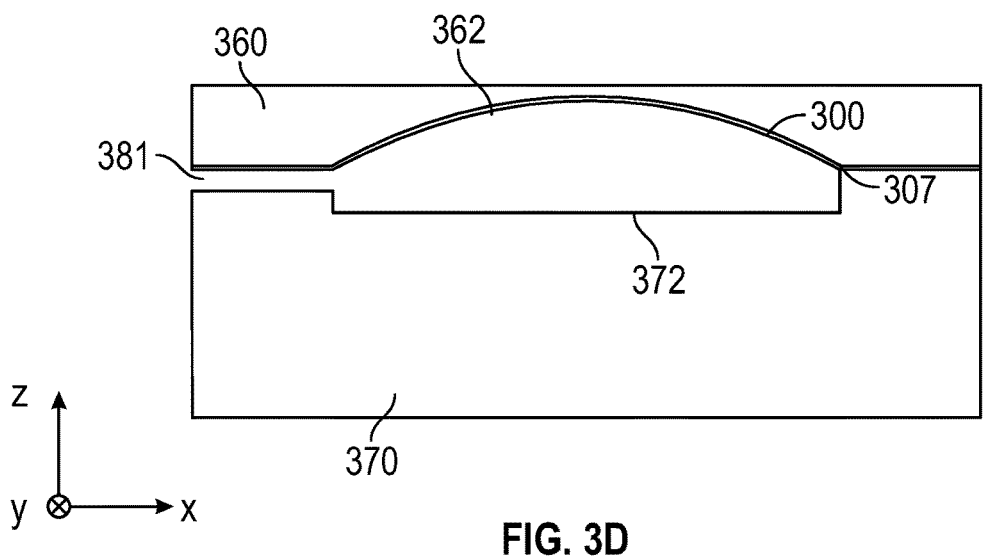
FIG. 3D is a schematic cross-sectional view showing a portion of the optical film of FIGS. 3B-3C conforming to the curved mold surface of the first mold.

In some embodiments, the optical film 300 is stretched by displacing a portion of the optical film 300 along at least a first direction (z-direction) perpendicular to the first plane 312 such that a radial stretching of the optical film is substantially constant from a center 305 to the perimeter 307 of the optical film 300, and the circumferential stretching of the optical film substantially changes from the center 305 to the perimeter 307 of the optical film 300. The portion of the optical film that is displaced relative to the perimeter 307 typically includes a portion near the center 305 of the optical film 300. In some embodiments, pressure is used to displace a portion of the optical film 300. In some embodiments, after heating the optical film 300, pressure (e.g., air pressure) is applied in the space 382 between optical film 300 and the second mold 370 through channel 381 to conform, or to at least partially conform, the optical film 300 to the curved mold surface 362 as illustrated in FIG. 3D. In some embodiments, the first mold 360 is porous. In some embodiments, a vacuum or partial vacuum is pulled through the first mold 360 to aid in conforming the optical film 300 to the curved mold surface 362. In this case, a vacuum or partial vacuum is pulled in the space 380 between the optical film 300 and the first mold 360.

Figure 3E:
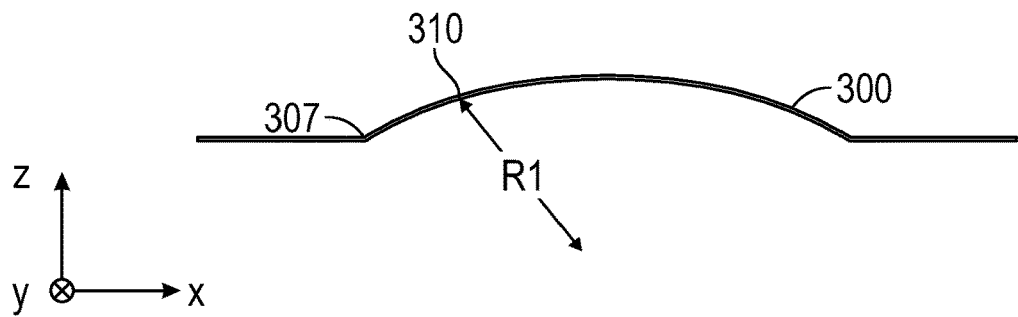
FIG. 3E is a schematic cross-section view of the formed optical film illustrated in FIG. 3D.

The optical film 300 is subsequently removed from the first and second molds 360 and 370. The resulting shaped optical film 300 is illustrated in FIG. 3E. In a subsequent processing step, a lens or other optical element may be injection molded onto the optical film 300. The boundary portions 308 of the optical film 300 can be removed prior to or after the injection molding step.

In some embodiments, at least one location 310 on the optical film 300 has a radius of curvature R1 along each of orthogonal first and second directions (e.g., x- and y-direction) in a range from about 6 mm to about 1000 mm, or in a range of about 12 mm to about 500 mm. In some embodiments, each location on the optical film 300 has a radius of curvature along each of orthogonal first and second directions (e.g., x- and y-direction) in a range from about 6 mm to about 1000 mm, or in a range of about 12 mm to about 500 mm. In some embodiments, the radii of curvature along the first and second directions differ but are each in the range from about 6 mm to about 1000 mm, or in a range of about 12 mm to about 500 mm. In some embodiments, the radii of curvature along the first and second directions are about equal.

Figure 3F:
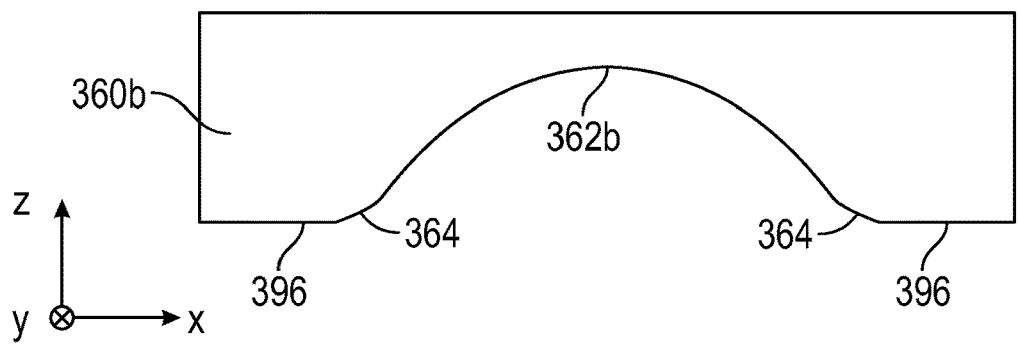
FIG. 3F is a schematic cross-sectional view of a first mold having a curved mold surface.

FIG. 3F is a schematic illustration of a mold 360b which corresponds to and can be used in place of first mold 360. Mold 360b has a curved mold surface 362b and at least one transition region 364. The at least one transition region 364 may be a single continuous region around an edge of the curved mold surface 362b, for example. The at least one transition region 364 typically has a curvature that smoothly varies from the curved mold surface 362b to the flat boundary portion 396. The at least one transition region 364 may be included to prevent or reduce stress concentration in the optical film. It has been found that this allows the optical film to be formed with reduced pressure compared to using a mold not including the at least one transition region 364. Mold 360b may be porous as described for first mold 360, for example.

In some embodiments, a mold is used in a method of shaping an optical film. In some embodiments, at least portions of a perimeter of the optical film is secured in a plane by clamping portions of the optical film so that the secured portions do not move relative to one another. In some embodiments, the mold has a curved mold surface and the mold and the optical film are moved relative to one another in order to displace a portion of the optical film relative to the secured portions of the perimeter so that the optical film conforms to the curved mold surface.

Figure 4A:
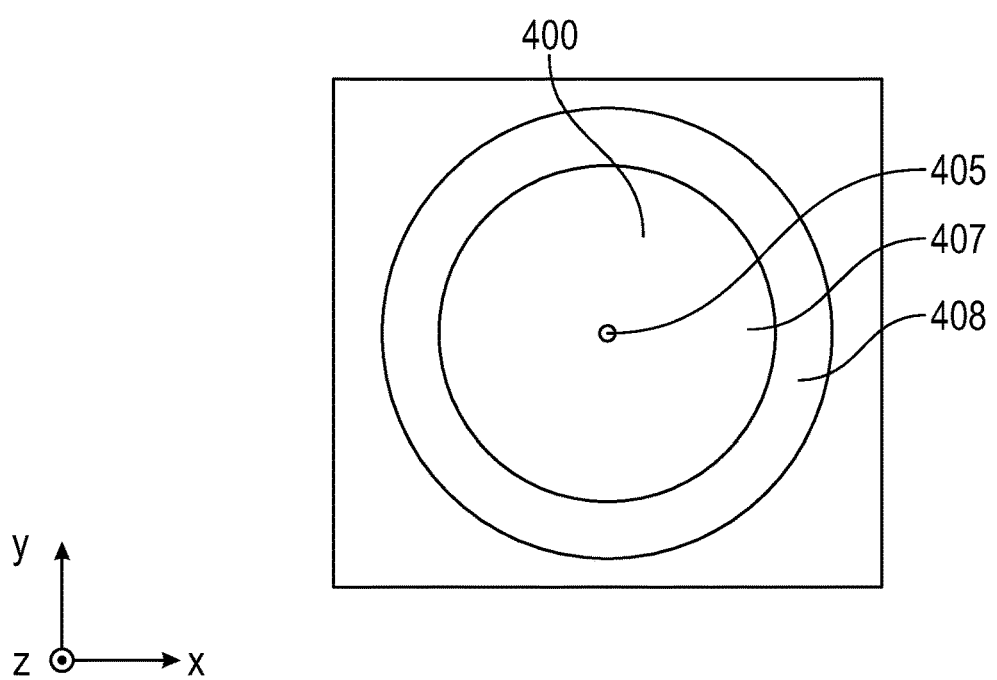
FIG. 4A is schematic top view of an optical film.
Figure 4B:
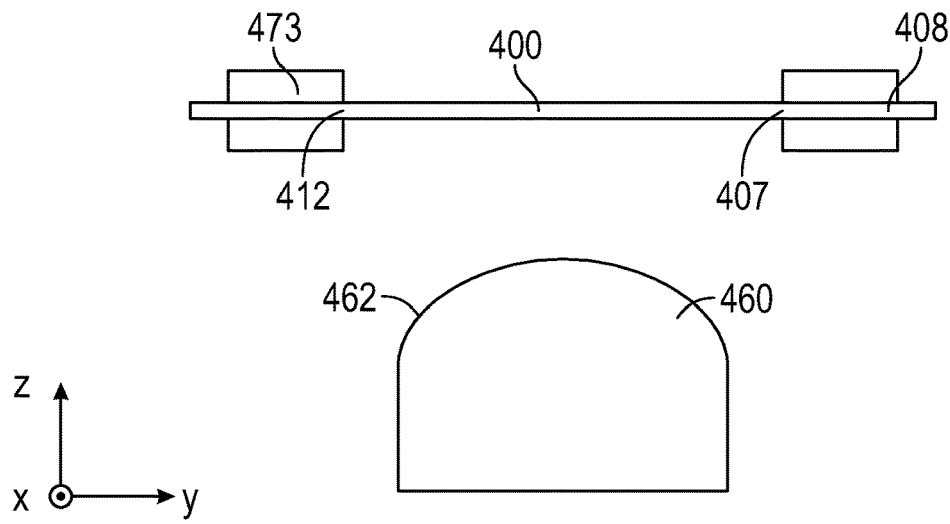
FIG. 4B is a schematic side view of the optical film of FIG. 4A disposed over a mold.

FIG. 4A is schematic top view of an optical film 400 having a center 405, a perimeter 407 and a boundary portion 408. FIG. 4B is a schematic side view of the optical film 400 disposed over a mold 460. At least a portion of the boundary portion 408 is clamped in clamps 473 in order to secure at least portions of the perimeter 407 in a first plane 412 (parallel to the x-y plane). The mold 460 has a curved mold surface 462.

Figure 4C:
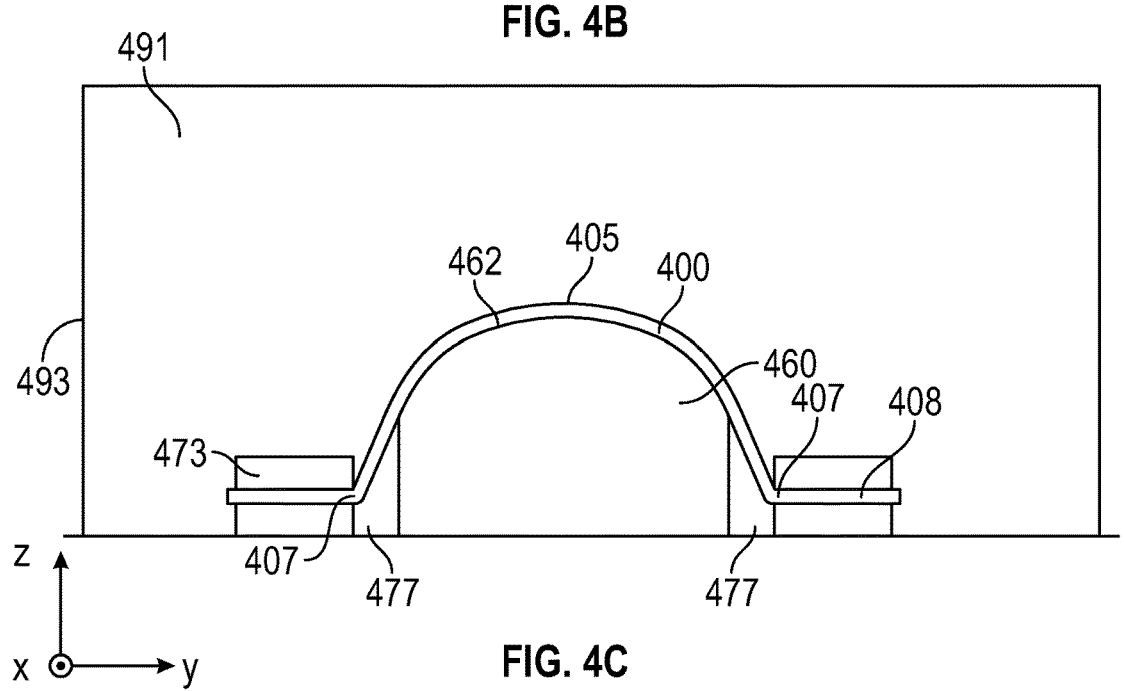
FIG. 4C is a schematic side view of the optical film of FIGS. 4A-4B where a portion of the optical film conforms to at least a portion of a curved mold surface.

In some embodiments, the optical film 400 is stretched by displacing a portion of the optical film 400 along at least a first direction (z-direction) perpendicular to the first plane 412 such that a circumferential stretching of the optical film is substantially constant from the center 405 to the perimeter 407 of the optical film 400, and the radial stretching of the optical film 400 substantially changes from the center 405 to the perimeter 407 of the optical film 400. In some embodiments, the portion of the optical film 400 near the center of the optical film 400 is displaced by changing a distance between the curved mold surface 462 and the perimeter 407 of the optical film 400 along the first direction so that at least the portion of the optical film 400 near the center 405 of the optical film 400 contacts the curved mold surface 462. The distance between the curved mold surface 462 and the perimeter 407 can be changed by moving the mold 460 toward the optical film 400 and/or by moving clamps 473 securing at least portions of the perimeter 407 toward the mold 460. FIG. 4C is a schematic side view of the optical film 400 and mold 460 after the clamps 473 and the mold 460 and the mold have been moved relative to one another. At least a portion of the optical film 400 conforms to at least a portion of the curved mold surface 462. In some embodiments, a vacuum or partial vacuum is pulled in regions 477 between the mold 460 and the optical film 400. In some embodiments, the mold 460 is in a sealed chamber 493 and a pressure is applied to the optical film 400 opposite the mold 460. For example, air pressure can be applied in region 491. Pulling a vacuum and/or applying a pressure can be done in order to aid in conforming the optical film 400 to the curved mold surface 462.

In some embodiments, the optical film 400 has a radius of curvature in any of the ranges described elsewhere herein. For example, at least one location on the optical film 400 may have a radius of curvature along each of orthogonal first and second directions in a range from about 6 mm to about 1000 mm as described for optical film 300.

Figure 4D:
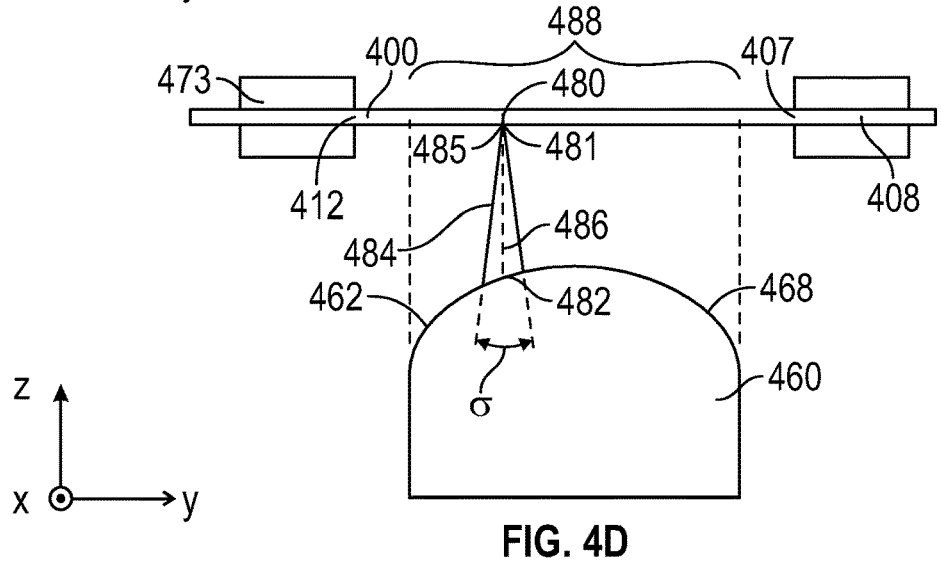
FIG. 4D is a schematic side view of an optical film disposed over a mold.

FIG. 4D is a schematic illustration of how points in the optical film 400 are mapped to points on the curved mold surface 462 according to some embodiments of the present description. A first portion 488 of the optical film 400 is conformed to at least a portion 468 of the curved mold surface 462 in the stretching of the optical film 400. In some embodiments, the optical film 400 is disposed such that at least the first portion 488 is disposed substantially in a first plane 412 adjacent the curved mold surface 462. The first plane 412 may be positioned at a distance (in the z-direction in FIG. 4D) from a closest point on the curved mold surface 462 that is in arrange of zero to 100 times a sag of the curved mold surface 462 or a sag of the portion 468 of the curved mold surface 462. In some embodiments, the optical film 400 is then stretched to conform the first portion 488 of the optical film to at least a portion 468 of the curved mold surface 462. This stretching can be carried out as illustrated and described for FIGS. 4A-4C. In some embodiments, the stretching is such that each point 480 in the first portion 488 has a location 482 on the curved mold surface 462 that is within a cone 484 having an apex 485 at a location 481 of the point 480 in the first plane 412 prior to the stretching. In some embodiments, the cone 484 is centered along an axis 486 perpendicular to the first plane 412 and has a cone angle σ of no more than 10 degrees, or no more than 5 degrees.

Figure 4E:
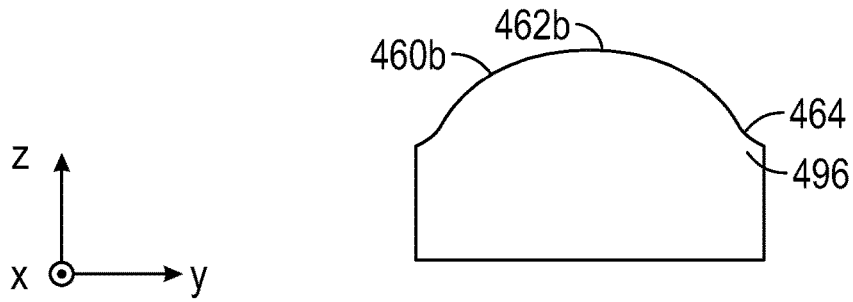
FIG. 4E is a schematic side view of a mold.

A film or a portion of a film may be said to be substantially in a plane if the film or portion is in the plane or if the maximum deviation of the film or portion from the plane is no more than 20% of a largest lateral dimension (largest dimension in front plan view) of the film or portion. In some embodiments, the maximum deviation of the film or portion from the plane is no more than 10%, or no more than 5% of a largest lateral dimension FIG. 4E is a schematic illustration of a mold 460b which corresponds to and can be used in place of mold 460. Mold 460b has a curved mold surface 462b and at least one transition region 464. The at least one transition region 464 may be a single continuous region around an edge of the curved mold surface 462b, for example. The at least one transition region 464 may have a curvature that smoothly varies from the curved mold surface 462b to a boundary portion 496. The at least one transition region 464 may be included to prevent or reduce stress concentration in the optical film. The desired shape of the transition region 464 may depend on the position of the clamps 473 when the optical film 400 is at least partially conformed to the curved mold surface 462b. It has been found that this allows the optical film to be formed with reduced pressure compared to using a mold not including the at least one transition region 464.

Optical film 300 or optical film 400 may be a reflective polarizer or a mirror film (e.g., a visible light mirror such as Enhanced Specular Reflector (ESR) available from 3M Company, St. Paul, MN, or a near infrared reflector). The reflective polarizer or mirror film may include a plurality of alternating interference layers as described further elsewhere herein (see, e.g., FIG. 12).

Figure 5:
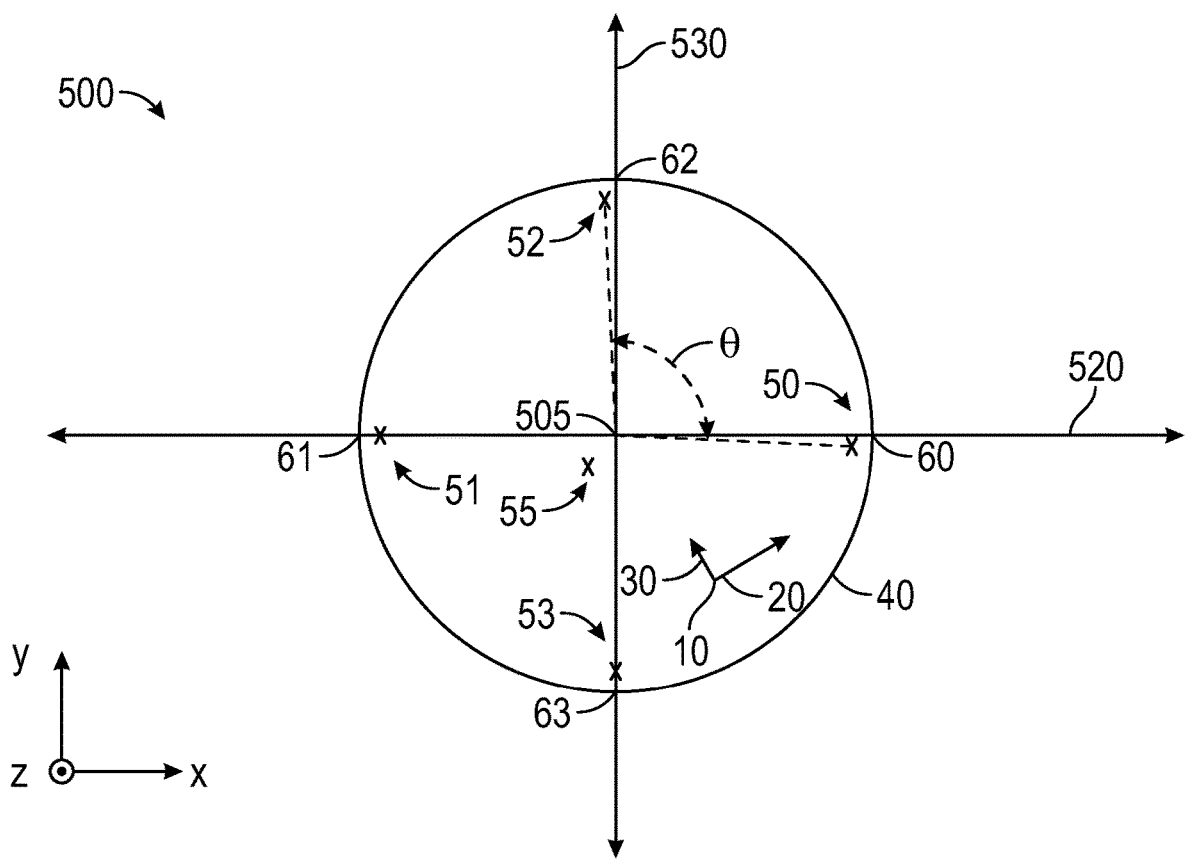
FIG. 5 is a schematic front-view of a curved reflective polarizer.

FIG. 5 is a schematic front-view of a curved reflective polarizer 500. In some embodiments, the curved reflective polarizer 500 includes a plurality of polymeric layers stretched and shaped along at least orthogonal first 520 and second 530 directions so that at least one location on the curved reflective polarizer has a radius of curvature in a range from about 6 mm to about 1000 mm, or about 12 mm to about 500 mm, along each of the first and second directions 520 and 530. In some embodiments, each location 10 on the reflective polarizer 500 has a maximum reflectance greater than about 70% for a block polarization state 20. In some embodiments, each location 10 on the reflective polarizer 500 has a maximum transmittance greater than about 70% for an orthogonal pass polarization state 30. In some embodiments, each location 10 on the reflective polarizer 500 has a minimum transmittance less than about 5% for the block polarization state 20. The maximum reflectance, maximum transmittance, and minimum transmittance may be in these ranges for normally incident light at a predetermined wavelength, in a predetermined wavelength range or a predetermined plurality of wavelengths (e.g., a wavelength range from 400 nm to 700 nm), or over a reflection band of the reflective polarizer 500. Alternatively or in addition, the maximum reflectance, maximum transmittance, and minimum transmittance may be in these ranges for light at a predetermined wavelength, in a predetermined wavelength range or a predetermined plurality of wavelengths, or over a reflection band of the reflective polarizer 500 incident on the reflective polarizer along a direction parallel to an axis normal to and passing through the reflective polarizer at a center of the reflective polarizer. The reflectance and transmittance may be expressed as a fraction instead of as a percent. For example, a reflectance or transmittance of 70% is equivalent to a reflectance or transmittance, respectively, of 0.7.

The predetermined wavelength range may be the wavelength range over which an optical system including the optical film is designed to operate. For example, the predetermined wavelength range may be the visible range (400 nm to 700 nm). As another example, the predetermined wavelength range may include one or more visible wavelength ranges. For example, the predetermined wavelength range may be the union of more than one narrow wavelength ranges (e.g., the union of disjoint red, green and blue wavelength ranges corresponding to light emission colors of a display panel). Such wavelength ranges are described further in U.S. Pat. Appl. Pub. No. 2017/0068100 (Ouderkirk et al.), which is hereby incorporated herein by reference to the extent that it does not contradict the present description. In some embodiments, the predetermined wavelength ranges include other wavelength ranges (e.g., infrared (e.g., near infrared (about 700 nm to about 2500 nm)), or ultraviolet (e.g., near ultraviolet (about 300 nm to about 400 nm)) as well as visible wavelength ranges. A predetermined wavelength may be any wavelength in the predetermined wavelength range. For example, a predetermined wavelength range may be from 400 nm to 700 nm and the predetermined wavelength may be 500 nm.

In some embodiments, a thickness of the reflective polarizer 500 is at least 5% larger at a center 505 of the reflective polarizer than at at least one edge location (e.g., edge locations 50, 51, 52 and 53 which are near edges 60, 61, 62 and 63, respectively). For example, in some embodiments, the thickness is larger at the center 505 than at at least one edge location when the reflective polarizer 500 is shaped in a process where the circumferential stretching is substantially constant and the radial stretching is substantially varying with radial position. Suitable processes include those described as illustrated in FIGS. 4A-4E. In some embodiments, the thickness of the reflective polarizer 500 substantially monotonically decreases from the center 505 of the reflective polarizer 500 to the at least one edge location.

An edge location near an edge refers to a location on the reflective polarizer that is closer to the edge than to a center of the reflective polarizer. In some embodiments, an arc length from the edge to the edge location is less than 50%, or less than 40%, or less than 30%, or less than 20%, or less than 10% of an arc length from the center to the edge location.

In some embodiments, a thickness of the reflective polarizer 500 is at least 5% smaller at a center 505 of the reflective polarizer than at at least one edge location (e.g., edge locations 50, 51, 52 and 53). For example, in some embodiments, the thickness is smaller at the center 505 than at at least one edge location when the reflective polarizer 500 is shaped in a process where the radial stretching is substantially constant and the circumferential stretching is substantially varying with radial position. In some embodiments, this shaping process is as described an illustrated in FIGS. 3A-3F. In some embodiments, the thickness of the reflective polarizer 500 substantially monotonically increases from the center 505 of the reflective polarizer 500 to the at least one edge location.

In some embodiments, for light having a predetermined wavelength and incident on the reflective polarizer 500 along a direction parallel to an axis normal to and passing through the reflective polarizer at the center 505 (z-axis), each location 10 on the reflective polarizer 500 has a maximum reflectance greater than about 0.7 for a block polarization state 20, and a maximum transmittance greater than about 0.7 for an orthogonal pass polarization state 30, such that the maximum transmittances for the pass polarization state 30 of at least one first location (e.g., location 52 or 55) and at least one second location (e.g., location 50) are different from one another by at least 3.8%, or at least 4%, or at least 4.2%, or at least 4.4%, or at least 4.5%. In some embodiments, the maximum transmittances for the pass polarization state 30 of at least one first location and at least one second location are different from one another (e.g., (larger minus smaller)/larger times 100 percent) by no more than 6%, or no more than 5.5%, or no more than 5.0%. For example, the maximum transmittance may be 0.90 at a first location and 0.86 at a second location. In this case, the maximum transmittances differ from one another by (0.90−0.86)/0.90*100% which is about 4.4%.

In some embodiments, the at least one first and second locations (e.g., locations 52 and 50) are near an edge (60 and 62, respectively) of the reflective polarizer 500 and subtend an angle θ in a range from about 70 degrees to about 110 degrees at the center 505. In this case, the maximum transmittance variation is characteristic of processes of forming a reflective polarizer where the radial stretching is substantially constant. In some embodiments, the maximum transmittance for the pass polarization state 30 of the first location (e.g., location 52) is no less than 0.83 and the maximum transmittance for the pass polarization state of the second location (e.g., location 50) is no more than 0.81.

In some embodiments, the at least one first location (e.g., location 55) is near the center location 505 (closer to the center location 505 than the nearest edge) and the at least one second location (e.g., location 50) is near an edge of the reflective polarizer 500. In this case, the maximum transmittance variation is characteristic of processes of forming a reflective polarizer where the circumferential stretching is substantially constant. In some embodiments, the maximum transmittance for the pass polarization state of the first location is no less than 0.89 and the maximum transmittance for the pass polarization state of the second location is no more than 0.87.

Figure 6:
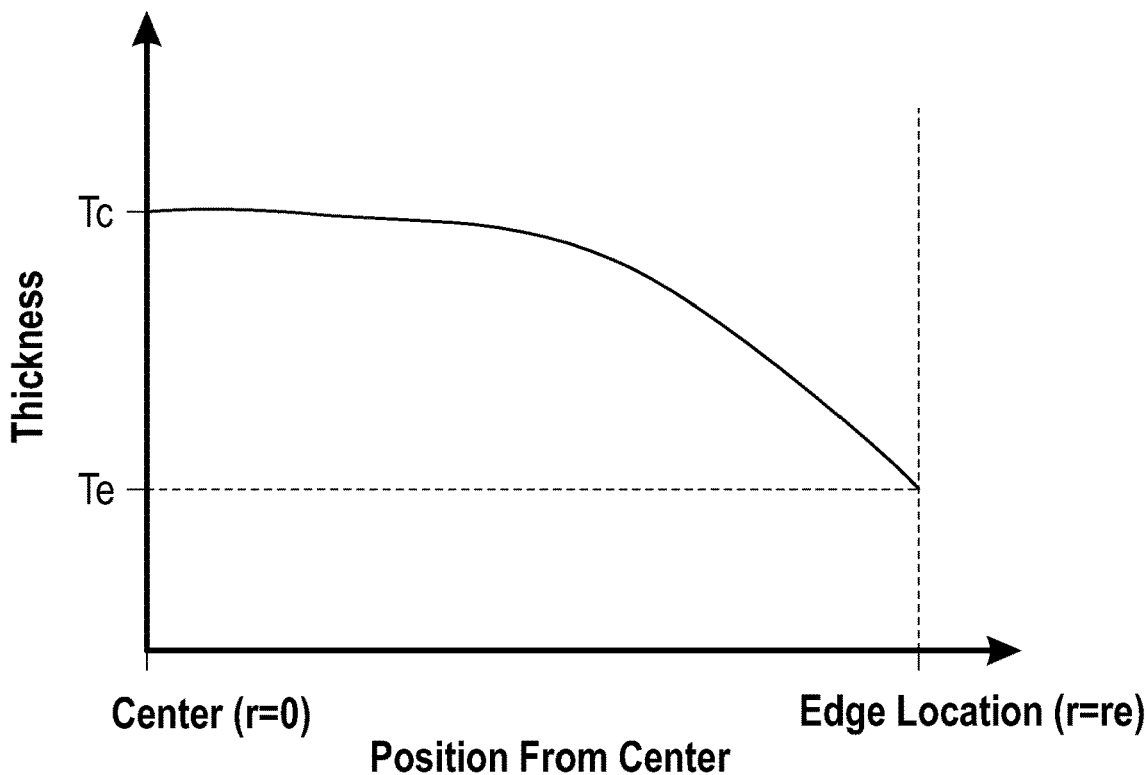
FIG. 6 is a schematic plot of a thickness of a reflective polarizer from a center location to an edge location.

FIG. 6 is a schematic plot of a thickness of a reflective polarizer from a center location to an edge location. The center location has a thickness of Tc and the edge location has a thickness of Te. In some embodiments, Tc is at least 5% larger than Te. This condition can be expressed as (Tc−Te)/Te≥0.05. In some embodiments, (Tc−Te)/Te≥0.1, or 0.15, or 0.2. In the illustrated embodiment, the thickness substantially monotonically decreases from the center to the edge location. In some embodiments, this thickness variation results from forming the reflective polarizer in a process where the circumferential stretching is substantially constant. Suitable processes include those described and illustrated in FIGS. 4A-4E which may be referred to as pulldown processes. In some embodiments, the thickness substantially monotonically decreases from the center to at least one edge location along an arc from the center each location in the at least one edge location. In some embodiments, the thickness substantially monotonically decreases from the center to the edge along an arc from the center each location near the edge. In some cases, it is useful to characterize the thickness in terms of an azimuthal average of the thickness. In some embodiments, an azimuthally averaged thickness is larger at the center of the reflective polarizer than at an edge location in at least one edge location. In some embodiments, the azimuthally averaged thickness substantially monotonically decreases from the center of the reflective polarizer to the edge location. In some embodiments, the azimuthally averaged thickness corresponds to the thickness depicted in FIG. 6.

A quantity, such as a thickness or a band edge wavelength, may be said to substantially monotonically decrease over a range from a first end point of the range (e.g., center location of a reflective polarizer) to a second end point of the range (e.g., an edge location of the reflective polarizer) if the quantity at any larger intermediate point in the range is less than or about equal to the quantity at any smaller intermediate point in the range. Similarly, a quantity may be said to substantially monotonically increase over a range from a first end point of the range to a second end point of the range if the quantity at any larger intermediate point in the range is greater than or about equal to the quantity at any smaller intermediate point in the range. For a quantity that varies with locations over a range (e.g., thickness or band edge wavelength over a range of locations from a center location to an edge location), the quantity at a point may be said to be about equal to a value (e.g., the quantity at another point) if the quantity at the point equals the value or if the quantity at the point is in a range of the value plus or minus 5% of the maximum minus the minimum of the quantity over the range. A quantity described as substantially monotonically decreasing or substantially monotonically increasing may be monotonically decreasing or monotonically increasing, respectively. A quantity described as substantially monotonically decreasing or substantially monotonically increasing may be strictly monotonically decreasing or strictly monotonically increasing, respectively. A function f(x) of a variable x is monotonically decreasing if for any x1 and x2 satisfying x2≥x1, f(x2)≤f(x1). A function f(x) of a variable x is strictly monotonically decreasing if for any x1 and x2 satisfying x2>x1, f(x2)<f(x1). Similarly, a function f(x) of a variable x is monotonically increasing if for any x1 and x2 satisfying x2≥x1, f(x2)≥f(x1); and a function f(x) of a variable x is strictly monotonically increasing if for any x1 and x2 in the range satisfying x2>x1, f(x2)>f(x1).

Figure 7:
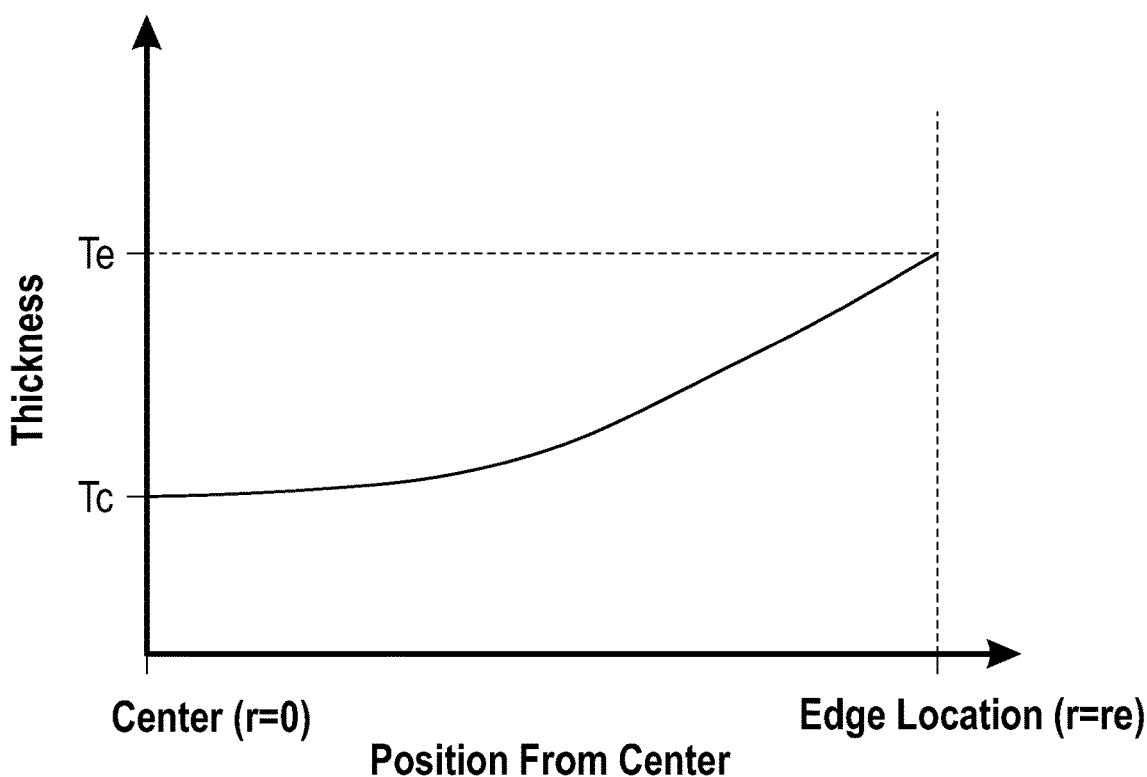
FIG. 7 is a schematic plot of a thickness of another reflective polarizer from a center location to an edge location.

FIG. 7 is a schematic plot of a thickness of a reflective polarizer from a center location to an edge location. The center location has a thickness of Tc and the edge location has a thickness of Te. In some embodiments, Tc is at least 5% smaller than Te. This condition can be expressed as (Te−Tc)/Te≥0.05. In some embodiments, (Te−Tc)/Te≥0.1, or 0.15, or 0.2. In the illustrated embodiment, the thickness substantially monotonically increases from the center to the edge location. In some embodiments, this thickness variation results from forming the reflective polarizer in a process where the radial stretching is substantially constant. Suitable processes include those described and illustrated in FIGS. 3A-3F which may be referred to as pressurization processes. In some cases, it is useful to characterize the thickness in terms of an azimuthal average of the thickness. In some embodiments, an azimuthally averaged thickness is smaller at the center of the reflective polarizer than at an edge location in at least one edge location. In some embodiments, the azimuthally averaged thickness substantially monotonically increases from the center of the reflective polarizer to the edge location. In some embodiments, the azimuthally averaged thickness corresponds to the thickness depicted in FIG. 7.

Figure 8:
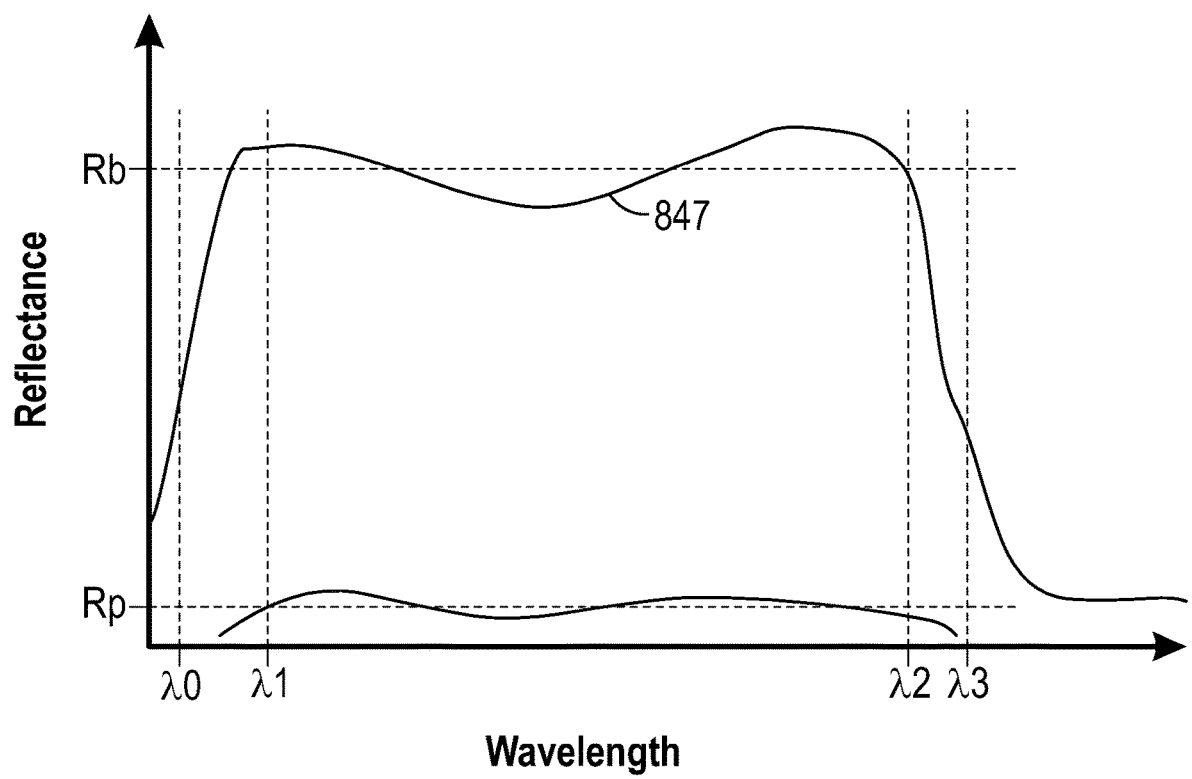
FIG. 8 is a schematic plot of reflectance versus wavelength for a reflective polarizer.

FIG. 8 is a schematic plot of reflectance versus wavelength for a reflective polarizer for light normally incident on the reflective polarizer in either a block polarization state or a pass polarization state. A predetermined wavelength range from λ1 to λ2 is illustrated. The average reflectance in the predetermined wavelength for normally incident light having the block polarization state is Rb which may be at least 70 percent, or at least 80 percent, or at least 85 percent, or at least 90 percent. The average reflectance in the predetermined wavelength for normally incident light having the pass polarization state is Rp which may be less than 20 percent, or less than 15 percent, or less than 10 percent, or less than 5 percent. The reflective polarizer has a reflection band 847 having a long wavelength band edge λ3. Reflection bands typically have both long and short wavelength band edges where the reflectance rapidly drops. In the illustrated embodiment, the short wavelength band edge is less than λ1 and the long wavelength band edge λ3 is greater than λ2. The band edges may be determined for normally incident light with the reflective polarizer convex towards the incident light.

Figure 9:
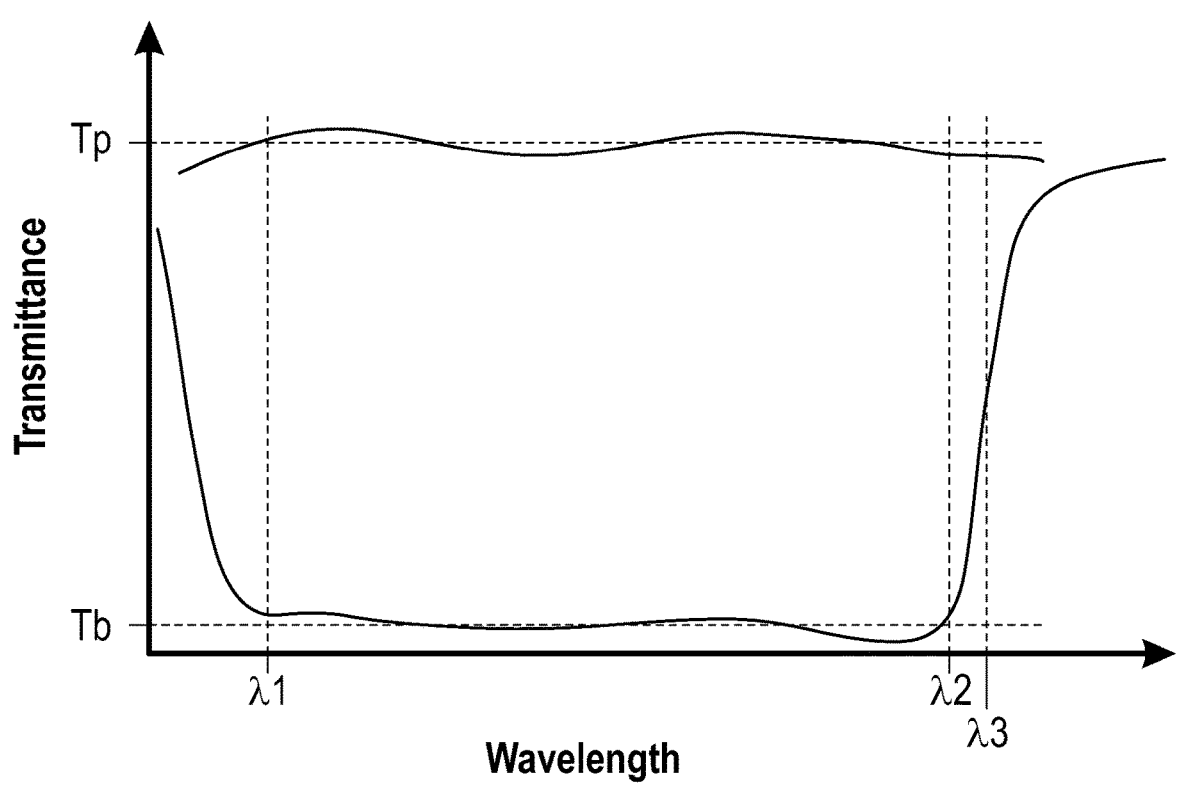
FIG. 9 is a schematic plot of transmittance versus wavelength for a reflective polarizer.

FIG. 9 is a schematic plot of transmittance versus wavelength for a reflective polarizer for light normally incident on the reflective polarizer in either a block polarization state or a pass polarization state. The average transmittance in the predetermined wavelength (from λ1 to λ2) for normally incident light having the pass polarization state is Tp which may be at least 70 percent, or at least 80 percent, or at least 85 percent, or at least 90 percent. The average transmittance in the predetermined wavelength for normally incident light having the block polarization state is Tb which may be less than 10 percent, or less than 5 percent, or less than 3 percent, or less than 2 percent, or less than 1 percent, or less than 0.5 percent.

The precise wavelength of a band edge can be defined using several different criteria. The spatial variation patterns exhibited by the band edge (e.g., monotonically decreasing or monotonically increasing with radius) typically do not depend on the precise criteria used. The wavelength of the band edge may be can be taken to be the wavelength where the reflectance for normally incident light having the block polarization state drops to ½ Rb or the wavelength where the transmittance for normally incident light having the block polarization state increases to 10%, for example. Except where indicated differently, the band edge can be understood to refer to the wavelength where the transmittance for normally incident light having the block polarization state increases to 10%.

Figure 10:
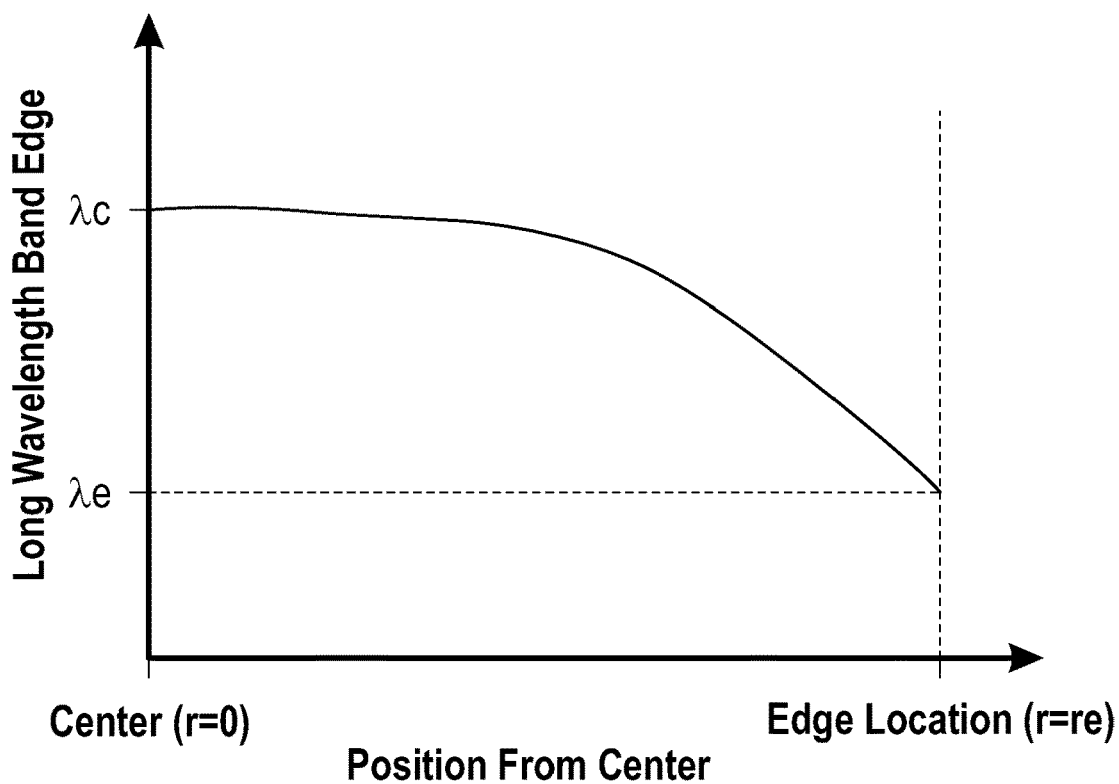
FIG. 10 is a schematic plot of a long wavelength band edge of a reflective polarizer from a center location to an edge location.

FIG. 10 is a schematic plot of a long wavelength band edge of a reflective polarizer from a center location to an edge location. The center location has a long wavelength band edge of $\lambda c$ and the edge location has a long wavelength band edge of $\lambda e$. In some embodiments, $\lambda c$ is at least 5% larger than $\lambda e$. This condition can be expressed as $(\lambda c-\lambda e)/\lambda e \geq 0.05$. In some embodiments, $(\lambda c-\lambda e)/\lambda e \geq 0.1$, or 0.15, or 0.2. In the illustrated embodiment, the long wavelength band edge substantially monotonically decreases from the center to the edge location. In some embodiments, this long wavelength band edge variation results from forming the reflective polarizer in a process where the circumferential stretching is substantially constant. Suitable processes include those described and illustrated in FIGS. 4A-4E. In some cases, it is useful to characterize the long wavelength band edge in terms of an azimuthal average of the long wavelength band edge. In some embodiments, an azimuthally averaged long wavelength band edge is larger at the center of the reflective polarizer than at an edge location in at least one edge location. In some embodiments, the azimuthally averaged long wavelength band edge substantially monotonically decreases from the center of the reflective polarizer to the edge location. In some embodiments, the azimuthally averaged long wavelength band edge corresponds to the long wavelength band edge depicted in FIG. 10.

Figure 11:
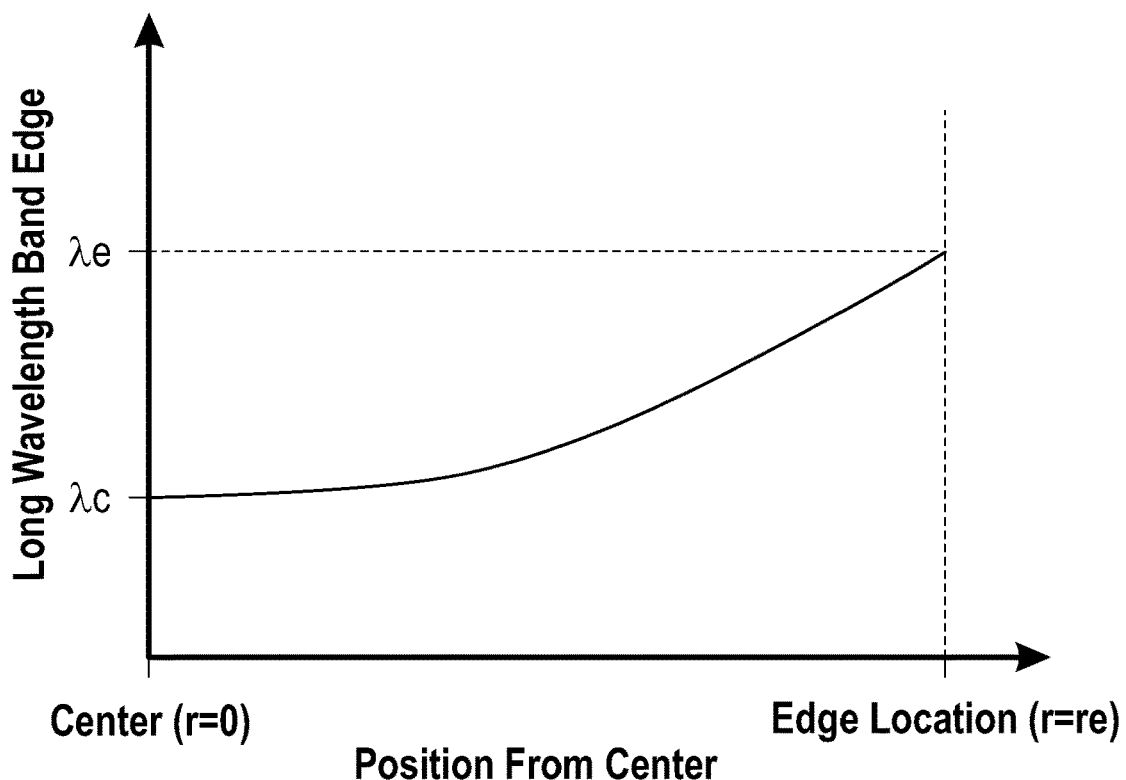
FIG. 11 is a schematic plot of a long wavelength band edge of another reflective polarizer from a center location to an edge location.

FIG. 11 is a schematic plot of a long wavelength band edge of a reflective polarizer from a center location to an edge location. The center location has a long wavelength band edge of $\lambda c$ and the edge location has a long wavelength band edge of $\lambda e$. In some embodiments, $\lambda c$ is at least 5% smaller than $\lambda e$. This condition can be expressed as $(\lambda e-\lambda c)/\lambda e \geq 0.05$. In some embodiments, $(\lambda e-\lambda c)/\lambda e \geq 0.1$, or 0.15, or 0.2. In the illustrated embodiment, the long wavelength band edge substantially monotonically increases from the center to the edge location. In some embodiments, this long wavelength band edge variation results from forming the reflective polarizer in a process where the radial stretching is substantially constant. Suitable processes include those described and illustrated in FIGS. 3A-3F. In some embodiments, an azimuthally averaged long wavelength band edge is smaller at the center of the reflective polarizer than at an edge location in at least one edge location. In some embodiments, the azimuthally averaged long wavelength band edge substantially monotonically increases from the center of the reflective polarizer to the edge location. In some embodiments, the azimuthally averaged long wavelength band edge corresponds to the long wavelength band edge depicted in FIG. 11.

Figure 12:
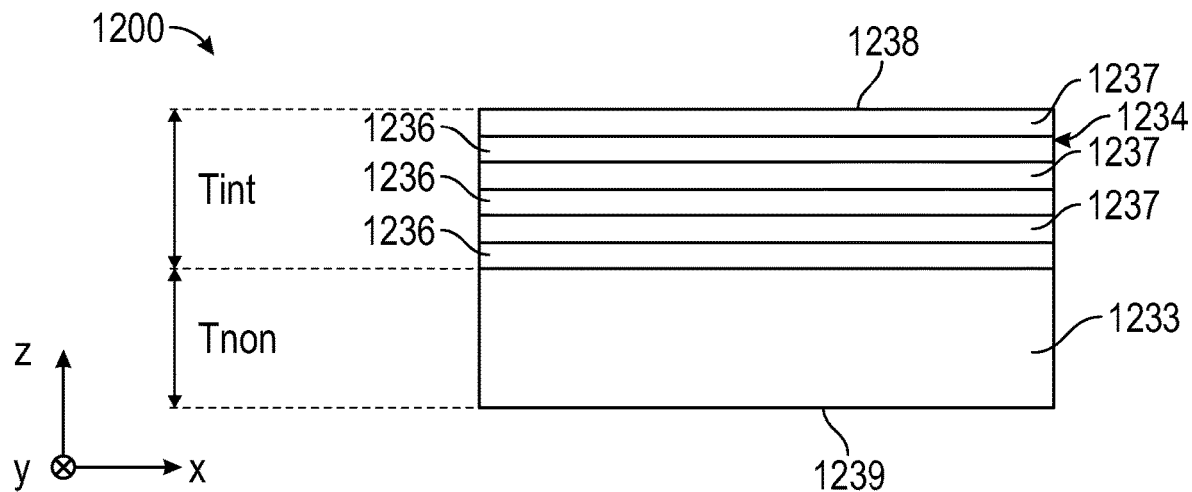
FIG. 12 is a schematic cross-sectional view of an integrally formed reflective polarizer.

FIG. 12 is a schematic cross-sectional view of an integrally formed reflective polarizer 1200 including a plurality of interference layers 1234 and a noninterference layer 1233. In some embodiments, the plurality of interference layers includes alternating polymeric layers 1236 and 1237. In the illustrated embodiment, a single noninterference layer 1233 is included. Interference layers may be described as reflecting or transmitting light primarily by optical interference when the reflectance and transmittance of the interference layers can be reasonably described by optical interference or reasonably accurately modeled as resulting from optical interference. Such interference layers are described in U.S. Pat. No. 5,882,774 (Jonza et al.), and U.S. Pat. No. 6,609,795 (Weber et al.), for example. Adjacent pairs of interference layers having differing refractive indices reflect light by optical interference when the pair has a combined optical thickness (refractive index times physical thickness) of ½ the wavelength of the light. Interference layers typically have a physical thickness of less than about 200 nanometers. Noninterference layers have an optical thickness too large to contribute to the reflection of visible light via interference. Typically, noninterference layers have a physical thickness of at least 1 micrometer. In some embodiments, more than one noninterference layer is included. In some embodiments, the plurality of interference layers 1234 is disposed on a same side of the at least one noninterference layer 1233. In some embodiments, at least one noninterference layer (noninterference layer 1233 in the illustrated embodiment) is integrally formed with the plurality of interference layers 1234 and does not reflect or transmit light primarily by optical interference. In some embodiments, noninterference layer 1233 is a non-adhesive flexible optical layer as described further elsewhere herein.

Materials suitable for the higher refractive index interference layers in a reflective polarizer film, such as reflective polarizer 1200, include, for example, polyethylene naphthalate (PEN), copolymers containing PEN and polyesters (e.g., polyethylene terephthalate (PET) or dibenzoic acid), glycol modified polyethylene terephthalate. Materials suitable for the lower refractive index interference layers in a reflective polarizer film, such as reflective polarizer 1200, include, for example, copolyesters based on PEN, copolyesters based on PET, polycarbonate (PC), or blends of these three classes of materials. To achieve high reflectivities with a desired number of layers, adjacent microlayers can exhibit a difference in refractive indices for light polarized along the block axis of at least 0.2, for example.

As used herein, a first element "integrally formed" with a second element means that the first and second elements are manufactured together rather than manufactured separately and then subsequently joined. Integrally formed includes manufactured a first element followed by manufactured the second element on the first element. A reflective polarizer including a plurality of layers is integrally formed if the layers are manufactured together (e.g., casting a film from a combined melt stream, and then orienting the cast film) rather than manufactured separately and then subsequently joined.

In some embodiments, the reflective polarizer 1200 has a different reflectivity for light in the block state incident from the first major side 1238 than for light in the block state incident from the second major side 1239, as described further elsewhere herein.

An average total thickness of the plurality of interference layers 1234 is Tint and an average total thickness of the at least one noninterference layer 1233 is Tnon. In some embodiments, Tint is in a range from about 20 micrometers to about 70 micrometers and Tnon is in a range from about 40 micrometers to about 100 micrometers. The total thickness may vary if the surface of one or more noninterference layer is structured, for example. The total thickness may also vary due to ordinary manufacturing variations, for example. The average total thickness is the unweighted average of the thickness over the area of the layers. In some embodiments, the average total thickness of the reflective polarizer (Tint+ Tnon) is at least 50 micrometers, or at least 60 micrometers, or at least 70 micrometers.

In some embodiments, at least one of the interference layers is substantially uniaxially oriented prior to forming the film into a curved shape. For example, each of the layers 1237 may be substantially uniaxially oriented. A reflective polarizer or a layer in a reflective polarizer is substantially uniaxially oriented if it is substantially oriented in one in-plane direction and substantially not oriented in the orthogonal in-plane direction and substantially not oriented in the thickness direction. Substantially uniaxially oriented reflective polarizers are available from 3M Company under the trade designation Advanced Polarizing Film or APF. Other types of multilayer optical film reflective polarizers (e.g., Dual Brightness Enhancement Film or DBEF available from 3M Company) may also be used. DBEF films are oriented substantially more in one in-plane direction than in the orthogonal in-plane direction and also exhibit orientation in the thickness direction. DBEF films are not substantially uniaxially oriented as "substantially uniaxially oriented" is used herein.

In some embodiments, the reflective polarizer prior to forming into a curved shape is substantially uniaxially oriented in that it has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.), which is hereby incorporated herein to the extent that it does not contradict the present description and may include a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. Except where specified differently, refractive index refers to the refractive index at a wavelength of 550 nm. After forming into a curved shape, a reflective polarizer may have at least one layer that is substantially uniaxially oriented at at least one location. In some embodiments, the at least one layer at the at least one location has a first refractive index in a first direction along the thickness of the layer, a second refractive index in a second direction orthogonal to the first direction, and a third refractive index in a third direction orthogonal to the first and second directions, an absolute value of a difference in the first and third refractive indices being less than about 0.02, or less than about 0.01, and an absolute value of a difference in the second and third refractive indices being greater than about 0.05, or greater than about 0.10. In some embodiments, after being formed into a curved shape, a reflective polarizer has at least one layer that is substantially uniaxially oriented at a plurality of locations.

While reflective polarizer films which are not substantially uniaxially oriented (e.g., DBEF films) can have a total thickness greater than 100 micrometers, substantially uniaxially oriented films (e.g., APF films) are typically much thinner. For example, APF films are typically less than about 35 micrometers thick. According the present description, it has been found that thick (e.g., greater than about 50 micrometers thick) substantially uniaxially oriented reflective polarizer films provide improved properties when formed into a curved shape and used in an optical system as described further elsewhere herein. The improve properties include improved mechanical properties and improved optical properties. The improved mechanical properties include improved formability to a higher curvature or to a higher sag to diameter ratio without creating defects in the film. The improved optical properties include improved polarization contrast when used in an optical system utilizing a folded optics design as described further elsewhere herein. In addition to or instead of using a thick reflective polarizer film, bonding a non-adhesive flexible optical film to the reflective polarizer prior to forming has been found to improve the physical properties. The thickness of a reflective polarizer can be increased by including additional interference layers in a given thickness range and/or by increasing the thickness of noninterference layers.

Figure 50:
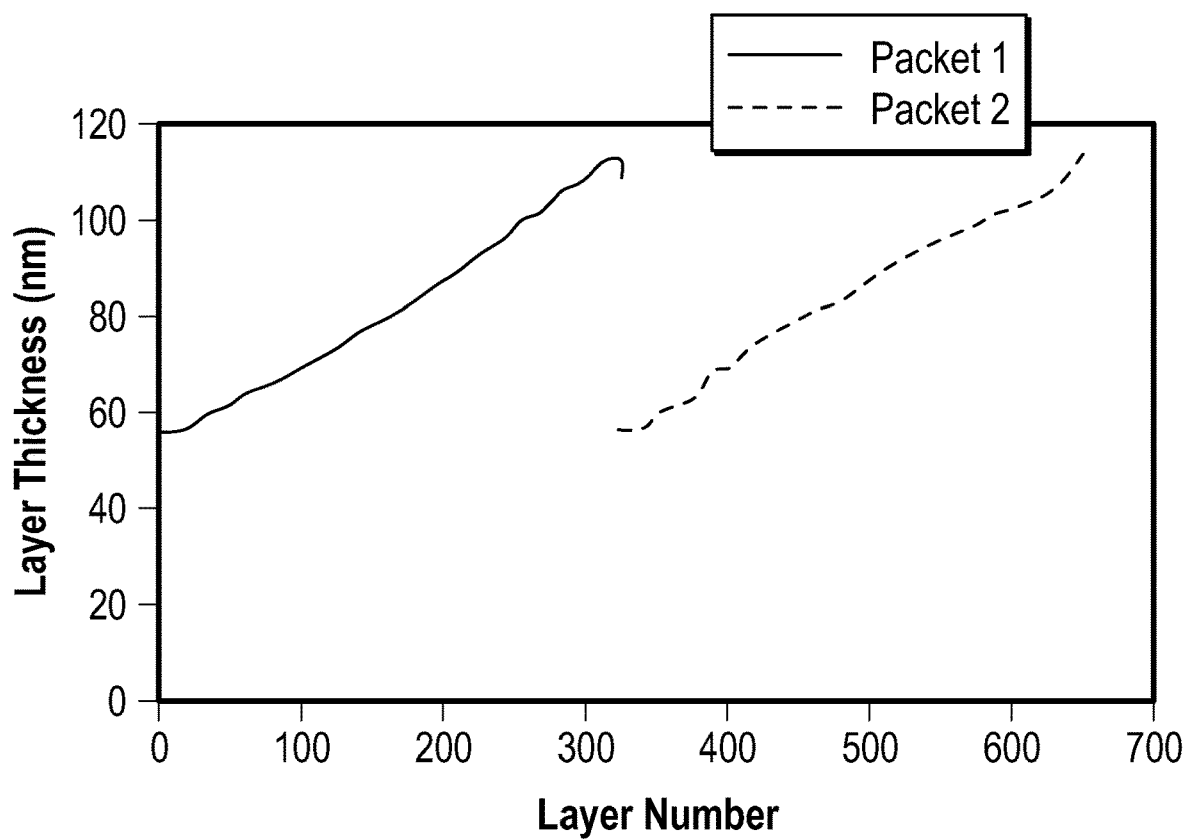
FIG. 50 is a plot of layer thickness versus layer number for a reflective polarizer including two packets of interference layers.

In some embodiments, the reflective polarizer includes two or more packets of alternating polymeric interference layers to provide a high contrast. Such reflective polarizers are described further in U.S. Prov. Pat. Appl. No. 62/467,712 (Haag et al.), filed Mar. 6, 2017 and hereby incorporated herein by reference to the extent that it does not contradict the present description. In some embodiments, the reflective polarizer includes a plurality of packets where each packet has a layer thickness versus layer number that is a substantially continuous curve. FIG. 50 illustrates a layer thickness versus layer number for a reflective polarizer including two packets (Packet 1 and Packet 2). In some embodiments, the thickness profiles substantially overlap (e.g., greater than 50 percent of a thickness range of Packet 1 overlaps greater than 50 percent of a thickness range of Packet 2). In other embodiments, there is little or no overlap in the thickness ranges.

After the reflective polarizer is shaped, the previously uniaxially oriented layer(s) may no longer be uniaxially oriented in all locations. However, in some embodiments, after forming, at least one layer is substantially uniaxially oriented at at least one location. For example, the reflective polarizer film may be stretched radially in the forming of the film, and locations along a curve from a center location of the reflective polarizer. For example, referring to FIG. 19, in some embodiments, at least one layer (e.g., corresponding to layers 1237 and/or to layers 1236 depicted in FIG. 12) is substantially uniaxially oriented at the center 1905 and at the location 1910-5. In the embodiment illustrated in FIG. 19, the orientation at location 1910-5 is along the block axis **1910*b*-5 which in the projection onto the x-y plane is parallel to the block axis 1905*b* at the center 1905**. In some embodiments, the reflective polarizer is substantially uniaxially oriented at a center location of the reflective polarizer and at at least one location away from the center location of the reflective polarizer.

In some embodiments, for light having a predetermined wavelength and either normally incident on the reflective polarizer or incident along a direction parallel to an axis passing through a center of the reflective polarizer normal to the reflective polarizer, each location on the reflective polarizer has a maximum reflectance for a block polarization state, a maximum transmittance greater for an orthogonal pass polarization state, and a minimum transmittance for the block polarization state. In some embodiments, the maximum reflectance is greater than about 70%. In some embodiments, the maximum transmittance is greater than about 70%. In some embodiments, the minimum transmittance is less than about 5%.

Figure 13:
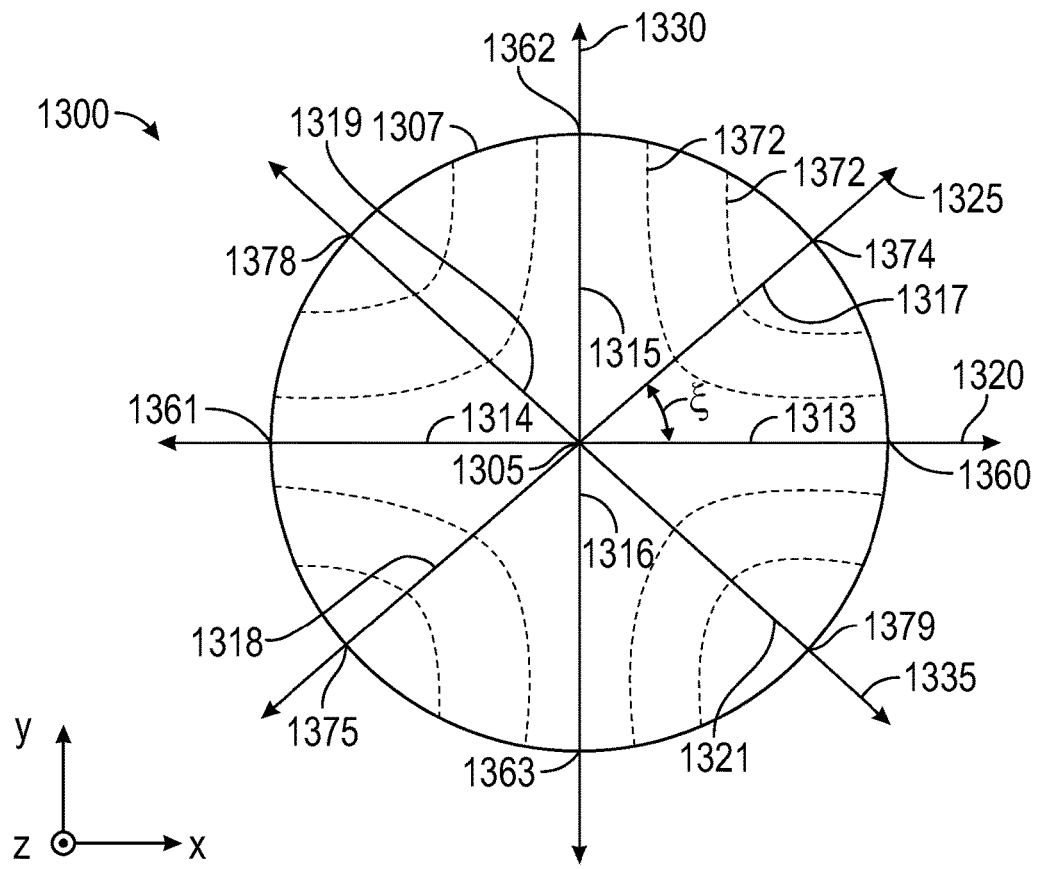
FIGS. 13-15 are schematic illustrations of the minimum transmittance (Tmin) for reflective polarizers in front plan view.

FIG. 13 is a schematic illustration the minimum transmittance (Tmin), which is the transmittance of the block polarization state, at a predetermined wavelength (e.g., about 550 nm) for a reflective polarizer 1300 according to some embodiments of the present description. The illustrated Tmin may be determined for light parallel to the z-axis, or for normally incident light, with the reflective polarizer convex towards the incident light. Contours 1372 of constant Tmin are shown. It has been found that the illustrated contours 1372 are characteristic of reflective polarizer films formed into a curved shape using a process in which the circumferential stretching is substantially constant according to some embodiments.

Orthogonal first and second axes 1320 and 1330 intersecting each other at a center location 1305 of the reflective polarizer 1300 and orthogonal third and fourth axes 1325 and 1335 intersecting each other at the center location 1305 of the reflective polarizer 1300 are illustrated. An angle $\xi$ between the first and third axes 1320 and 1325 is about 45 degrees. In some embodiments, Tmin is small and approximately constant along the first and second axes 1320 and 1330 and generally increasing away from the center location 1305 along each of the third and fourth axes 1325 and 1335. In some embodiments, the block axis of the reflective polarizer 1300 at the center location 1305 is along the second axis 1330.

In some embodiments, the minimum transmittance of the reflective polarizer 1300 for the block polarization state: at a first location 1313 along the first axis 1320 between the center location 1305 and a first edge 1360 of the reflective polarizer 1300 is T1; at a second location 1315 along the second axis 1330 between the center location 1305 and a second edge 1362 of the reflective polarizer 1300 is T2; at a third location 1317 along the third axis 1325 between the center location 1305 and a third edge 1374 of the reflective polarizer is T3; and at a fourth location 1319 along the fourth axis 1335 between the center location 1305 and a fourth edge 1378 of the reflective polarizer 1300 is T4. In some embodiments, a maximum of T1 and T2 is less than a minimum of T3 and T4. In some embodiments, the minimum transmittance of the reflective polarizer 1300 for the block polarization state: at a fifth location 1314 along the first axis 1320 between the center location 1305 and a fifth edge 1361, opposite the first edge 1360, of the reflective polarizer 1300 is T5; at a sixth location 1316 along the second axis 1330 between the center location 1305 and a sixth edge 1363, opposite the second edge 1362, of the reflective polarizer is T6; at a seventh location 1318 along the third axis 1325 between the center location 1305 and a seventh edge 1375, opposite the third edge 1374, of the reflective polarizer 1300 is T7; and at an eighth location 1321 along the fourth axis 1335 between the center location 1305 and an eighth edge 1379, opposite the fourth edge 1378, of the reflective polarizer 1300 is T8. In some embodiments, a maximum of T1, T2, T5 and T6 is less than a minimum of T3, T4, T7 and T8.

In some embodiments, the minimum transmittance Tmin of the reflective polarizer 1300 for the block polarization state is substantially 4-fold rotation symmetric about an optical axis (parallel to z-axis) passing through the center location 1305 of the reflective polarizer 1300 normal to the reflective polarizer. A quantity is n-fold rotation symmetric if it is symmetric under all rotations about 360 degrees/n where n is an integer greater than 1. A quantity characterizing a reflective polarizer may be described as substantially symmetric under a symmetry operation (e.g., reflection about an axis or a plane or rotation through an angle) if the quantity at each point in at least 70 percent of a surface area of the reflective polarizer differs from the quantity at a corresponding point determined by the symmetry operation by no more than 20 percent of the maximum variation in the quantity. For example, the minimum transmittance (Tmin) of the reflective polarizer 1300 is substantially 4-fold symmetric about the optical axis if Tmin at each point in at least 70 percent of a surface area of the reflective polarizer differs from the minimum transmittance at a corresponding point determined by rotation of each of 90 degrees, 180 degrees and 270 degrees about the optical axis by no more than 20 percent of the maximum variation in Tmin. The maximum variation in Tmin is the maximum Tmin minus minimum Tmin over the reflective polarizer. In some embodiments, a quantity at each point in at least 70 percent, or at least 80 percent, or at least 90 percent, or at least 95 percent, of a surface area of the reflective polarizer differs from the quantity at a corresponding point determined by the symmetry operation by no more than 20 percent, or by no more than 15 percent, or by no more than 10 percent, or by no more than 5 percent, of the maximum variation in the quantity.

In some embodiments, Tmin is substantially symmetric under reflection about any one or more of the first, second, third and fourth axes 1320, 1330, 1325, and 1335. Reflection about an axis refers to reflection about the axis in plan view or in a projection onto a plane perpendicular to an optical axis through a center of and normal to the reflective polarizer. Reflection symmetries may also be characterized by reflection about a plane. A quantity described as symmetric or antisymmetric about an axis may also be symmetric or antisymmetric about a plane containing the axis and an optical axis of the reflective polarizer. In some embodiments, Tmin is substantially symmetric in under reflection about each of one or more planes containing the optical axis and any of the first, second, third and fourth axes 1320, 1330, 1325, and 1335.

In other embodiments, Tmin is relatively large in a first portion of the reflective polarizer along the third axis 1325 and decreases away from the portion along the fourth axis 1335. This is schematically illustrated in FIG. 14.

Figure 14:
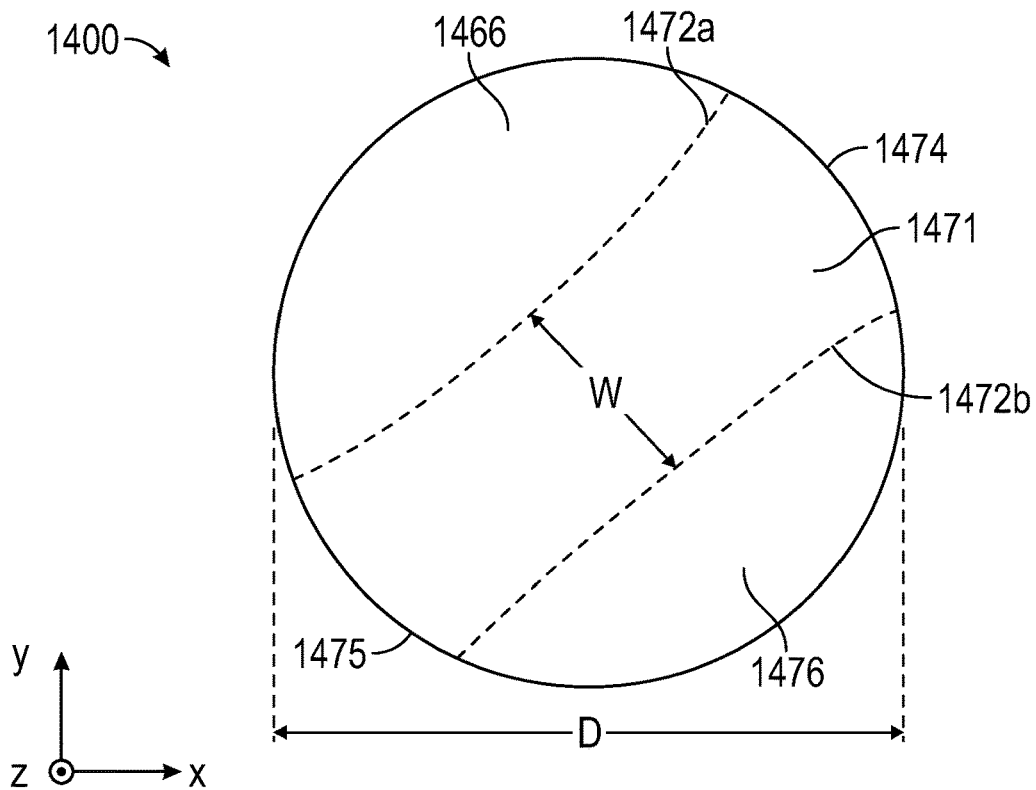

FIG. 14 is a schematic illustration the minimum transmittance (Tmin) of the block polarization state at a predetermined wavelength for a reflective polarizer 1400 according to some embodiments of the present description. The illustrated Tmin may be determined for light parallel to the z-axis, or for normally incident light, with the reflective polarizer convex towards the incident light. Contours 1472a and 1472b of constant Tmin are shown. A continuous first portion 1471 of the reflective polarizer 1400 extends between first and second ends 1474 and 1475 of the reflective polarizer 1400 and has a minimum width W that is at least 3%, or at least 5%, or at least 8%, or at least 10% of a largest lateral dimension D (largest dimension in front plan view) of the reflective polarizer 1400. In some embodiments, the width W is no more than 80%, or no more than 70%, or no more than 60%, or no more than 50%, or no more than 40% of D. The first portion 1471 defines disjoint second and third portions 1466 and 1476 of the reflective polarizer 1400 as the portions of the reflective polarizer 1400 that are not included in the first portion 1471. In some embodiments, Tmin is generally larger in the first portion 1471 and generally smaller in the second and third portions 1466 and 1476. It has been found that this behavior of Tmin is characteristic of reflective polarizer films formed into a curved shape using a process in which the radial stretching is substantially constant according to some embodiments. Tmin being generally larger in the first portion 1471 and generally smaller in the second and third portions 1466 and 1476 can be understood to mean that the minimum transmittance of the reflective polarizer 1400 for the block polarization state is higher at each location in greater than 50% of the first portion 1471 than at each location in greater than 50% of the second portion 1466 and at each location in greater than 50% of the third portion 1476. In other words, for a first area in the first portion 1471, a second area in the second portion 1466 and a third area in the third portion 1476, where the first area is greater than 50% of the total area of the first portion 1471, the second area is greater than 50% of the total area of the second portion 1466, and the third area is greater than 50% of the total area of the third portion 1476, the minimum transmittance of the reflective polarizer 1400 for the block polarization state is higher at each location in the first area than at each location in the second and third areas. The first, second, and/or third areas may be continuous or discontinuous. In some embodiments, the minimum transmittance of the reflective polarizer 1400 for the block polarization state is higher at each location in greater than 60%, or 70%, or 80%, or 90% of the first portion 1471 than at each location in greater than 60%, 70%, or 80%, or 90% of the second portion 1466 and at each location in greater than 60%, 70%, or 80%, or 90% of the third portion 1476.

Figure 15:
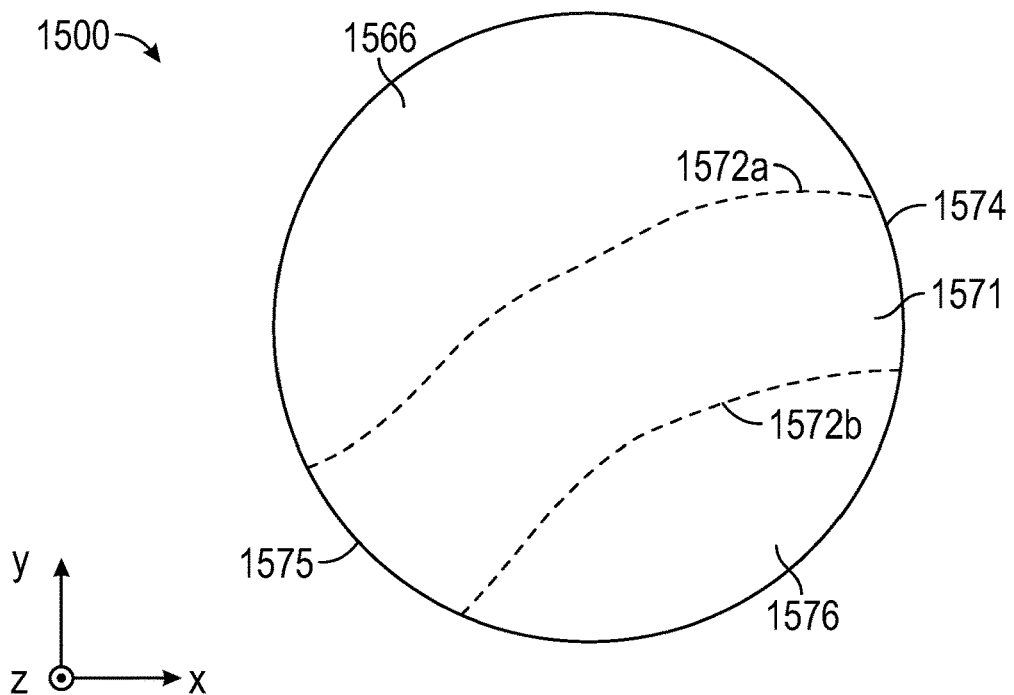

The first portion 1471 may extend substantially along a constant direction as schematically illustrated in FIG. 14, or the first portion 1471 may have a curved shape. In embodiments where the first portion 1471 extends substantially along a constant direction, minimum transmittance (Tmin) of the block polarization state may be substantially symmetric under reflection about the constant direction or may be substantially symmetric under reflection about a plane containing the optical axis (parallel to z-axis) and the constant direction. In embodiments where the first portion has a curved shape, Tmin may not have a symmetry axis or symmetry plane. FIG. 15 is a schematic illustration of Tmin at a predetermined wavelength for a reflective polarizer 1500 according to some embodiments of the present description. Elements 1571, 1574, 1575, 1572a, 1572b, 1566 and 1576 are as described for elements 1571, 1574, 1575, 1572a, 1572b, 1566 and 1576, respectively, except that the first portion 1571 extends along a curve between the first and second ends 1574 and 1575 of the reflective polarizer 1500. The reflective polarizers of FIGS. 14 and 15 may have a block axis at a center of the reflective polarizer parallel to the y-axis.

Figure 16:
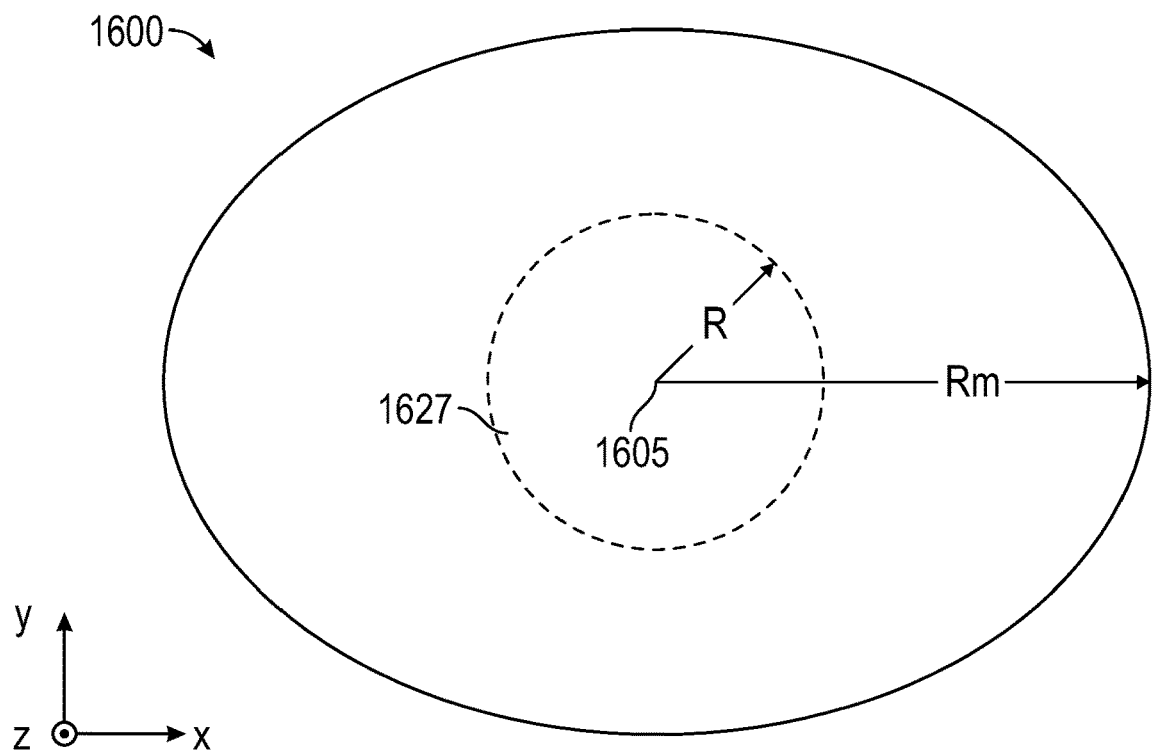
FIG. 16 is a schematic front view of a reflective polarizer.

In some cases, the reflective polarizers of the present description may be characterized by a range of a quantity over a region as a function of the region. The range of a quantity over a region is the maximum value of the quantity in the region minus the minimum value of the quantity in the region and may be referred to as the maximum variation of the quantity over the region. In some cases, it is useful to consider a region within an arc length r of the center of the reflective polarizer or within a radius R (cylindrical coordinate distance from an axis through the center of the reflective polarizer; see, e.g., FIG. 1) of the center of the reflective polarizer. FIG. 16 is a schematic front plan view of a reflective polarizer 1600 having a center location 1605 and having a region 1627 within a radius R from an optical axis passing through the center 1605 of the reflective polarizer 1600 normal to the reflective polarizer 1600. The reflective polarizer 1600 has a maximum radius Rm from the optical axis. In some cases, the region 1627 may be characterized in terms of the area (area of the curved surface) of the region 1627 of the reflective polarizer 1600 rather than the radius R.

Figure 17:
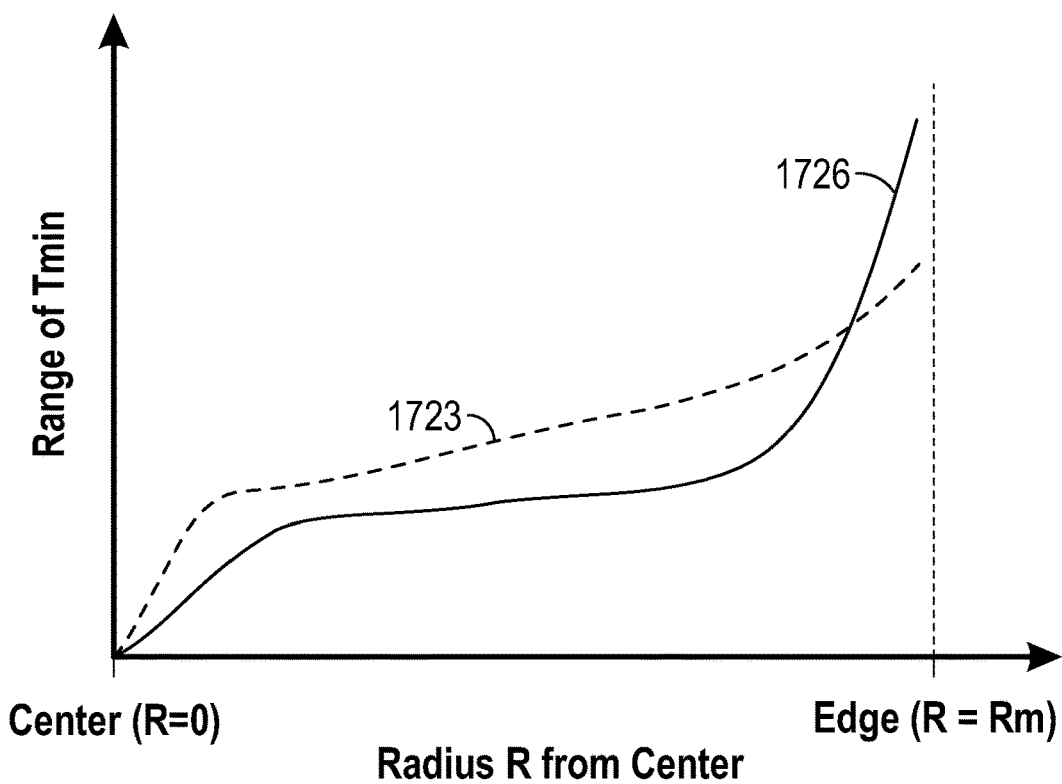
FIG. 17 is a schematic plot of the maximum variation of Tmin in a region of a reflective polarizer between the center of the reflective polarizer and a radius R from an optical axis passing through a center of the reflective polarizer normal to the reflective polarizer.

FIG. 17 is a schematic plot of the maximum variation of Tmin in the region of a reflective polarizer between the center of the reflective polarizer and a radius R from an optical axis passing through a center of the reflective polarizer normal to the reflective polarizer. Curve 1726 is the range of Tmin within a region having a radius R (see, e.g., region 1627 depicted in FIG. 16) for a reflective polarizer formed into a curved shape using a process where the circumferential stretching of the film is substantially constant. Curve 1723 is the range of Tmin within a region having a radius R for a reflective polarizer formed into a curved shape using a process where the radial stretching of the film is substantially constant. In some embodiments, a maximum variation of the minimum transmittance of the block polarization state (expressed as a fraction rather than a percent) is in a range of about 0.001 to about 0.005 for R in a range of 0.4 to 0.7 times the maximum radius Rm. In some embodiments, a maximum variation of the minimum transmittance of the block polarization state is in a range of about 0.001 to about 0.003 for R/Rm about 0.6 (e.g., for curve 1723). In some embodiments, a maximum variation of the minimum transmittance of the block polarization state is in a range of about 0.001 to about 0.003 for R/Rm about 0.6 (e.g., for curve 1726).

Another quantity that can be used to characterize a reflective polarizer is the variation in the block polarization state. For example, the relative orientation of the block axis at different locations may be specified and/or the maximum variation of the block polarization state in the region of a reflective polarizer between the center of the reflective polarizer and a radius R from an optical axis passing through a center of the reflective polarizer normal to the reflective polarizer may be specified. The block polarization state or block axis can be described by a direction or orientation in a projection onto a plane perpendicular to the optical axis passing through a center of the reflective polarizer normal to the reflective polarizer. The angular variation in this direction is the variation of the block polarization state and can be expressed in degrees. The block axis may be determined for light parallel to an axis passing through and normal to a center of the reflective polarizer with the reflective polarizer convex towards the incident light.

Figure 18:
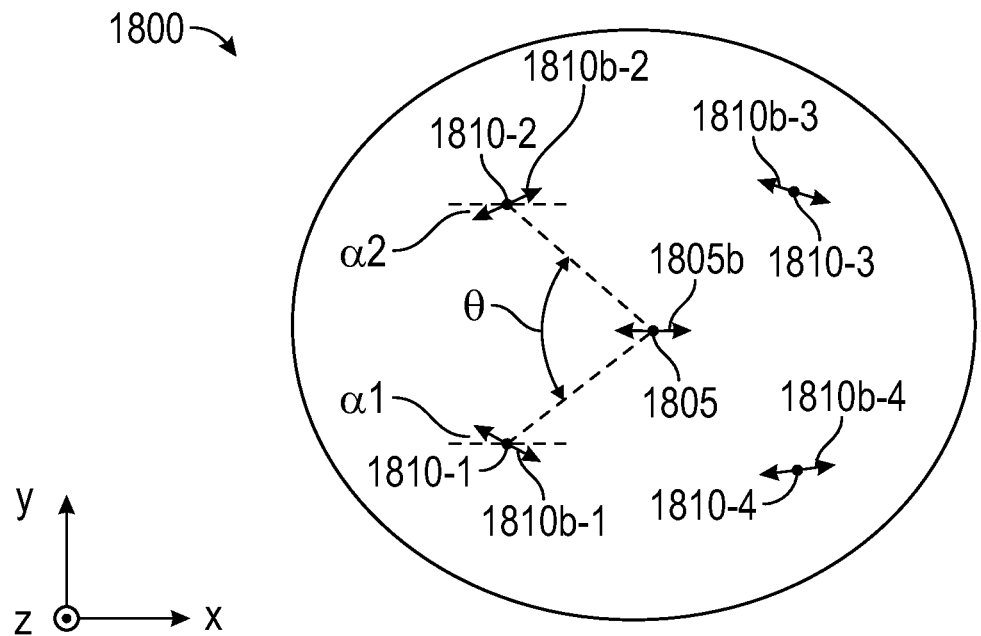
FIGS. 18-19 are schematic front plan views of reflective polarizers illustrating possible variations of the block polarization state.

FIG. 18 is a schematic front plan view of a reflective polarizer 1800 illustrating a possible variation of the block polarization state. A center 1805 of the reflective polarizer 1800 has a block polarization state characterized by the block axis 1805b. Locations 1810-1, 1810-2, 1810-3 and 1810-4 have block polarization states characterized by the block axes 1810b-1, 1810b-2, 1810b-3 and 1810b-4, respectively. The variation of the block axes can be quantified by the angle between the block axes and the block axis 1805b at the center 1805 as determined in projection onto a plane (x-y plane) orthogonal to an axis passing through the center 1805 normal to the reflective polarizer 1800. This plane may be taken to be the plane tangent to the reflective polarizer 1800 at the center 1805. Angles α1 and α2 of the block axes 1810b-1 and 1810b-2 are illustrated. A clockwise rotation relative to the block axis 1805b can be taken to be positive so that α1 is positive and α2 is negative in the illustrated embodiment. Locations 1910-1, 1910-2, 1910-3 and 1910-4 may be edge locations (closer to an edge of the reflective polarizer 1800 than to the center 1805). The first and second locations 1810-1 and 1810-2 subtend an angle θ, which may be in a range from about 70 degrees to about 110 degrees, at the center 1805 of the reflective polarizer 1800. The third and fourth locations 1810-3 and 1810-4, and/or the second and third locations 1810-2 and 1810-3, and/or the first and fourth locations 1810-1 and 1810-4 may similarly subtend an angle in a range from about 70 degrees to about 110 degrees at the center 1805 of the reflective polarizer.

Figure 19:
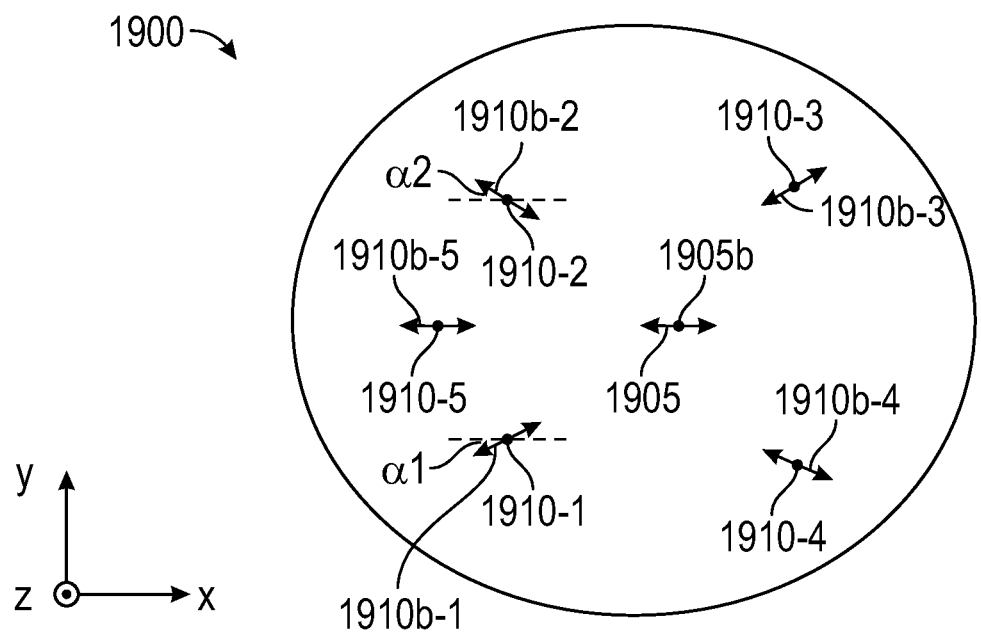

FIG. 19 is a schematic front plan view of a reflective polarizer 1900 illustrating another possible variation of the block polarization state. A center 1905 of the reflective polarizer 1900 has a block polarization state characterized by the block axis 1905b. Locations 1910-1, 1910-2, 1910-3, 1910-4, and 1910-5 have block polarization states characterized by the block axes 1910b-1, 1910b-2, 1910b-3, 1910b-4, and 1910b-4, respectively. Angles α1 and α2 of the block axes 1910b-1 and 1810b-2 are illustrated. In the embodiment illustrated in FIG. 19 the angles α1 and α2 have the opposite sign from the corresponding angles of the embodiment illustrated in FIG. 18. The embodiment of FIG. 18 is representative of reflective polarizers shaped using a process where the radial stretching is substantially constant and the embodiment of FIG. 19 is representative of reflective polarizers shaped using a process where the circumferential stretching is substantially constant. In some embodiments, at least one layer in the reflective polarizer 1900 is substantially uniaxially oriented at the center 1905 and at location 1910-5 as described further elsewhere herein. Similarly, in some embodiments, at least one layer in the reflective polarizer 1800 is substantially uniaxially oriented at at least one location.

In some embodiments, a block polarization state of at least one first edge location is rotated clockwise from an a block polarization state at the center of the reflective polarizer and a block polarization state of at least one second edge location is rotated counterclockwise from the block polarization state at the center of the reflective polarizer, the at least one first and second locations subtending an angle θ in a range from about 70 degrees to about 110 degrees at the center of the reflective polarizer. In some embodiments, a second location is defined by a clockwise rotation about an optical axis through the center of the reflective polarizer of a first location through the angle θ. For example, location 1810-2 may be defined by a clockwise rotation about an optical axis (parallel to z-axis) through the center 1805 of the reflective polarizer 1800 of the location 1810-1 through the angle θ. In some embodiments, a second location is defined by a counterclockwise rotation about an optical axis through the center of the reflective polarizer of a first location through the angle θ. For example, location 1910-1 may be defined by a counterclockwise rotation about an optical axis (parallel to z-axis) through the center 1905 of the reflective polarizer 1900 of the location 1910-2 through the angle θ.

In some embodiments, the block polarization state of the at least one first edge location is rotated clockwise from the block polarization state at the center of the reflective polarizer by at least 0.2 degrees, or at least 0.5 degrees, or at least 1 degree, or at least 1.5 degrees. In some embodiments, the block polarization state of the at least one first edge location is rotated clockwise from the block polarization state at the center of the reflective polarizer by no more than 4 degrees, or no more than 3.5 degrees, or no more than 3 degrees. In some embodiments, the block polarization state of the at least one second edge location is rotated counterclockwise from the block polarization state at the center of the reflective polarizer by at least 0.2 degrees, or at least 0.5 degrees, or at least 1 degree, or at least 1.5 degrees. In some embodiments, the block polarization state of the at least one second edge location is rotated clockwise from the block polarization state at the center of the reflective polarizer by no more than 4 degrees, or no more than 3.5 degrees, or no more than 3 degrees. In some embodiments, the block polarization state of the at least one first and second edge locations are rotated relative to each other by greater than 2 degrees, or greater than 2.5 degrees. Rotation relative to each other refers to a non-negative rotation unless indicated differently. In some embodiments, the block polarization state of the at least one first and second edge locations are rotated relative to each other by no more than 7 degrees, or no more than 6 degrees, or no more than 5 degrees. In some embodiments, the block polarization state of at least one third and fourth edge locations are rotated relative to each other by less than 2 degrees, or less than 1.5 degrees.

In some embodiments, a block polarization state of at least one third edge location is rotated clockwise from a block polarization state at the center of the reflective polarizer and a block polarization state of at least one fourth edge location is rotated counterclockwise from the block polarization state at the center of the reflective polarizer. For example, block polarization axis 1810b-3 is rotated clockwise from a block polarization axis 1805b at the center 1805 and block polarization axis 1810b-4 is rotated counterclockwise from a block polarization axis 1805b at the center 1805. As another example, block polarization axis 1910b-4 is rotated clockwise from a block polarization axis 1905b at the center 1905 and block polarization axis 1910b-3 is rotated counterclockwise from a block polarization axis 1905b at the center 1905. In some embodiments, the at least one first and third locations subtend an angle in a range from about 160 degrees to about 180 degrees at the center of the reflective polarizer and the at least one second and fourth locations subtending an angle in a range from about 160 degrees to about 180 degrees at the center of the reflective polarizer.

Figure 20:
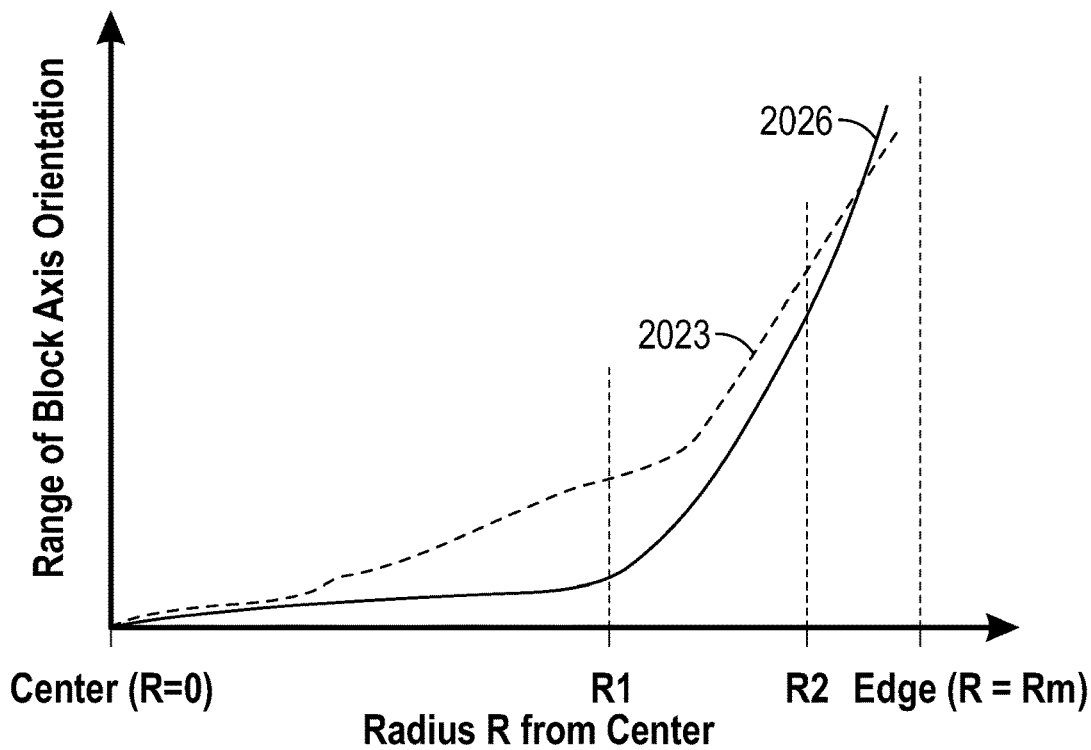
FIG. 20 is a schematic plot of the maximum variation of the block axis orientation in the region of a reflective polarizer between the center of the reflective polarizer and a radius R from an optical axis passing through a center of the reflective polarizer normal to the reflective polarizer.

FIG. 20 is a plot of the maximum variation of the block axis in the region of a reflective polarizer between the center of the reflective polarizer and a radius R from an optical axis passing through a center of the reflective polarizer normal to the reflective polarizer. Curve 2026 is the maximum variation of the block polarization state within a region having a radius R (see, e.g., region 1627 depicted in FIG. 16) for a reflective polarizer formed into a curved shape using a process where the circumferential stretching of the film is substantially constant. Curve 2023 is the maximum variation of the block polarization state within a region having a radius R for a reflective polarizer formed into a curved shape using a process where the radial stretching of the film is substantially constant. In some embodiments, a maximum variation of the block polarization state is: less than about 1 degree for R less than R1, and greater than about 2 degrees for R greater than R2, where R1 is at least 0.4 Rm and R2 is greater than R1 and no more than 0.95 Rm, or no more than 0.9 Rm. In some embodiments, R1 is about 0.45 Rm and R2 is about 0.7 Rm. In some embodiments, the maximum variation is greater than about 3 degrees for R greater than 0.75 Rm. In some embodiments, the maximum variation is greater than about 3.5 degrees for R greater than 0.85 Rm. In some embodiments, R1 is about 18 mm, R2 is about 28 mm, and Rm is about 41.5 mm. In some embodiments, the maximum variation for R equal to Rm is no more than 7 degrees, or no more than 6 degrees, or no more than 5 degrees.

In some embodiments, a reflective polarizer has a maximum variation in the block polarization state that is less than about 1 degree, or less than about 0.8 degrees, or less than about 0.6 degrees, or less than about 0.5 degrees, or less than about 0.4 degrees, or less than about 0.3 degrees over a region of the reflective polarizer within a radius R from an optical axis of the reflective polarizer where R is less than 0.8 Rm, or less than 0.9 Rm, or less than or equal to Rm. This can be achieved, for example, by cutting out a portion of the reflective polarizer near the center of the reflective polarizer (e.g., the portion of the reflective polarizer 2026 within a radius of R1 from the center of the reflective polarizer). In some embodiments, the reflective polarizer or the cut out portion of the reflective polarizer has a maximums sag to diameter ratio of about 0.1 or greater, or about 0.15 or greater, or about 0.18 or greater.

Figure 21:
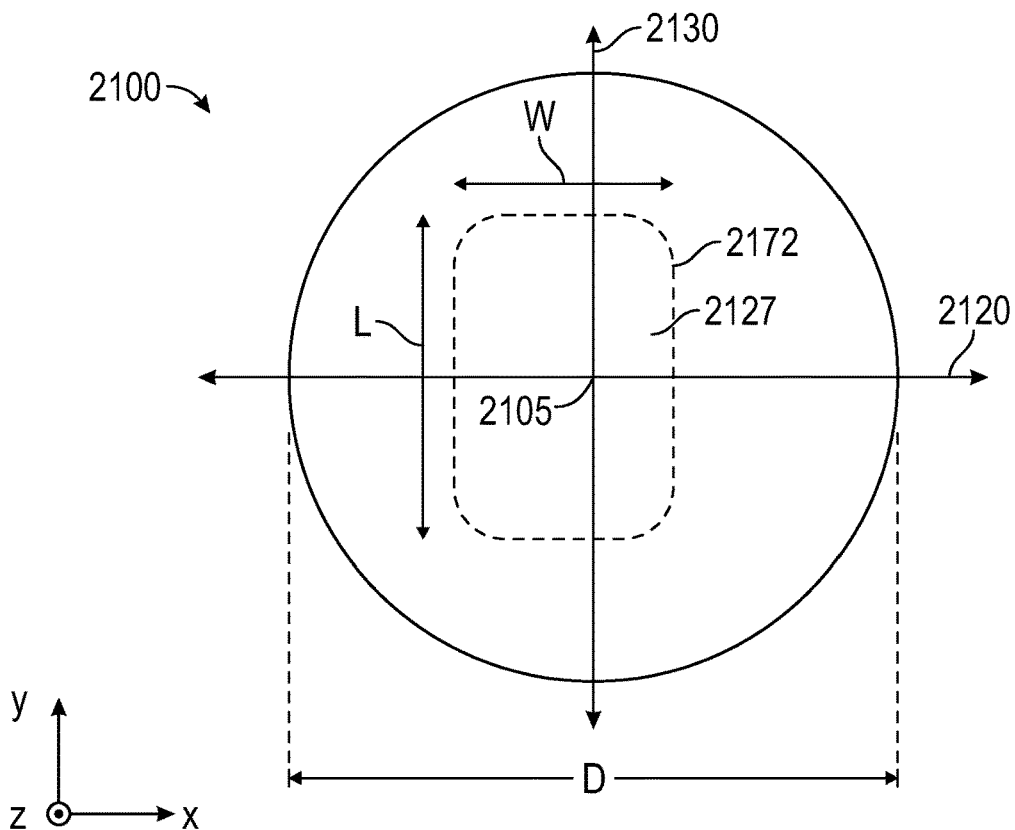
FIGS. 21-22 schematically illustrate possible patterns for the maximum transmittance (Tmax) for reflective polarizers in front plan view.
Figure 22:
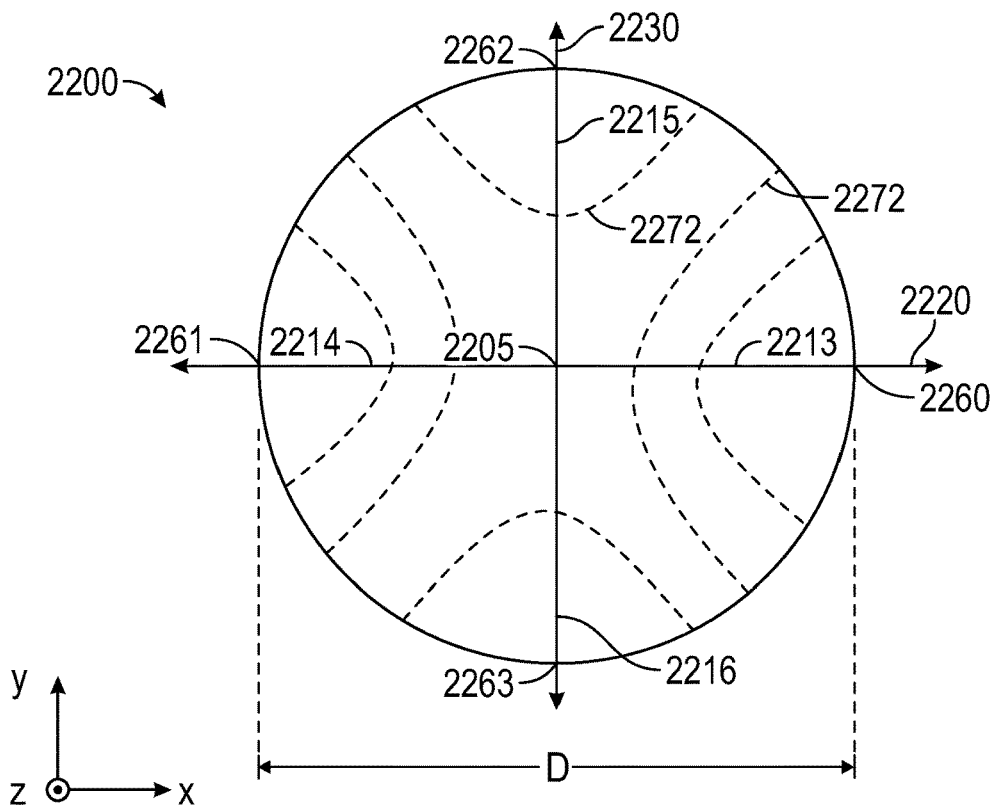

FIGS. 21-22 schematically illustrate possible patterns for the maximum transmittance (Tmax), which occurs for the pass polarization state, at a predetermined wavelength for reflective polarizers according to some embodiments of the present description. The illustrated Tmax may be determined for light parallel to the z-axis, of for normally incident light, with the reflective polarizer convex towards the incident light. The embodiment of FIG. 21 is representative of reflective polarizers shaped using a process where the circumferential stretching is substantially constant and the embodiment of FIG. 22 is representative of reflective polarizers shaped using a process where the radial stretching is substantially constant according to some embodiments.

FIG. 21 is a schematic illustration of the maximum transmittance of the pass polarization state at a predetermined wavelength for a reflective polarizer 2100 according to some embodiments of the present description. A contour 2172 of constant Tmax having a substantially rectangular shape and substantially centered on the center 2105 of the reflective polarizer 2100 is illustrated. A substantially rectangular shape generally has a length and a width with the width less than or equal to the length. A substantially rectangular shape is a rectangle or approximately rectangular shape that may have rounded corners and/or curved sides with a radius of curvature of the side being at least 5 times a length of the side and a radius of curvature of the rounded corners being no more than ⅕ a width of the rectangle. The substantially rectangular shape is substantially centered on a center of the reflective polarizer if a distance between the center of the reflective polarizer and a center of the substantially rectangular shape is no more than ⅕ the width of the rectangle. In some embodiments, the maximum transmittance for the pass polarization state at each of at least 70%, or at least 80%, or at least 90%, or 100% of locations in the region 2127 within the contour 2172 is within 2%, or within 1.5%, or within 1.0% of the maximum transmittance for the pass polarization state at the center 2105 of the reflective polarizer 2100. For example, the center 2105 may have a maximum transmittance of 0.90 and each location in the region 2127 may have a maximum transmittance in the range of 0.89 to 0.91 so that each location in the region 2127 has a maximum transmittance within 1.11% (0.01/0.90*100%) of the maximum transmittance for the pass polarization state at the center 2105 of the reflective polarizer 2100.

At least a specified percentage of locations in a region have a property if the property is satisfied throughout an area of at least the specified percentage of the total area of the region. For example, the maximum transmittance for the pass polarization state throughout the region can be determined by measuring the maximum transmittance at a sufficient number of points in the region to determine the maximum transmittance throughout the region by interpolation between the points where the maximum transmittance is measured. If the maximum transmittance determined in this way is within 1 percent of the maximum transmittance at the center point for an area (continuous or discontinuous) of at least 70% of a total area of a region, the maximum transmittance is within 1 percent of the maximum transmittance at the center point for at least 70% of locations in the region, for example.

In some embodiments, the maximum transmittance for the pass polarization state for at least a majority, or at least 60%, or at least 70%, or at least 80% of locations of the reflective polarizer 2100 outside region 2127 is at least 1% lower, or at least 1.5%, or at least 2% lower than the maximum transmittance for the pass polarization state at the center 2105 of the reflective polarizer 2100.

In some embodiments, the block axis at the center 2105 of the reflective polarizer 2100 is along the second axis 2130. In some embodiments, the region 2127 has a length L substantially parallel to the block polarization state of at least half of a largest lateral dimension D of the reflective polarizer 2100. In some embodiments, the rectangular region 2127 has a width W substantially parallel to the pass polarization state of at least 25% of the largest lateral dimension D of the reflective polarizer 2100.

FIG. 22 is a schematic illustration of the maximum transmittance of the pass polarization state at a predetermined wavelength (e.g., about 550 nm) for a reflective polarizer 2200 according to some embodiments of the present description. Contours 2272 of constant Tmax are illustrated. Orthogonal first and second axes 2220 and 2230 intersect each other at a center location 2205 of the reflective polarizer 2200. In some embodiments, the maximum transmittance of the reflective polarizer for the pass polarization state: at the center location 2205 is Tc; at a first edge location 2213 along the first axis 2220 near a first edge 2260 of the reflective polarizer 2200 is T1; at a second edge location 2214 along the first axis 2220 near a second edge 2261, opposite the first edge 2260, of the reflective polarizer 2200 is T2; at a third edge location 2215 along the second axis 2230 near a third edge 2262 of the reflective polarizer is T3; and at a fourth edge location 2216 along the second axis 2230 near a fourth edge 2263, opposite the third edge 2262, of the reflective polarizer 2200 is T4. In some embodiments, Tc is greater than a maximum of T1 and T2, and less than a minimum of T3 and T4.

In some embodiments, Tmax is substantially symmetric under reflection about one or both of the first and second axes 2220 and 2230. In some embodiments, Tmax is substantially symmetric under reflection about one or both planes containing an optical axis parallel to z-axis at center location 2205 and containing one of the first and second axes 2220 and 2230. In some embodiments, the block axis at the center 2205 of the reflective polarizer 2200 is along the second axis 2230.

The linear diattenuation is given by (Tmax−Tmin)/(Tmax+Tmin). In some embodiments, the spatial variation in the linear diattenuation is dominated by the spatial variation in Tmin. Contour plots of the linear diattenuation may appear similar to contour plots of Tmin with regions of relatively high Tmin corresponding to regions of relatively low linear diattenuation and regions of relatively low Tmin corresponding to regions of relatively high linear diattenuation. In some embodiments, for a region of the reflective polarizer within a radius R from an optical axis passing through a center of the reflective polarizer normal to the reflective polarizer, the linear diattenuation is no less than about 0.98, or no less than about 0.985, or no less than 0.99 when R is at least about 0.4 Rm, or at least about 0.5 Rm, or at least about 0.6 Rm, or in a range of 0.4 to 0.7 times Rm. In some embodiments, for a region of the reflective polarizer within a radius R from an optical axis passing through a center of the reflective polarizer normal to the reflective polarizer, the maximum variation in the linear diattenuation is no more than about 0.015, or no more than about 0.01, or no more than about 0.008 when R is at least about 0.4 Rm, or at least about 0.5 Rm, or at least about 0.6 Rm, or in a range of 0.4 to 0.7 times Rm.

Figure 23:
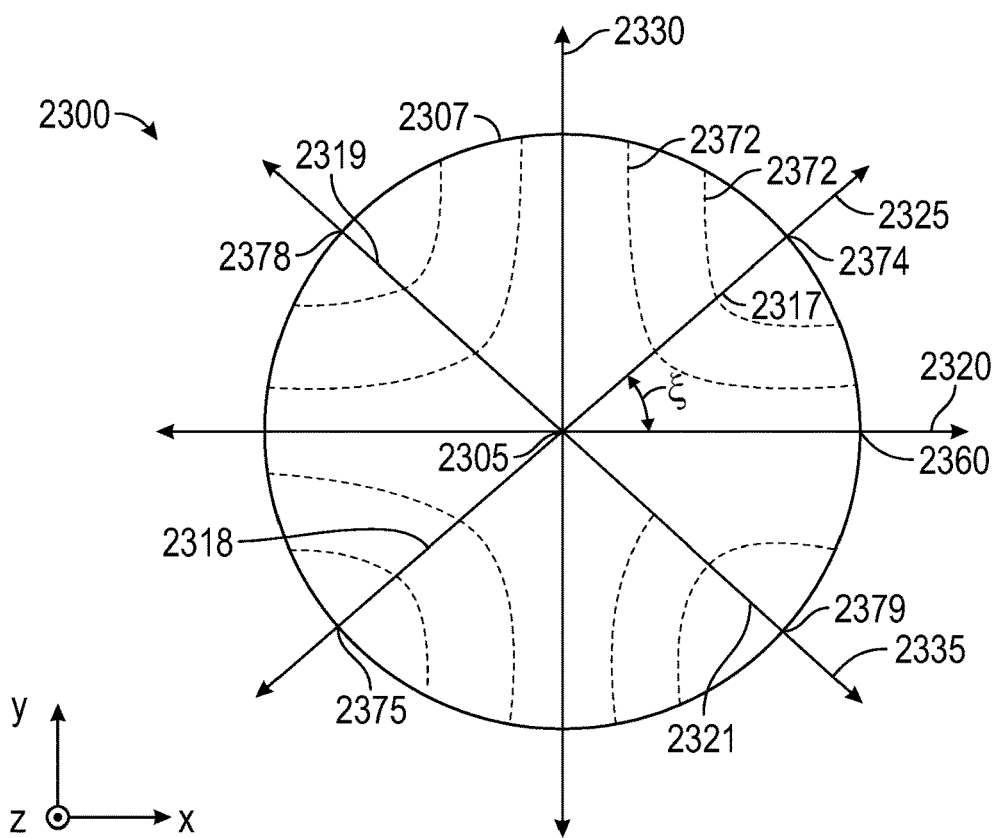
FIG. 23 is a schematic illustration of the circular diattenuation at a predetermined wavelength for a reflective polarizer in front plan view.

FIG. 23 is a schematic illustration the circular diattenuation at a predetermined wavelength for a reflective polarizer 2300 according to some embodiments of the present description. Circular diattenuation refers to $(T_R-T_L)/(T_R+T_L)$ where $T_R$ and $T_L$ are the transmittances for incident light that is right and left circularly polarized, respectively. The illustrated circular diattenuation may be determined for light parallel to the z-axis, or for normally incident light, with the reflective polarizer convex towards the incident light. Contours 2372 of constant circular diattenuation are shown. It has been found that the illustrated contours 2372 are characteristic of reflective polarizer films formed into a curved shape using a process in which the circumferential stretching is substantially constant according to some embodiments.

Orthogonal first and second axes 2325 and 2335 intersecting each other at a center location 2305 of the reflective polarizer 2300 and orthogonal third and fourth axes 2320 and 2330 intersecting each other at the center location 2305 of the reflective polarizer 2300 are illustrated. In the illustrated embodiment, the block state at the center location 2305 is along the fourth axis 2330. An angle ξ between the first and third axes 2325 and 2320 is about 45 degrees. In some embodiments, the circular diaatentuation is near zero and approximately constant along the third and fourth axes 2320 and 2330; is generally decreasing away from the center location 2305 along each direction along the first axis 2325; and is generally increasing away from the center location 2305 along each direction along the second axis 2335. In some embodiments, the circular diattenuation of the reflective polarizer 2300: at the center location is CDc; at a first edge location 2317 along the first axis 2325 near a first edge 2374 of the reflective polarizer is CD1; at a second edge location 2318 along the first axis 2325 near a second 2375 edge, opposite the first edge 2374, of the reflective polarizer 2300 is CD2; at a third edge location 2319 along the second axis 2335 near a third edge 2378 of the reflective polarizer is CD3; and at a fourth edge location 2321 along the second axis 2335 near a fourth 2379 edge, opposite the third edge, of the reflective polarizer is CD4. In some embodiments, Tc is less than a minimum of CD3 and CD4, and greater than a maximum of CD1 and CD2. In some embodiments, each of CD1 and CD2 are negative and each of CD3 and CD4 are positive.

In some embodiments, the circular diattenuation is substantially symmetric under reflection about the first axis 2325. In some embodiments, the circular diattenuation is substantially symmetric under reflection about the second axis 2335. In some embodiments, the circular diattenuation is substantially symmetric under reflections about each of the first and second axes 2325 and 2335. In some embodiments, the circular diattenuation is substantially antisymmetric under reflection about the third axis 2320. In some embodiments, the circular diattenuation is substantially antisymmetric under reflection about the fourth axis 2330. In some embodiments, the circular diattenuation is substantially antisymmetric under reflection about each of the third and fourth axes 2320 and 2330.

Figure 24:
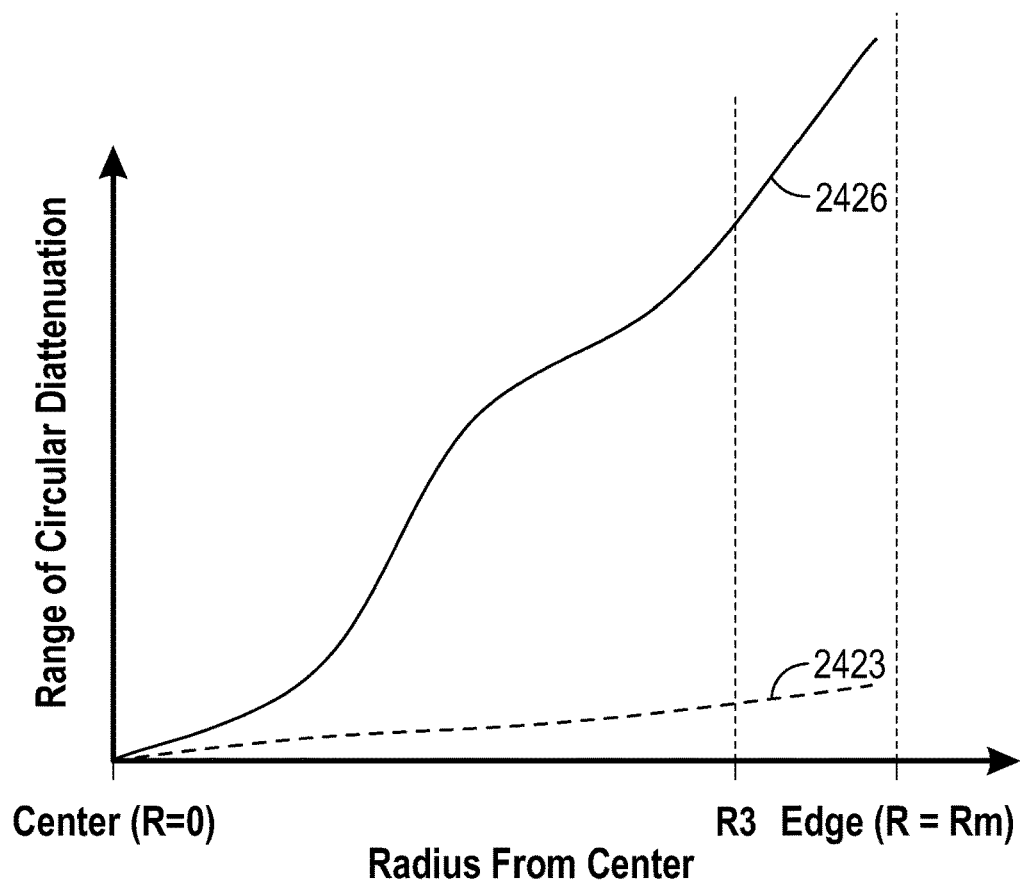
FIG. 24 is a schematic plot of the maximum variation of the circular diattenuation of a region of a reflective polarizer between the center of the reflective polarizer and a radius R from an optical axis passing through a center of the reflective polarizer normal to the reflective polarizer.

FIG. 24 is a schematic plot of the maximum variation of the circular diattenuation of a region of a reflective polarizer between the center of the reflective polarizer and a radius R from an optical axis passing through a center of the reflective polarizer normal to the reflective polarizer. Curve 2426 is the maximum variation of the circular diattenuation within a region having a radius R (see, e.g., region 1627 depicted in FIG. 16) for a reflective polarizer formed into a curved shape using a process where the circumferential stretching of the film is substantially constant. Curve 2423 is the maximum variation of the circular diattenuation within a region having a radius R for a reflective polarizer formed into a curved shape using a process where the radial stretching of the film is substantially constant. A region of the reflective polarizer can be defined in terms of an area of the region of the reflective polarizer rather than a radius R. The region may or may not be circular and may or may not be centered on the center of the reflective polarizer.

In some embodiments, a region of the reflective polarizer having an area less than or equal to a total area of the reflective polarizer has a maximum variation of a circular diattenuation that is at least 0.04, or at least 0.06, or at least 0.07, or at least 0.08, or at least 0.09. In some embodiments, the maximum variation of the circular diattenuation is no more than 0.15, or no more than 0.12 where the area of the region is equal to the total area of the reflective polarizer. For example, a reflective polarizer may have a maximum variation in circular diattenuation as shown in curve 2426 and a region within a radius R3, which may have an area greater than half a total area of the reflective polarizer, may have a maximum variation of a circular diattenuation of at least 0.04. In some embodiments, the area of the region is about 0.3 times the total area and the maximum variation is at least 0.06. In some embodiments, the area of the region is about 0.5 times the total area and the maximum variation is at least 0.07. In some embodiments, the area of the region is total area and the maximum variation is at least 0.09.

In some embodiments, a region of the reflective polarizer having an area greater than half of a total area of the reflective polarizer has a maximum variation of a circular diattenuation that is no more than 0.015, or no more than 0.01, or no more than 0.008, or no more than 0.006. For example, a reflective polarizer may have a maximum variation in circular diattenuation as shown in curve 2423 and a region within a radius R3, which may have an area greater than half a total area of the reflective polarizer, may have a maximum variation of a circular diattenuation of no more than 0.015. In some embodiments, a maximum absolute value of the circular diattenuation in the region is no more than 0.007, or no more than 0.005, or no more than 0.004, or no more than 0.003. In some embodiments, the maximum circular diattenuation is about equal to the negative of the minimum circular diattenuation and the maximum absolute value of the circular diattenuation is about half of the maximum variation of a circular diattenuation. In some embodiments, the area of the region is at least 70 percent, or at least 80%, of the total area of the reflective polarizer. In some embodiments, the area of the region is the total area of the reflective polarizer and the maximum variation of the circular diattenuation or the maximum absolute value of the circular diattenuation is in any of the respective above ranges. In some embodiments, the area of the region is the total area of the reflective polarizer and the maximum variation of the circular diattenuation is no more than 0.01. In some embodiments, the area of the region is the total area of the reflective polarizer and the maximum absolute value of the circular diattenuation is no more than 0.005.

In some embodiments, the range of the circular diattenuation for reflective polarizers formed in a process where the circumferential stretching is substantially constant is substantially greater than that of the unformed film. In some embodiments, the range of the circular diattenuation for reflective polarizers formed in a process where the radial stretching is substantially constant is substantially the same as that of the unformed film.

In some embodiments, a reflective polarizer of the present description is used in an optical stack including the reflective polarizer and at least one non-adhesive flexible optical layer bonded to the reflective polarizer. In some embodiments, an optical system includes the optical stack bonded to and conforming to a curved first major surface of an optical element. The optical system may further include a partial reflector adjacent to and spaced apart from the reflective polarizer and may include a retarder disposed between the reflective polarizer and the partial reflector. In some embodiments, an optical system includes a reflective polarizer of the present description (with or without a non-adhesive flexible optical layer) and further includes a partial reflector adjacent to and spaced apart from the reflective polarizer and may include a retarder disposed between the reflective polarizer and the partial reflector.

Any of the reflective polarizers described herein may have a shape characterized by a best-fit spherical radius of curvature. The best-fit spherical radius of curvature of a surface is the radius of a sphere that minimizes the squared distance along a normal to the sphere from the sphere to the surface. The best-fit spherical radius of curvature can be determined using conventional least squares fitting techniques. The best-fit spherical radius of curvature of an optical film such as a reflective polarizer film is the best-fit spherical radius of curvature of a major surface of the film. In some embodiments, the reflective polarizer has a best-fit spherical radius of curvature of at least 6 mm, or at least 10 mm, or at least 15 mm, or at least 20 mm, or at least 25 mm, or at least 30 mm. In some embodiments, the reflective polarizer has a best-fit spherical radius of curvature of no more than 1000 mm, or no more than 500 mm, or no more than 250 mm, or no more than 200 mm, or no more than 150 mm.

Figure 25:
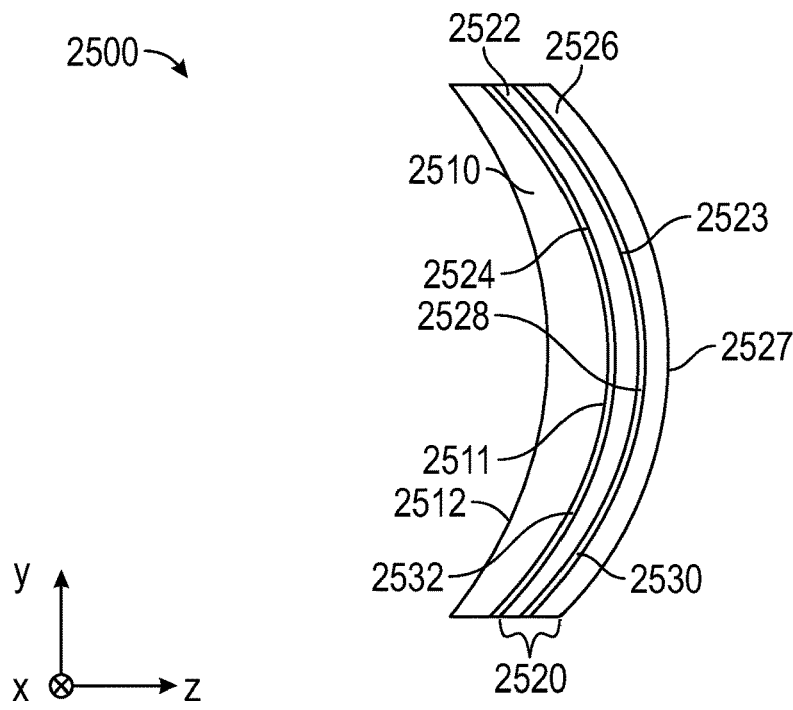
FIGS. 25-26 are schematic cross-sectional views of optical systems.

FIG. 25 is a schematic cross-sectional view of an optical system 2500 including a first optical element 2510 having a curved first major surface 2511 and an opposing second major surface 2512; and an optical stack 2520 bonded and conforming to the curved first major surface 2511 of the first optical element 2510. In some embodiments, the optical stack 2520 is bonded to the optical element 2510 through an optional adhesive layer 2532. In some embodiments, the optical stack 2520 is bonded to the optical element 2510 by virtue of the optical element 2510 being integrally formed on the optical stack 2520 by an insert molding process, for example, and optional adhesive layer 2532 is omitted. The optical stack 2520 includes first and second layers 2522 and 2526. The first layer 2522 has opposing first and second major surfaces 2523 and 2524, and the second layer 2526 has opposing first and second major surfaces 2527 and 2528. In some embodiments, the first and second layers 2522 and 2526 are bonded to each other through an optional adhesive layer 2530. In some embodiments, the first and second layers 2522 and 2526 are bonded to each other by virtue of being integrally formed with each other and optional adhesive layer 2530 is omitted.

In some embodiments, first layer 2522 is a reflective polarizer of the present description; and second layer 2526 is a non-adhesive flexible optical layer bonded to the reflective polarizer and having substantially parallel opposing first and second major surfaces 2527 and 2528. In some embodiments, second layer 2526 is a reflective polarizer of the present description; and first layer 2522 is a non-adhesive flexible optical layer bonded to the reflective polarizer and having substantially parallel opposing first and second major surfaces 2523 and 2524.

The non-adhesive flexible optical layer can be or include one or more of a polymeric film, an anti-reflective coating, an absorbing polarizer, a neutral-density filter, a retarder, a dyed film, an optical filter, a film containing electrical circuits, electrodes, infrared reflecting film, a multilayer optical film, and a diffuser, for example. In some embodiments, the non-adhesive flexible optical layer is an optically clear film substrate such as polyethylene terephthalate (PET) or polyethylene naphthalate (PEN) or polymethylmethacrylate (PMMA). A film or adhesive layer may be described as optically clear if it has a transmittance of unpolarized normally incident light in a predetermined wavelength range (e.g., 400 nm to 700 nm) of at least 80 percent and has a haze of less than 20 percent. In some embodiments, the non-adhesive flexible optical layer is an optically clear film having a transmittance of unpolarized normally incident light in a wavelength range of 400 nm to 700 nm of at least 85 percent and has a haze of less than 10 percent. In some embodiments, the non-adhesive flexible optical layer is a dyed film and/or an optical filter and is used to adjust some aspect (e.g., color or intensity) of transmitted light. For example, a neutral-density filter can be included to reduce intensity of all visible light transmitted through the filter. Electrical circuits can be used to control display elements or touch sensitive elements, for example. Electrodes may be included for darkening liquid crystal display elements, for example.

In some embodiments, at least one location of the non-adhesive flexible optical layer has an optical retardance of less than about 100 nm, or less than about 80 nm, or less than about 60 nm, or less than about 40 nm, or less than about 30 nm, or less than about 20 nm, or less than about 10 nm, or less than about 5 nm. In some embodiments, at least one location of the non-adhesive flexible optical layer has an optical retardance of greater than about 200 nm, or greater than about 400 nm, or greater than about 800 nm, or greater than about 1000 nm, or greater than about 2000 nm, or greater than about 3000 nm, or greater than about 4000 nm. The optical retardance at a location of a layer is the phase retardance of a light ray transmitted through the layer that is normally incident on the layer at the location. If the layer is a polarizer, the phase retardance is determined for normally incident light having the pass polarization state of the polarizer. The wavelength of the incident light ray is about 550 nm unless specified differently. The retardance may vary with location due to ordinary manufacturing variations, for example. In some embodiments, each location of the non-adhesive flexible optical layer has an optical retardance in one of the ranges described above for at least one location.

In some embodiments, optical element 2510 is an optical lens and optical system 2500 is a lens assembly. In some embodiments. the optical lens has optical power in at least one direction. For example, the optical lens may be a cylindrical lens having optical power in the y-direction, referring to the x-y-z coordinate system of FIG. 25. As another example, the optical lens may be curved in two mutually orthogonal direction (e.g., x- and y-directions) and may have optical power in two mutually orthogonal directions (e.g., x- and y-directions). In some embodiments, the optical lens has a substantially planar surface (e.g., second major surface 2512 may be planar).

Figure 26:
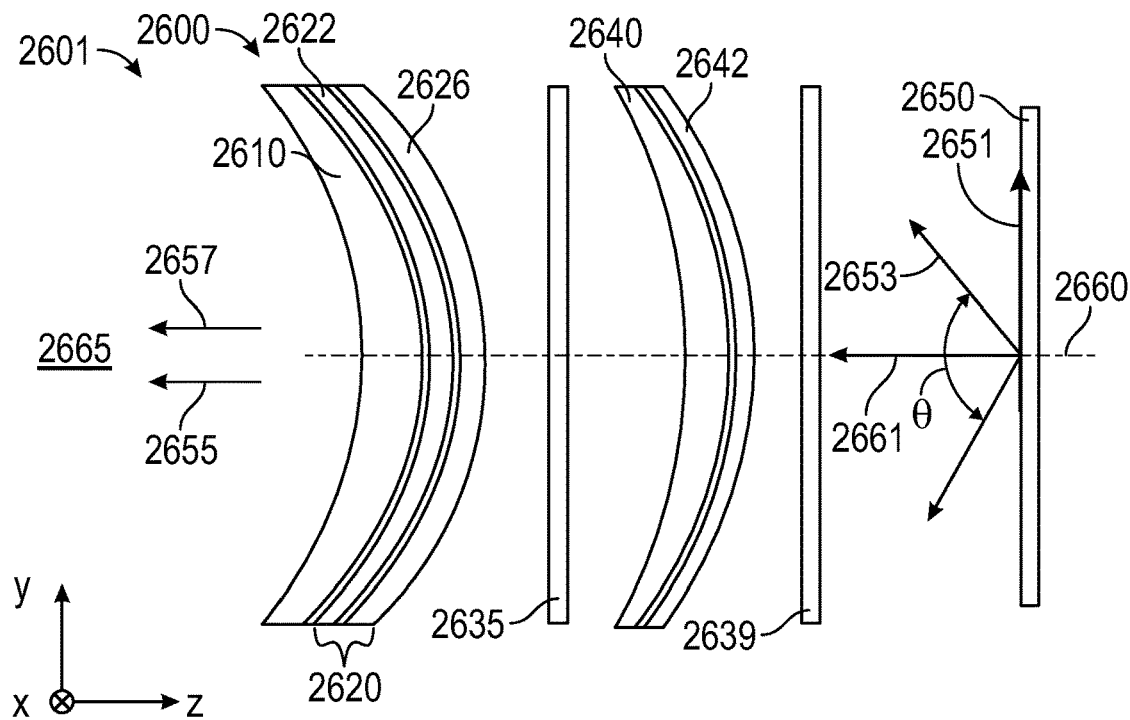

FIG. 26 is a schematic cross-sectional view of an optical system 2601 which includes a lens assembly 2600. Lens assembly 2600 may correspond to optical component 2500 and includes a first lens 2610 and an optical stack 2620 disposed on and conforming to a curved major surface of the first lens 2610. The optical stack 2620 includes first layer 2622 and second layer 2626. Optional adhesive layers may be disposed between the first and second layers 2622 and 2626 and/or between the optical stack 2620 and the first lens 2610. In some embodiments, one of the first and second layers 2622 and 2626 is a reflective polarizer of the present description and the other of the first and second layers 2622 and 2626 is a non-adhesive flexible optical layer. Optical system 2601 further includes a retarder 2635, a retarder 2639, a second lens 2640 having a partial reflector 2642 disposed on a major surface of the second lens 2640. In some embodiments, the optical system 2601 is adapted for displaying an image emitted by a display 2650 to a viewing position 2665.

Any of the adhesive layers may have an average thickness from about 1 micrometer to about 50 micrometers. The adhesive layer may be or include one or more of a pressure sensitive adhesive, a hot melt adhesive, a thermoset adhesive, a solvent based adhesive, and a water based adhesive, for example. In some embodiments, the adhesive layer is substantially index matched to an immediately adjacent layer. In some embodiments, the adhesive layer is an optically clear adhesive layer. Suitable optically clear adhesives include those available from 3M Company (e.g., 3M Optically Clear Adhesive 8171 and 8172, which are 1 mil and 2 mil thick, respectively) and Norland Optical Adhesives available from Norland Products Inc. (Cranbury, NJ), for example.

In some embodiments, the non-adhesive flexible optical layer has substantially parallel first and second major surfaces. The first and second major surfaces of a non-adhesive flexible optical layer may be described as substantially parallel if the major surfaces are sufficiently close to parallel that the non-adhesive flexible optical layer has negligible refractive optical power or if the slopes at each of pair of opposing points over at least 80% of the first and second major surfaces differ by no more than 30 degrees. In some embodiments, the slopes of each pair of opposing points over at least 80%, or at least 85%, or at least 90% of the first and second major surfaces differ by no more than 20 degrees or by no more than 30 degrees. The opposing points refer to points along a line along the thickness direction of the non-adhesive flexible optical layer where the line is normal to at least one of the first and second major surfaces.

In some embodiments, the first lens 2610 and the first optical stack 2620 are spaced apart from the second lens 2640. In some embodiments, first lens 2610 is a first optical element having substantially non-parallel first and second major surfaces, and second lens 2640 is a second optical element having substantially non-parallel first and second major surfaces. The first and second major surfaces of a lens may be described as substantially non-parallel if the major surfaces are sufficiently different that the lens has non-negligible refractive optical power or if the slopes at at least one pair of opposing points on the first and second major surfaces differ by at least 10 degrees. In some embodiments, the slopes at at least one pair of opposing points on the first and second major surfaces differ by at least 20 degrees or at least 30 degrees. The opposing points refer to points along a line along the thickness direction of the lens where the line is normal to one of the first and second major surfaces. First and second major surfaces of a prism are substantially non-parallel if an angle between the surfaces is at least about 20 degrees.

Other configurations of the optical system 2601 are possible. In some embodiments, the retarder 2635 can be disposed on the optical stack 2620 opposite the first lens 2610 or can be disposed on the second lens 2640 opposite the partial reflector 2642. In some embodiments, the retarder 2639 can be disposed on the partial reflector 2642 or can be disposed on the display 2650. In some embodiments, the first and second lens 2610 and 2640 are replaced with a single lens (e.g., with the partial reflector 2642 on one major surface and the optical stack 2620 on the opposing major surface). In still other embodiments, more than two lenses are included. Other possible arrangements for an optical system are described in U.S. Pat. Appl. Pub. No. 2017/0068100 (Ouderkirk et al.). The optical stack 2620 can be used in place of the reflective polarizer in any of the embodiments described in U.S. Pat. Appl. Pub. No. 2017/0068100 (Ouderkirk et al.).

In some embodiments, the display 2650 emits light in the block polarization state of the reflective polarizer, and the retarders 2635 and 2639 are disposed such that the light emitted by the display is first incident on the reflective polarizer in the block polarization state. For example, the retarders 2635 and 2639 may have a fast axis oriented at about 90 degrees relative to each other. The retarders 2635 and 2639 may each be quarter-wave retarders at at least one wavelength in the predetermined wavelength range. Other configurations are also possible. For example, the retarders 2635 and 2639 may be quarter wave retarders with their respective fast axes aligned. In this case, the display 2650 may emit light in the pass polarization state of the reflective polarizer such that the light is first incident on the reflective polarizer in the block state.

The retarder 2635 and/or 2639 may be a coating on a substrate or a lens or may be a retarder film and may be formed from any suitable material including, for example, linear photopolymerizable polymer (LPP) materials and the liquid crystal polymer (LCP) materials described in US Pat. App. Pub. Nos. US 2002/0180916 (Schadt et al.), US 2003/028048 (Cherkaoui et al.) and US 2005/0072959 (Moia et al.). Suitable LPP materials include ROP-131 EXP 306 LPP and suitable LCP materials include ROF-5185 EXP 410 LCP, both available from Rolic Technologies, Allschwil, Switzerland. In some embodiments, the retarder 2635 is a quarter-wave retarder at at least one wavelength in a predetermined wavelength range (e.g., 400 nm to 700 nm).

The partial reflector 2642 may be any suitable partial reflector. For example, the partial reflector may be constructed by coating a thin layer of a metal (e.g., silver or aluminum) on a transparent substrate (e.g., a film which may then be adhered to a lens, or the substrate may be a lens). The partial reflector may also be formed by depositing thin-film dielectric coatings onto a surface of a lens substrate, or by depositing a combination of metallic and dielectric coatings on the surface, for example. In some embodiments, the partial reflector has an average optical reflectance and an average optical transmittance at a predetermined wavelength or in a predetermined wavelength range that are each in a range of 20% to 80%, or each in a range of 30% to 70%, or each in a range of 40% to 60%, or each in a range of 45% to 55%. The partial reflector may be a half mirror, for example. The average optical reflectance and average optical transmittance in a predetermined wavelength range refer to the unweighted average over the predetermined wavelength range and over polarizations of the optical reflectance and optical transmittance, respectively, determined at normal incidence unless indicated otherwise. In some embodiments, the partial reflector may be a reflective polarizer or may have a polarization dependent reflectivity. However, it is typically preferred that the normal incidence optical reflectance and optical transmittance are independent or substantially independent of polarization state of the incident light. Such polarization independence can be obtained using substantially isotropic metallic layers and/or dielectric layers, for example.

In some embodiments, each of the first and second lenses 2610 and 2640 has an optical power greater than zero in a least one direction. In some embodiments, the partial reflector 2642 has an average optical reflectance of at least 30% for substantially normally incident light in a predetermined wavelength range. In some embodiments, the reflective polarizer (one of first and second layers 2622 and 2626) substantially transmits light having a first polarization state in the predetermined wavelength range and substantially reflects light having an orthogonal second polarization state in the predetermined wavelength range. The optical system 2601 has an optical axis 2660, which can be understood to be an axis along which a light ray 2661 propagating along the optical axis 2660 passes through the first lens 2610, the second lens 2640, the partial reflector 2642 and the reflective polarizer without being substantially refracted. Without being substantially refracted means that the angle between a light ray incident on a surface and a light ray transmitted through the surface is no more than 15 degrees. In some embodiments, a light ray propagating along the optical axis 2660 passes through the first and second lenses 2610 and 2640, the partial reflector 2642, and the reflective polarizer without being refracted by more than 10 degrees, or more than 5 degrees, or more than 3 degrees, or more than 2 degrees at any major surface of the optical system 2601.

In some embodiments, the optical system 2601 is adapted to receive incident light and transmit a light to a viewer at a viewing position 2665. Light exiting the optical system 2601 is schematically illustrated by first and second light components 2655 and 2657.

It has been found that the optical stacks and reflective polarizers of the present description allow an optical system to achieve a higher polarization contrast than conventional optical systems. In some embodiments, for an incident cone of light 2653 having the second polarization state (block state for the reflective polarizer) and a wavelength in the predetermined wavelength range and centered on the optical axis 2660 with a full cone angle θ from about 100 degrees to about 160 degrees, the incident light exits the optical system having a first light component 2655 having the first polarization state (pass state of the reflective polarizer) and a second light component 2657 having the second polarization state, a ratio of an average intensity of the first light component 2655 to an average intensity of the second light component 2657 greater than about 100, or greater than about 110, or greater than about 120, or greater than about 130.

Any of the reflective polarizers of the present description can be used in any of the optical components and optical systems described in U.S. Prov. Pat. Appl. No. 62/569,942, titled "OPTICAL COMPONENTS AND OPTICAL SYSTEMS", filed on Oct. 9, 2017, and hereby incorporated by reference herein to the extent that it does not contradict the present description.

Any of the optical films can include a release liner on one side of the optical film or a release liner on each of the two opposing sides of the optical film. For example, any of optical films 100, 300 and 400 may include release liner(s). As another example, the layer 1233 of the reflective polarizer 1200 may be a release liner instead of a layer coextruded with interference layers 1234. Release liner(s) may be applied to an optical film prior to forming the optical film into a curved shape to protect the optical film (e.g., so that a surface texture from the mold is not embossed onto the optical film).

A liner that is bonded to an optical film but that can be cleanly removed from the optical film without substantially damaging the optical film may be described as releasably bonded to the optical film and may be described as a release liner. In some embodiments, a liner that is releasably bonded to an optical film can be removed from the optical film with no visible damage to the optical film. A releasably bonded liner may include a substrate with an adhesive layer that bonds strongly to the substrate but weakly to the optical film. For example, a liner may include a thin layer of low tack adhesive applied to a substrate with a surface treated to increase its bond to the adhesive. Other suitable liners include those that electrostatically bond to the optical film as described in U.S. Pat. No. 6,991,695 (Tait et al.), for example. One example of a suitable liner is OCPET NSA33T available from Sun A Kaken Co, Ltd.

Figure 51:
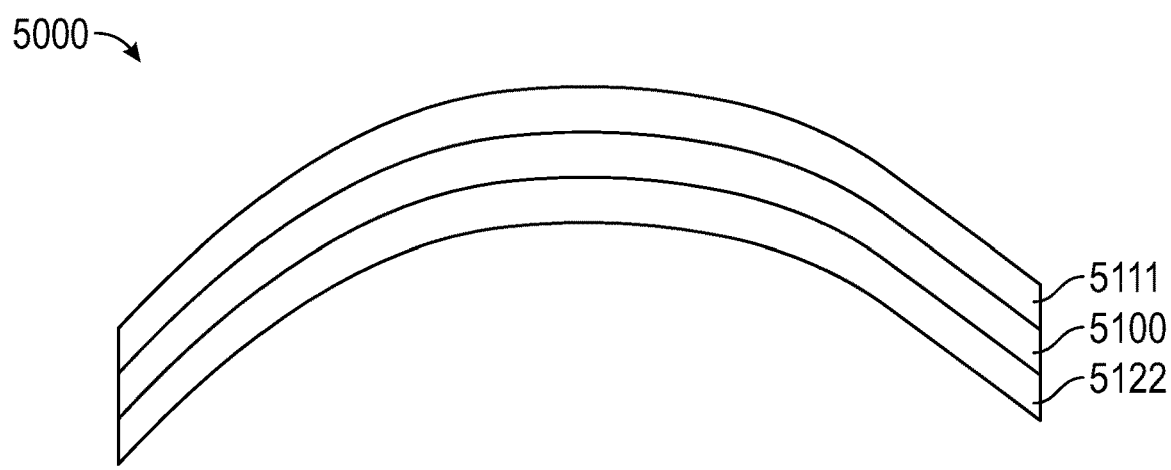
FIG. 51 is a schematic cross-sectional view of an optical stack.

FIG. 51 is a schematic cross-sectional view of optical stack 5000, which may also be described as an optical film, including optical film 5100, which may be a reflective polarizer, and first and second additional layers 5111 and 5122 which conform to the optical film 5100. The optical stack 5000 can be formed into the illustrated curved shape using any of the methods described elsewhere herein. In some embodiments, one of the first and second additional layers 5111 and 5122 is omitted. In some embodiments, one or both of the first and second additional layers 5111 and 5122 are not integrally formed with the optical film 5100. In some embodiments, one or both of the first and second additional layers 5111 and 5122 is a liner conforming to and releasably bonded to the optical film 5100. The optical film 5100 may be any of the reflective polarizers described elsewhere herein, for example.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel.

The following is a list of exemplary embodiments of the present description.

Embodiment 1 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for normally incident light having a predetermined wavelength, each location on the reflective polarizer having a maximum reflectance greater than about 70% for a block polarization state and a maximum transmittance greater than about 70% for an orthogonal pass polarization state, wherein a thickness of the reflective polarizer is at least 5% larger at a center of the reflective polarizer than at at least one edge location, and wherein the thickness of the reflective polarizer substantially monotonically decreases from the center of the reflective polarizer to the at least one edge location.

Embodiment 2 is the reflective polarizer of Embodiment 1 having an azimuthally averaged thickness that is larger at the center of the reflective polarizer than at an edge location in the at least one edge location.

Embodiment 3 is the reflective polarizer of Embodiment 2, wherein the azimuthally averaged thickness substantially monotonically decreases from the center of the reflective polarizer to the edge location.

Embodiment 4 is the reflective polarizer of Embodiment 1, wherein for normally incident light having the block polarization state, the reflective polarizer has a reflection band having a long wavelength band edge, the predetermined wavelength being in the reflection band, the long wavelength band edge being at least 5% larger at the center of the reflective polarizer than at the at least one edge location.

Embodiment 5 is the reflective polarizer of Embodiment 4, wherein an azimuthal average of the long wavelength band edge of the reflective polarizer substantially monotonically decreases from the center of the reflective polarizer to the at least one edge location.

Embodiment 6 is the reflective polarizer of Embodiment 1, wherein for light having the predetermined wavelength and incident on the reflective polarizer along a direction parallel to an axis normal to and passing through the reflective polarizer at the center of the reflective polarizer, each location on the reflective polarizer has a minimum transmittance for the block polarization state less than about 5%.

Embodiment 7 is the reflective polarizer of Embodiment 6, wherein for orthogonal first and second axes intersecting each other at a center location of the reflective polarizer and orthogonal third and fourth axes intersecting each other at the center location of the reflective polarizer, an angle between the first and third axes being about 45 degrees, the minimum transmittance of the reflective polarizer for the block polarization state:
  at a first location along the first axis between the center location and a first edge of the reflective polarizer is T1;
  at a second location along the second axis between the center location and a second edge of the reflective polarizer is T2;
  at a third location along the third axis between the center location and a third edge of the reflective polarizer is T3; and
  at a fourth location along the fourth axis between the center location and a fourth edge of the reflective polarizer is T4,
  wherein a maximum of T1 and T2 is less than a minimum of T3 and T4.

Embodiment 8 is the reflective polarizer of Embodiment 7, wherein the minimum transmittance of the reflective polarizer for the block polarization state:
  at a fifth location along the first axis between the center location and a fifth edge, opposite the first edge, of the reflective polarizer is T5;
  at a sixth location along the second axis between the center location and a sixth edge, opposite the second edge, of the reflective polarizer is T6;
  at a seventh location along the third axis between the center location and a seventh edge, opposite the third edge, of the reflective polarizer is T7; and
  at an eighth location along the fourth axis between the center location and an eighth edge, opposite the fourth edge, of the reflective polarizer is T8,
  wherein a maximum of T1, T2, T5 and T6 is less than a minimum of T3, T4, T7 and T8.

Embodiment 9 is the reflective polarizer of Embodiment 8, wherein a region of the reflective polarizer within a radius R from an optical axis passing through a center of the reflective polarizer normal to the reflective polarizer has a maximum variation of the minimum transmittance of the block polarization state that is in a range of about 0.001 to about 0.005,
  wherein the reflective polarizer has a maximum radius Rm from the optical axis and R is in a range of 0.4 to 0.7 times Rm.

Embodiment 10 is the reflective polarizer of Embodiment 1, wherein for light having the predetermined wavelength and normally incident on the reflective polarizer, each location on the reflective polarizer has a minimum transmittance for the block polarization state less than about 5%.

Embodiment 11 is the reflective polarizer of Embodiment 10, wherein for orthogonal first and second axes intersecting each other at a center location of the reflective polarizer and orthogonal third and fourth axes intersecting each other at the center location of the reflective polarizer, an angle between the first and third axes being about 45 degrees, the minimum transmittance of the reflective polarizer for the block polarization state:
  at a first location along the first axis between the center location and a first edge of the reflective polarizer is T1;
  at a second location along the second axis between the center location and a second edge of the reflective polarizer is T2;
  at a third location along the third axis between the center location and a third edge of the reflective polarizer is T3; and
  at a fourth location along the fourth axis between the center location and a fourth edge of the reflective polarizer is T4,
  wherein a maximum of T1 and T2 is less than a minimum of T3 and T4.

Embodiment 12 is the reflective polarizer of Embodiment 11, wherein the minimum transmittance of the reflective polarizer for the block polarization state:
  at a fifth location along the first axis between the center location and a fifth edge, opposite the first edge, of the reflective polarizer is T5;
  at a sixth location along the second axis between the center location and a sixth edge, opposite the second edge, of the reflective polarizer is T6;
  at a seventh location along the third axis between the center location and a seventh edge, opposite the third edge, of the reflective polarizer is T7; and at an eighth location along the fourth axis between the center location and an eighth edge, opposite the fourth edge, of the reflective polarizer is T8, wherein a maximum of T1, T2, T5 and T6 is less than a minimum of T3, T4, T7 and T8.

Embodiment 13 is the reflective polarizer of Embodiment 10, wherein a region of the reflective polarizer within a radius R from an optical axis passing through a center of the reflective polarizer normal to the reflective polarizer has a maximum variation of the minimum transmittance of the block polarization state that is in a range of about 0.001 to about 0.005, wherein the reflective polarizer has a maximum radius Rm from the optical axis and R is in a range of 0.4 to 0.7 times Rm.

Embodiment 14 is the reflective polarizer of Embodiment 1, wherein a region of the reflective polarizer within a radius R from an optical axis passing through a center of the reflective polarizer normal to the reflective polarizer has a maximum variation of a linear diattenuation of no more than about 0.01, wherein the reflective polarizer has a maximum radius Rm from the optical axis and R is in a range of 0.4 to 0.7 times Rm.

Embodiment 15 is the reflective polarizer of Embodiment 1, wherein a linear diattenuation of the reflective polarizer throughout a region of the reflective polarizer within a radius R from an optical axis passing through a center of the reflective polarizer normal to the reflective polarizer is at least about 0.99, wherein the reflective polarizer has a maximum radius Rm from the optical axis and R is at least 0.4 Rm.

Embodiment 16 is the reflective polarizer of Embodiment 11, wherein in plan view, the maximum transmittance for the pass polarization state at each of at least 70% of locations in a substantially rectangular region substantially centered on the center is within 1.5% of the maximum transmittance for the pass polarization state at the center of the reflective polarizer and the maximum transmittance for the pass polarization state for at least a majority of locations of the reflective polarizer outside the substantially rectangular region is at least 1.5% lower than the maximum transmittance for the pass polarization state at the center of the reflective polarizer.

Embodiment 17 is the reflective polarizer of Embodiment 1, wherein in a projection onto a plane tangent to the reflective polarizer at a center of the reflective polarizer, a block polarization state of at least one first edge location is rotated clockwise from an a block polarization state at the center of the reflective polarizer and a block polarization state of at least one second edge location is rotated counterclockwise from the block polarization state at the center of the reflective polarizer, the at least one first and second edge locations subtending an angle in a range from about 70 degrees to about 110 degrees at the center of the reflective polarizer.

Embodiment 18 is the reflective polarizer of Embodiment 17, wherein the block polarization state of the at least one first edge location is rotated clockwise from the block polarization state at the center of the reflective polarizer by at least 0.2 degrees, or at least 0.5 degrees, or at least 1 degree.

Embodiment 19 is the reflective polarizer of Embodiment 1, wherein in a projection onto a plane tangent to the reflective polarizer at the center of the reflective polarizer, a block polarization state of at least one first and second edge locations are rotated relative to each other by greater than 2 degrees, the at least one first and second locations subtending an angle in a range from about 70 degrees to about 110 degrees at the center of the reflective polarizer.

Embodiment 20 is the reflective polarizer of Embodiment 1, wherein a region of the reflective polarizer within a radius R from an optical axis passing through a center of the reflective polarizer normal to the reflective polarizer has a maximum variation of the block polarization state in a projection onto a plane tangent to the reflective polarizer at the center of the reflective polarizer, that is:

less than about 1 degree for R less than R1; and
greater than about 2 degrees for R greater than R2,
wherein the reflective polarizer has a maximum radius Rm from the optical axis, R1 being at least 0.4 Rm, R2 being greater than R1 and no more than 0.95 Rm.

Embodiment 21 is the reflective polarizer of Embodiment 1, wherein each location on the reflective polarizer has a circular diattenuation for light having the predetermined wavelength and incident on the reflective polarizer along a direction parallel to an axis normal to and passing through the reflective polarizer at the center of the reflective polarizer, such for orthogonal first and second axes intersecting each other at the center of the reflective polarizer, the circular diattenuation of the reflective polarizer:

at the center location is CDc;
at a first edge location along the first axis near a first edge of the reflective polarizer is CD1;
at a second edge location along the first axis near a second edge, opposite the first edge, of the reflective polarizer is CD2;
at a third edge location along the second axis near a third edge of the reflective polarizer is CD3; and
at a fourth edge location along the second axis near a fourth edge, opposite the third edge, of the reflective polarizer is CD4;
wherein CDc is less than a minimum of CD3 and CD4, and greater than a maximum of CD1 and CD1.

Embodiment 22 is the reflective polarizer of Embodiment 1, wherein a region of the reflective polarizer having an area less than or equal to a total area of the reflective polarizer has a maximum variation of a circular diattenuation that is at least 0.04.

Embodiment 23 is the reflective polarizer of Embodiment 1, wherein a region of the reflective polarizer having an area less than or equal to a total area of the reflective polarizer has a maximum absolute value of a circular diattenuation that is at least 0.02.

Embodiment 24 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for normally incident light having a predetermined wavelength, each location on the reflective polarizer having a maximum reflectance greater than about 70% for a block polarization state and a maximum transmittance greater than about 70% for an orthogonal pass polarization state, wherein a thickness of the reflective polarizer is at least 5% smaller at a center of the reflective polarizer than at at least one edge location, and wherein the thickness of the reflective polarizer substantially monotonically increases from the center of the reflective polarizer to the at least one edge location.

Embodiment 25 is the reflective polarizer of Embodiment 24, wherein for normally incident light having the block polarization state, the reflective polarizer has a reflection band having a long wavelength band edge, the predetermined wavelength being in the reflection band, the long wavelength band edge being at least 5% smaller at the center of the reflective polarizer than at the at least one edge location.

Embodiment 26 is the reflective polarizer of Embodiment 25, wherein the long wavelength band edge of the reflective polarizer substantially monotonically increases from the center of the reflective polarizer to the at least one edge location.

Embodiment 27 is the reflective polarizer of Embodiment 25, wherein an azimuthal average of the long wavelength band edge of the reflective polarizer substantially monotonically increases from the center of the reflective polarizer to the at least one edge location.

Embodiment 28 is the reflective polarizer of Embodiment 24, wherein a region of the reflective polarizer within a radius R from an optical axis passing through a center of the reflective polarizer normal to the reflective polarizer has a maximum variation of the minimum transmittance of the block polarization state that is in a range of about 0.001 to about 0.005,
  wherein the reflective polarizer has a maximum radius Rm from the optical axis and R is in a range of 0.4 to 0.7 times Rm.

Embodiment 29 is the reflective polarizer of Embodiment 24, wherein a region of the reflective polarizer within a radius R from an optical axis passing through a center of the reflective polarizer normal to the reflective polarizer has a maximum variation of a linear diattenuation of no more than about 0.01, wherein the reflective polarizer has a maximum radius Rm from the optical axis and R is in a range of 0.4 to 0.7 times Rm.

Embodiment 30 is the reflective polarizer of Embodiment 24, wherein a linear diattenuation of the reflective polarizer throughout a region of the reflective polarizer within a radius R from an optical axis passing through a center of the reflective polarizer normal to the reflective polarizer is at least about 0.99, wherein the reflective polarizer has a maximum radius Rm from the optical axis and R is at least 0.4 Rm.

Embodiment 31 is the reflective polarizer of Embodiment 24, wherein for light having the predetermined wavelength and incident on the reflective polarizer along a direction parallel to an axis normal to and passing through the reflective polarizer at the center of the reflective polarizer, each location on the reflective polarizer has a second minimum transmittance for the pass polarization state greater than about 70%.

Embodiment 32 is the reflective polarizer of Embodiment 31, wherein the second maximum transmittances for the pass polarization state of at least one first and second locations, the at least one first and second locations near an edge of the reflective polarizer, are different from one another by at least 3.8%, the at least one first location and the at least one second location subtending an angle in a range from about 70 degrees to about 110 degrees at the center of the reflective polarizer.

Embodiment 33 is the reflective polarizer of Embodiment 31, wherein for orthogonal first and second axes intersecting each other at the center of the reflective polarizer, the second maximum transmittance of the reflective polarizer for the pass polarization state:
  at the center is Tc;
  at a first edge location along the first axis near a first edge of the reflective polarizer is T1;
  at a second edge location along the first axis near a second edge, opposite the first edge, of the reflective polarizer is T2;
  at a third edge location along the second axis near a third edge of the reflective polarizer is T3; and
  at a fourth edge location along the second axis near a fourth edge, opposite the third edge, of the reflective polarizer is T4;
  wherein Tc is greater than a maximum of T1 and T2, and less than a minimum of T3 and T4.

Embodiment 34 is the reflective polarizer of Embodiment 24, wherein in a projection onto a plane tangent to the reflective polarizer at the center of the reflective polarizer, a block polarization state of at least one first and second edge locations are rotated relative to each other by greater than 2 degrees, the at least one first and second edge locations subtending an angle in a range from about 70 degrees to about 110 degrees at the center of the reflective polarizer.

Embodiment 35 is the reflective polarizer of Embodiment 24, wherein a region of the reflective polarizer within a radius R from an optical axis passing through a center of the reflective polarizer normal to the reflective polarizer has a maximum variation of the block polarization state in a projection onto a plane tangent to the reflective polarizer at the center of the reflective polarizer, that is:
  less than about 1 degree for R less than R1; and
  greater than about 2 degrees for R greater than R2,
  wherein the reflective polarizer has a maximum radius Rm from the optical axis, R1 being at least 0.4 Rm, R2 being greater than R1 and no more than 0.95 Rm.

Embodiment 36 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for normally incident light having a predetermined wavelength in a first reflection band, each location on the reflective polarizer having a maximum reflectance greater than about 70% and a corresponding minimum transmittance less than about 5% for a block polarization state, and a maximum transmittance greater than about 70% for an orthogonal pass polarization state, wherein the first reflection band has a long wavelength band edge that is at least 5% larger at a center of the reflective polarizer than at at least one edge location, and wherein the long wavelength band edge of the reflective polarizer substantially monotonically decreases from the center of the reflective polarizer to the at least one edge location.

Embodiment 37 is the reflective polarizer of Embodiment 36 having an azimuthally averaged long wavelength band edge that is larger at the center of the reflective polarizer than at an edge location in the at least one edge location.

Embodiment 38 is the reflective polarizer of Embodiment 37, wherein the azimuthally averaged long wavelength band edge substantially monotonically decreases from the center of the reflective polarizer to the edge location.

Embodiment 39 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for normally incident light having a predetermined wavelength in a first reflection band, each location on the reflective polarizer having a maximum reflectance greater than about 70% and a corresponding minimum transmittance less than about 5% for a block polarization state, and a maximum transmittance greater than about 70% for an orthogonal pass polarization state, wherein the first reflection band has a long wavelength band edge that is at least 5% smaller at a center of the reflective polarizer than at least one edge location, and wherein the long wavelength band edge of the reflective polarizer substantially monotonically increases from the center of the reflective polarizer to the at least one edge location.

Embodiment 40 is the reflective polarizer of Embodiment 39 having an azimuthally averaged long wavelength band edge that is smaller at the center of the reflective polarizer than at an edge location in the at least one edge location.

Embodiment 41 is the reflective polarizer of Embodiment 40, wherein the azimuthally averaged long wavelength band edge substantially monotonically increases from the center of the reflective polarizer to the edge location.

Embodiment 42 is a curved reflective polarizer comprising a plurality of alternating polymeric interference layers, each polymeric interference layer reflecting or transmitting light primarily by optical interference, at least one location on the curved reflective polarizer having a radius of curvature in a range from about 6 mm to about 1000 mm, wherein for light having a predetermined wavelength and incident on the reflective polarizer along a direction parallel to an axis normal to and passing through the reflective polarizer at a center location, each location on the reflective polarizer has a maximum reflectance greater than about 70% for a block polarization state, a maximum transmittance greater than about 70% for an orthogonal pass polarization state, and a minimum transmittance for the block polarization state, such that for orthogonal first and second axes intersecting each other at a center location of the reflective polarizer and orthogonal third and fourth axes intersecting each other at the center location of the reflective polarizer, an angle between the first and third axes being about 45 degrees, the minimum transmittance of the reflective polarizer for the block polarization state:
- at a first location along the first axis between the center location and a first edge of the reflective polarizer is T1;
- at a second location along the second axis between the center location and a second edge of the reflective polarizer is T2;
- at a third location along the third axis between the center location and a third edge of the reflective polarizer is T3; and
- at a fourth location along the fourth axis between the center location and a fourth edge of the reflective polarizer is T4,
- wherein a maximum of T1 and T2 is less than a minimum of T3 and T4.

Embodiment 43 is the reflective polarizer of Embodiment 42, wherein the minimum transmittance of the reflective polarizer for the block polarization state:
- at a fifth location along the first axis between the center location and a fifth edge, opposite the first edge, of the reflective polarizer is T5;
- at a sixth location along the second axis between the center location and a sixth edge, opposite the second edge, of the reflective polarizer is T6;
- at a seventh location along the third axis between the center location and a seventh edge, opposite the third edge, of the reflective polarizer is T7; and
- at an eighth location along the fourth axis between the center location and an eighth edge, opposite the fourth edge, of the reflective polarizer is T8,
- wherein a maximum of T1, T2, T5 and T6 is less than a minimum of T3, T4, T7 and T8.

Embodiment 44 is the reflective polarizer of Embodiment 42, wherein the minimum transmittance of the reflective polarizer for the block polarization state is substantially symmetric under reflection about each of the first and second axes.

Embodiment 45 is the reflective polarizer of Embodiment 42, wherein the minimum transmittance of the reflective polarizer for the block polarization state is substantially 4-fold rotation symmetric about an optical axis passing through the center location of the reflective polarizer normal to the reflective polarizer.

Embodiment 46 is a curved reflective polarizer comprising a plurality of alternating polymeric interference layers, each polymeric interference layer reflecting or transmitting light primarily by optical interference, at least one location on the curved reflective polarizer having a radius of curvature in a range from about 6 mm to about 1000 mm, for light having a predetermined wavelength and incident on the reflective polarizer along a direction parallel to an axis normal to and passing through the reflective polarizer at a center location, each location on the reflective polarizer having a maximum reflectance greater than about 70% for a block polarization state, a maximum transmittance greater than about 70% for an orthogonal pass polarization state, and a minimum transmittance for the block polarization state, wherein for a continuous first portion of the reflective polarizer extending between different first and second edges of the reflective polarizer, having a minimum width of at least 3% of a largest lateral dimension of the reflective polarizer, and defining disjoint second and third portions of the reflective polarizer, the minimum transmittance of the reflective polarizer for the block polarization state is higher at each location in at least 70% of the first portion than at each location in at least 70% of the second portion and at each location in at least 70% of the third portion.

Embodiment 47 is the reflective polarizer of Embodiment 46, wherein the minimum transmittance of the reflective polarizer for the block polarization state is higher at each location in at least 80% of the first portion than at each location in at least 80% of the second portion and at each location in at least 80% of the third portion.

Embodiment 48 is the reflective polarizer of Embodiment 46, wherein the minimum width of the first portion is at least 5% of the largest lateral dimension of the reflective polarizer.

Embodiment 49 is the reflective polarizer of Embodiment 46, wherein the minimum width of the first portion is no more than 80% of the largest lateral dimension of the reflective polarizer.

Embodiment 50 is a curved reflective polarizer comprising a plurality of polymeric layers, at least one location on the curved reflective polarizer having a radius of curvature in a range from about 6 mm to about 1000 mm, for light having a predetermined wavelength and incident on the reflective polarizer along a direction parallel to an optical axis normal to and passing through the reflective polarizer at a center location, each location on the reflective polarizer having a maximum reflectance greater than about 0.7 for a block polarization state, a maximum transmittance greater than about 0.7 for an orthogonal pass polarization state, and a minimum transmittance for the block polarization state, such that a region of the reflective polarizer within a radius R from the optical axis has a maximum variation of the minimum transmittance of the block polarization state that is in a range of about 0.001 to about 0.005, wherein the reflective polarizer has a maximum radius Rm from the optical axis and R is in a range of 0.4 to 0.7 times Rm.

Embodiment 51 is a curved reflective polarizer comprising a plurality of polymeric layers, at least one location on the curved reflective polarizer having a radius of curvature in a range from about 6 mm to about 1000 mm, for light having a predetermined wavelength and incident on the reflective polarizer along a direction parallel to an axis normal to and passing through the reflective polarizer at a center location, each location on the reflective polarizer having a maximum reflectance greater than about 0.7 for a block polarization state, and a maximum transmittance greater than about 0.7 for an orthogonal pass polarization state, such that the maximum transmittances for the pass polarization state of at least one first and second locations, the at least one first and second locations near an edge of the reflective polarizer, are different from one another by at least 3.8%, the at least one first location and the at least one second location subtending an angle in a range from about 70 degrees to about 110 degrees at the center location.

Embodiment 52 is the reflective polarizer of Embodiment 51, wherein the maximum transmittances for the pass polarization state of the at least one first and second locations are different from one another by no more than 6.0%.

Embodiment 53 is a curved reflective polarizer comprising a plurality of polymeric layers, at least one location on the curved reflective polarizer having a radius of curvature in a range from about 6 mm to about 1000 mm, for light having a predetermined wavelength and incident on the reflective polarizer along a direction parallel to an axis normal to and passing through the reflective polarizer at a center location, each location on the reflective polarizer having a maximum reflectance greater than about 0.7 for a block polarization state, and a maximum transmittance greater than about 0.7 for an orthogonal pass polarization state, such that the maximum transmittances for the pass polarization state of at least one first and second locations, the at least one first location near the center location and the at least one second location near an edge of the reflective polarizer, are different from one another by at least 3.8%.

Embodiment 54 is the reflective polarizer of Embodiment 53, wherein the maximum transmittances for the pass polarization state of the at least one first and second locations are different from one another by no more than 6.0%.

Embodiment 55 is a curved reflective polarizer comprising a plurality of polymeric layers, at least one location on the curved reflective polarizer having a radius of curvature in a range from about 6 mm to about 1000 mm, for light having a predetermined wavelength and incident on the reflective polarizer along a direction parallel to an axis normal to and passing through the reflective polarizer at a center location, each location on the reflective polarizer having a maximum reflectance greater than about 70% for a block polarization state, and a maximum transmittance greater than about 70% for an orthogonal pass polarization state, such that in plan view, the maximum transmittance for the pass polarization state at each of at least 70% of locations in a substantially rectangular region substantially centered on the center is within 1.5% of the maximum transmittance for the pass polarization state at the center of the reflective polarizer and the maximum transmittance for the pass polarization state for at least a majority of locations of the reflective polarizer outside the substantially rectangular region is at least 1.5% lower than the maximum transmittance for the pass polarization state at the center of the reflective polarizer.

Embodiment 56 is the reflective polarizer of Embodiment 55, wherein the substantially rectangular region has a length substantially parallel to the block polarization state of at least half of a largest lateral dimension of the reflective polarizer.

Embodiment 57 is the reflective polarizer of Embodiment 55, wherein the substantially rectangular region has a width substantially parallel to the pass polarization state of at least 25% of a largest lateral dimension of the reflective polarizer.

Embodiment 58 is a curved reflective polarizer comprising a plurality of alternating polymeric interference layers, each polymeric interference layer reflecting or transmitting light primarily by optical interference, at least one location on the curved reflective polarizer having a radius of curvature in a range from about 6 mm to about 1000 mm, for light having a predetermined wavelength, each location on the reflective polarizer having a maximum reflectance greater than about 70% for a block polarization state, a maximum transmittance greater than about 70% for an orthogonal pass polarization state, and a minimum transmittance for the block polarization state, such for orthogonal first and second axes intersecting each other at a center location of the reflective polarizer, the maximum transmittance of the reflective polarizer for the pass polarization state:
  at the center location is Tc;
  at a first edge location along the first axis near a first edge of the reflective polarizer is T1;
  at a second edge location along the first axis near a second edge, opposite the first edge, of the reflective polarizer is T2;
  at a third edge location along the second axis near a third edge of the reflective polarizer is T3; and
  at a fourth edge location along the second axis near a fourth edge, opposite the third edge, of the reflective polarizer is T4;
  wherein Tc is greater than a maximum of T1 and T2, and less than a minimum of T3 and T4.

Embodiment 59 is the curved reflective polarizer of Embodiment 58, wherein the maximum transmittance is substantially symmetric under reflection about the first axis and substantially symmetric under reflection about the second axis.

Embodiment 60 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, wherein for light having a predetermined wavelength and incident on the reflective polarizer along a direction parallel to an axis normal to and passing through the reflective polarizer at a center location, each location on the reflective polarizer has a maximum reflectance greater than about 70% and a corresponding minimum transmittance less than about 5% for a block polarization state, such that in a projection onto a plane tangent to the reflective polarizer at a center of the reflective polarizer, a block polarization state of at least one first edge location is rotated clockwise from an a block polarization state at the center of the reflective polarizer and a block polarization state of at least one second edge location is rotated counterclockwise from the block polarization state at the center of the reflective polarizer, the at least one first and second edge locations subtending an angle in a range from about 70 degrees to about 110 degrees at the center of the reflective polarizer.

Embodiment 61 is the reflective polarizer of Embodiment 60, wherein a second edge location in the at least one second edge location is defined by a clockwise rotation about an optical axis through the center of the reflective polarizer of a first location in the at least one first location through the angle $\theta$.

Embodiment 62 is the reflective polarizer of Embodiment 60, wherein a second edge location in the at least one second edge location is defined by a counterclockwise rotation about an optical axis through the center of the reflective polarizer of a first location in the at least one first location through the angle θ.

Embodiment 63 is the reflective polarizer of Embodiment 60, wherein in the projection onto the plane tangent to the reflective polarizer at the center of the reflective polarizer, a block polarization state of at least one third edge location is rotated clockwise from a block polarization state at the center of the reflective polarizer and a block polarization state of at least one fourth edge location is rotated counterclockwise from the block polarization state at the center of the reflective polarizer, the at least one first and third locations subtending an angle in a range from about 160 degrees to about 180 degrees at the center of the reflective polarizer, the at least one second and fourth locations subtending an angle in a range from about 160 degrees to about 180 degrees at the center of the reflective polarizer.

Embodiment 64 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for light having a predetermined wavelength and incident on the reflective polarizer along a direction parallel to an axis normal to and passing through the reflective polarizer at a center of the reflective polarizer, each location on the reflective polarizer having a maximum reflectance greater than about 70% and a corresponding minimum transmittance less than about 5% for a block polarization state, such that in a projection onto a plane tangent to the reflective polarizer at the center of the reflective polarizer, a block polarization state of at least one first and second edge locations are rotated relative to each other by greater than 2 degrees, the at least one first and second edge locations subtending an angle in a range from about 70 degrees to about 110 degrees at the center of the reflective polarizer.

Embodiment 65 is the reflective polarizer of Embodiment 64, wherein in the in the projection onto the plane tangent to the reflective polarizer at the center of the reflective polarizer, a block polarization state of at least one third and fourth edge locations are rotated relative to each other by less than 2 degrees, the at least one third and fourth locations subtending an angle in a range from about 70 degrees to about 110 degrees at the center of the reflective polarizer.

Embodiment 66 is the reflective polarizer of Embodiment 64, wherein that in the projection onto the plane tangent to the reflective polarizer at the center of the reflective polarizer, the block polarization state of the at least one first and second edge locations are rotated relative to each other by no more than 7 degrees.

Embodiment 67 is the reflective polarizer of Embodiment 64, wherein the block polarization state of the at least one first edge location is rotated clockwise relative to a block polarization state at the center of the reflective polarizer and the block polarization state of the at least one second edge location is rotated counterclockwise relative to the block polarization state at the center of the reflective polarizer.

Embodiment 68 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for light having a predetermined wavelength and incident on the reflective polarizer along a direction parallel to an optical axis normal to and passing through the reflective polarizer at a center of the reflective polarizer, each location on the reflective polarizer having a maximum reflectance greater than about 70% and a corresponding minimum transmittance less than about 5% for a block polarization state, such that a region of the reflective polarizer within a radius R from the optical axis has a maximum variation of the block polarization state in a projection onto a plane tangent to the reflective polarizer at the center of the reflective polarizer that is:

less than about 1 degree for R less than R1; and
greater than about 2 degrees for R greater than R2,
wherein the reflective polarizer has a maximum radius Rm from the optical axis, R1 being at least 0.4 Rm, R2 being greater than R1 and no more than 0.95 Rm.

Embodiment 69 is the reflective polarizer of Embodiment 68, wherein R1 is about 0.45 Rm and R2 is about 0.7 Rm.

Embodiment 70 is the reflective polarizer of Embodiment 68, wherein the maximum variation is greater than about 3 degrees for R greater than 0.75 Rm.

Embodiment 71 is the reflective polarizer of Embodiment 68, wherein the maximum variation for R equal to Rm is no more than 7 degrees.

Embodiment 72 is a curved reflective polarizer comprising a plurality of alternating polymeric interference layers, each polymeric interference layer reflecting or transmitting light primarily by optical interference, at least one location on the curved reflective polarizer having a radius of curvature in a range from about 6 mm to about 1000 mm, for light having a predetermined wavelength and incident on the reflective polarizer along a direction parallel to an optical axis normal to and passing through the reflective polarizer at a center of the reflective polarizer, each location on the reflective polarizer having a maximum reflectance greater than about 70% for a block polarization state, a maximum transmittance greater than about 70% for an orthogonal pass polarization state, and a circular diattenuation, such for orthogonal first and second axes intersecting each other at a center location of the reflective polarizer, the circular diattenuation of the reflective polarizer:

at the center location is CDc;
at a first edge location along the first axis near a first edge of the reflective polarizer is CD1;
at a second edge location along the first axis near a second edge, opposite the first edge, of the reflective polarizer is CD2;
at a third edge location along the second axis near a third edge of the reflective polarizer is CD3; and
at a fourth edge location along the second axis near a fourth edge, opposite the third edge, of the reflective polarizer is CD4;
wherein CDc is less than a minimum of CD3 and CD4, and greater than a maximum of CD1 and CD1.

Embodiment 73 is the reflective polarizer of Embodiment 72, wherein the circular diattenuation is substantially symmetric under reflections about each of the first and second axes.

Embodiment 74 is the reflective polarizer of Embodiment 72, wherein for orthogonal third and fourth axes intersecting each other at the center location of the reflective polarizer, an angle between the first and third axes being about 45 degrees, the circular diattenuation is substantially antisymmetric under reflection about each of the third and fourth axes.

Embodiment 75 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for light having a predetermined wavelength and incident on the reflective polarizer along a direction parallel to an optical axis normal to and passing through the reflective polarizer at a center of the reflective polarizer, each location on the reflective polarizer having a maximum reflectance greater than about 70% and a corresponding minimum transmittance less than about 5% for a block polarization state, such that a region of the reflective polarizer having an area less than or equal to a total area of the reflective polarizer has a maximum variation of a circular diattenuation that is at least 0.04.

Embodiment 76 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for light having a predetermined wavelength and incident on the reflective polarizer along a direction parallel to an optical axis normal to and passing through the reflective polarizer at a center of the reflective polarizer, each location on the reflective polarizer having a maximum reflectance greater than about 70% and a corresponding minimum transmittance less than about 5% for a block polarization state, such that a region of the reflective polarizer having an area of greater than half of a total area of the reflective polarizer has a maximum variation of a circular diattenuation that is no more than 0.015.

Embodiment 77 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for light having a predetermined wavelength and incident on the reflective polarizer along a direction parallel to an optical axis normal to and passing through the reflective polarizer at a center of the reflective polarizer, each location on the reflective polarizer having a maximum reflectance greater than about 70% and a corresponding minimum transmittance less than about 5% for a block polarization state, such that a region of the reflective polarizer having an area of greater than half of a total area of the reflective polarizer has a maximum absolute value of a circular diattenuation that is no more than 0.007.

Embodiment 78 is the reflective polarizer of any one of Embodiments 1 to 77, wherein the reflective polarizer comprises at least one layer that is substantially uniaxially oriented at one or more locations.

Embodiment 79 is the reflective polarizer of any one of Embodiments 1 to 77, wherein the reflective polarizer comprises at least one layer having at least one location where an absolute value of a difference between a first refractive index in a first direction along a thickness of the at least one layer and a second refractive index in an orthogonal second direction is less than about 0.02 and an absolute value of a difference between the second refractive index and a third refractive index in a third direction orthogonal to the first and second directions is at greater than about 0.05.

Embodiment 80 is an optical system comprising:
a first lens;
a second lens, each of the first and second lenses having an optical power greater than zero in at least one direction;
a partial reflector having an average optical reflectance of at least 30% for substantially normally incident light in a predetermined wavelength range; and
the reflective polarizer of any one of Embodiments 1 to 79, the optical system having an optical axis, a light ray propagating along the optical axis passing through the first lens, the second lens, the partial reflector and the reflective polarizer without being substantially refracted, such that for an incident cone of light having the block polarization state and a wavelength in the predetermined wavelength range and centered on the optical axis with a full cone angle from about 100 degrees to about 160 degrees, the incident light exits the optical system having a first light component having the pass polarization state and a second light component having the block polarization state, a ratio of an average intensity of the first light component to an average intensity of the second light component greater than about 100.

Embodiment 81 is a method of shaping an optical film comprising a plurality of alternating polymeric layers, the method comprising the steps of:
securing at least portions of a perimeter of the optical film in a first plane so that the secured portions do not move relative to one another; and
stretching the optical film by displacing a portion of the optical film along at least a first direction perpendicular to the first plane such that one of a radial and circumferential stretching of the optical film is substantially constant from a center to the perimeter of the optical film, and the other one of the radial and circumferential stretching of the optical film substantially changes from the center to the perimeter of the optical film.

Embodiment 82 is the method of Embodiment 81, further comprising heating the optical film to a temperature greater than a glass transition temperature of the optical film.

Embodiment 83 is a method of shaping an optical film comprising a plurality of alternating polymeric layers, the method comprising the steps of:
disposing the optical film such that at least a first portion of the optical film is disposed substantially in a first plane adjacent a curved mold surface; and
stretching the optical film to conform the first portion of the optical film to at least a portion of the curved mold surface such that each point in the first portion has a location on the curved surface that is within a cone having an apex at a location of the point in the first plane prior to the stretching step, the cone centered along an axis perpendicular to the first plane and having a cone angle of no more than 10 degrees.

Embodiment 84 is the method of Embodiment 83, wherein the stretching step comprises stretching the optical film such that a circumferential stretching of the optical film is substantially constant from a center of the optical film to a perimeter of the optical film and a radial stretching of the optical film substantially changes from the center to the perimeter of the optical film.

Embodiment 85 is a curved reflective polarizer comprising a plurality of polymeric layers stretched and shaped along at least orthogonal first and second directions so that at least one location on the curved reflective polarizer has a radius of curvature in a range from about 6 mm to about 1000 mm along each of the first and second directions, for light having a predetermined wavelength and incident on the reflective polarizer along a direction parallel to an optical axis normal to and passing through the reflective polarizer at a center of the reflective polarizer, each location on the reflective polarizer having a maximum reflectance greater than about 70% and a corresponding minimum transmittance less than about 5% for a block polarization state, such that a region of the reflective polarizer within a radius R from the optical axis has a maximum variation of the block polarization state in a projection onto a plane tangent to the reflective polarizer at the center of the reflective polarizer that is less than about 1 degree for R less than 0.8 Rm.

Examples

Reflective polarizer films were thermoformed into a base 8 lens shape using the pressurization process illustrated in FIGS. 3A-3F and using the pulldown process illustrated in FIGS. 4A-4C.

The reflective polarizer films were made as follows. Two multilayer optical packets were coextruded with each packet comprised of 325 alternating layers of polyethylene naphthalate (PEN) and a low index isotropic layer, which was made with a blend of polycarbonate and copolyesters (PC:coPET) such that the index is about 1.57 and remains substantially isotropic upon uniaxial orientation, wherein the PC:coPET molar ratio is approximately 42.5 mol % PC and 57.5 mol % coPET and has a Tg of 105 degrees centigrade. This isotropic material was chosen such that after stretching its refractive indices in the two non-stretch directions remains substantially matched with those of the birefringent material in the non-stretching direction while in the stretching direction there is a substantial mis-match in refractive indices between birefringent and non-birefringent layers. The PEN and PC:coPET polymers were fed from separate extruders to a multilayer coextrusion feedblock, in which they were assembled into packets of 325 alternating optical layers ("Packet 1" and "Packet 2" respectively), plus a thicker protective boundary layer of the PC/coPET, on the outside of the stacked optical packets, for a total of 652 layers. The film was substantially uniaxially stretched in a parabolic tenter as described in U.S. Pat. No. 6,916,440 (Jackson et al.). The film was stretched at a temperature of about 150° C. to a draw ratio of about 6. The layer thickness profile for the resulting reflective polarizer is shown in FIG. 50 with Packets 1 and 2 indicated. The reflective polarizer had a resulting total thickness as measured by a capacitance gauge of approximately 65 μm. Protective olefin liners were applied to each side of the reflective polarizer.

The base 8 lens shape had a spherical radius of curvature Rc (see FIG. 1) of 65.3 mm, a diameter 2Rm of 83 mm, a $\phi_{max}$ of 39.5 degrees, a sag S of 14.9 mm, and a sag to diameter ratio of 0.179.

The molds used in the pressurization and the pulldown processes were aluminum molds machined to provide a curved major surface corresponding to the base 8 lens shape. Porous aluminum was used for the first mold 360 so that a vacuum could be pulled through the mold. In the pulldown process a vacuum was applied in regions 477 and no positive pressure was added in region 491.

The pressurization process was implemented on a forming machine from Hy-Tech Forming Systems (USA), Inc. (Phoenix, AZ). Two pieces of 2.5 mil thick additional liners were laminated to both side of the reflective polarizer film. A piece of film larger than 6"×6" was cut from the laminate reflective polarizer film. The piece of film was placed on in the forming machine on top of a bottom platten that included a female form machined from porous aluminum and maintained at a temperature of 80° F. An upper flat platten pre-heated to 350° F. was then closed down on the lower platten clamping the edges of the film in place. A pressure of 60 psi was applied to the bottom side of the film (through the porous aluminum) to press the film against the flat heated platten above. This pressure was maintained for 6 seconds. The bottom side pressure was released and a 475 psi pressure was applied to the upper side of the film to inflate the film into the female form below. The pressure was maintained for 6 seconds and then the formed part (with formed liners) was removed from the machine.

The pulldown process was implemented on a vacuum forming machine from MAAC Machinery Corporation (Carol Stream, IL). An 8"×8" square piece of the reflective polarizer was cut out that the olefin liners were removed. The film was placed into a set of four grips that clamped the full four edges of the film. The film and grips were slid backwards to be placed under a heated platen which was preheated to a temperature of 380° F. The frame with the film was then slid to place the center of the film over a (male) Base 8 form (positioned slightly above a flat base) held to a temperature of 100° F. The form (and base) was then moved upwards into the film until the film made contact with the base. After the form reached its final position a vacuum was drawn (with ports located in the seam between the form and the flat base) to pull the film more tightly against the form. After a few seconds of contact the grips were opened and the formed part was removed.

Figure 27:
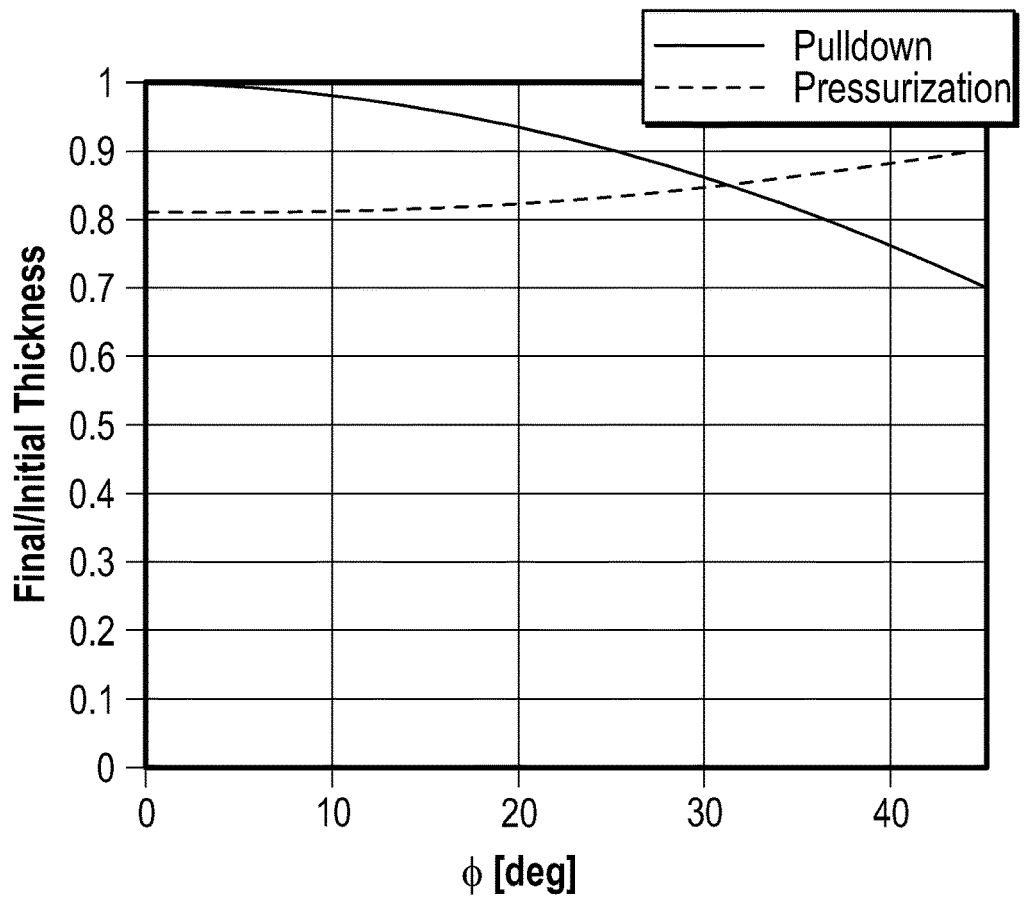
FIG. 27 is a plot of the ratio of the thicknesses of formed reflective polarizers to their respective thickness prior to forming.
Figure 28:
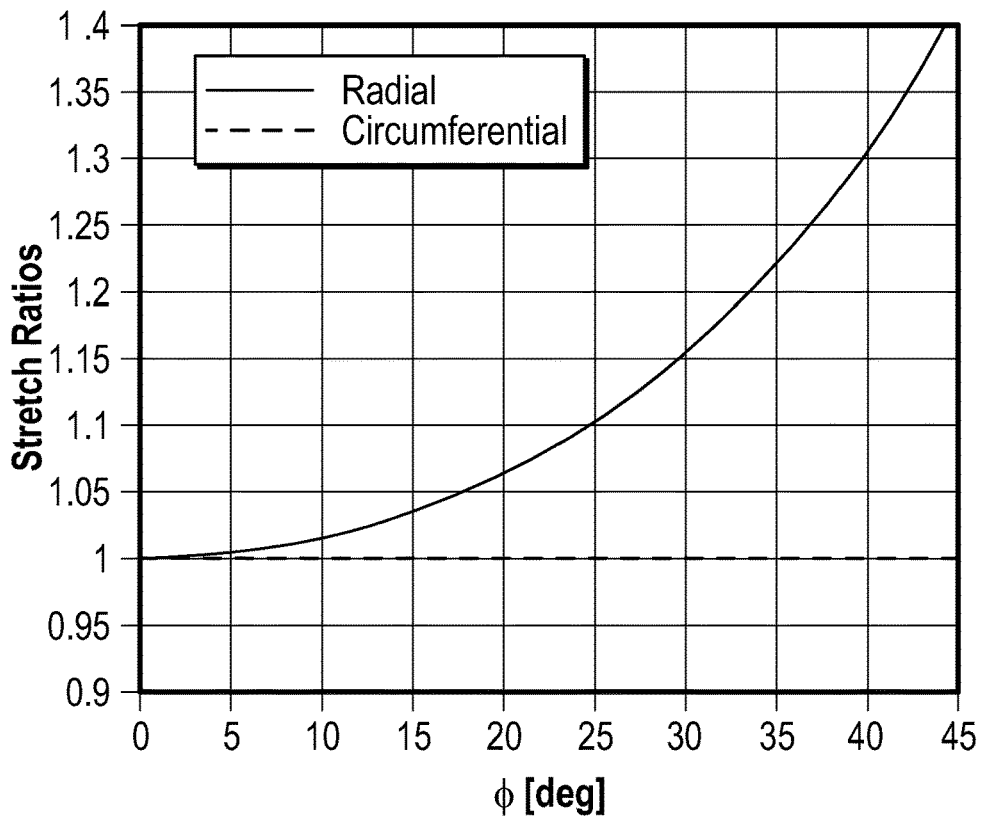
FIG. 28 is a plot of radial and circumferential stretch ratios for an optical film shaped in a pressurization process.
Figure 29:
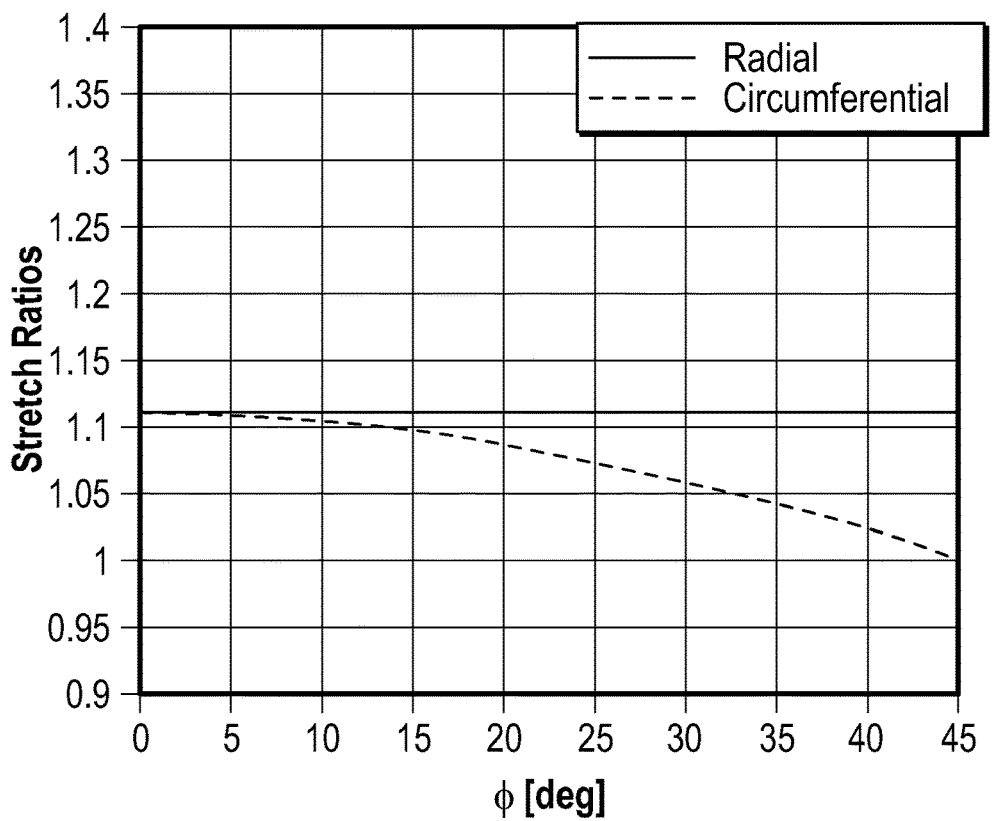
FIG. 29 is a plot of radial and circumferential stretch ratios for an optical film shaped in a pulldown process.

The thickness divided by the initial thickness and the stretch ratios as determined modeling based on Equation 1 are shown in FIGS. 27-29. FIG. 28 shows the stretch ratios for film shaped in the pulldown process and FIG. 29 shows the stretch ratios for film shaped in the pressurization process. $\phi_{max}$ was extended to 45 degrees for the purpose of the modeling. The pressurization process results in a film thinnest at the center with a thickness monotonically increasing thickness with the angle φ. The pulldown process results in film thickest at the center with a thickness monotonically decreasing with φ. The stretch ratio was substantially constant in the radial direction, but not in the circumferential direction, in the film formed in the pressurization process. The stretch ratio was substantially constant in the circumferential direction, but not in the radial direction, in the film formed in the pulldown process.

Measured thicknesses for the reflective polarizer sample formed by the pressurization process ranged from about 52 micrometers near the center of the reflective polarizer to about 57 micrometers closer to an edge of the reflective polarizer. Measured thicknesses for the reflective polarizer sample formed by the pulldown process ranged from about 65 micrometers near the center of the reflective polarizer to about 52 micrometers closer to an edge of the reflective polarizer. Table 1 lists the thicknesses determined for samples formed according to the pressurization process and the pulldown process. The thickness is listed at different locations determined by either the x and y coordinates of the cylindrical radial coordinate R and the azimuthal angle. The block axis was along the y-axis at the center of the sample.

TABLE 1

Thickness distribution

| R (mm) | Azimuthal Angle (degrees) | x (mm) | y (mm) | Pressurization Process Thickness (μm) | Pulldown Process Thickness (μm) |
|---|---|---|---|---|---|
| 0 | 0 | 0.0 | 0.0 | 53 | 65 |
| 15 | 0 | 15.0 | 0.0 | 52 | 65 |
| 15 | 45 | 10.6 | 10.6 | 53 | 64 |
| 15 | 90 | 0.0 | 15.0 | 54 | 65 |
| 15 | 135 | −10.6 | 10.6 | 52 | 66 |
| 15 | 180 | −15.0 | 0.0 | 52 | 65 |
| 15 | 225 | −10.6 | −10.6 | 52 | 64 |
| 15 | 270 | 0.0 | −15.0 | 52 | 63 |
| 15 | 315 | 10.6 | −10.6 | 52 | 63 |
| 30 | 0 | 30.0 | 0.0 | 55 | 63 |
| 30 | 45 | 21.2 | 21.2 | 53 | 63 |
| 30 | 90 | 0.0 | 30.0 | 54 | 62 |
| 30 | 135 | −21.2 | 21.2 | 56 | 65 |
| 30 | 180 | −30.0 | 0.0 | 54 | 64 |
| 30 | 225 | −21.2 | −21.2 | 54 | 63 |
| 30 | 270 | 0.0 | −30.0 | 54 | 55 |
| 30 | 315 | 21.2 | −21.2 | 54 | 62 |
| 45 | 0 | 45.0 | 0.0 | 56 | 64 |
| 45 | 45 | 31.8 | 31.8 | 56 | 63 |
| 45 | 90 | 0.0 | 45.0 | 57 | 58 |
| 45 | 135 | −31.8 | 31.8 | 56 | 63 |
| 45 | 180 | −45.0 | 0.0 | 56 | 64 |
| 45 | 225 | −31.8 | −31.8 | 57 | 58 |
| 45 | 270 | 0.0 | −45.0 | 57 | 52 |
| 45 | 315 | 31.8 | −31.8 | 56 | 60 |

Figure 30:
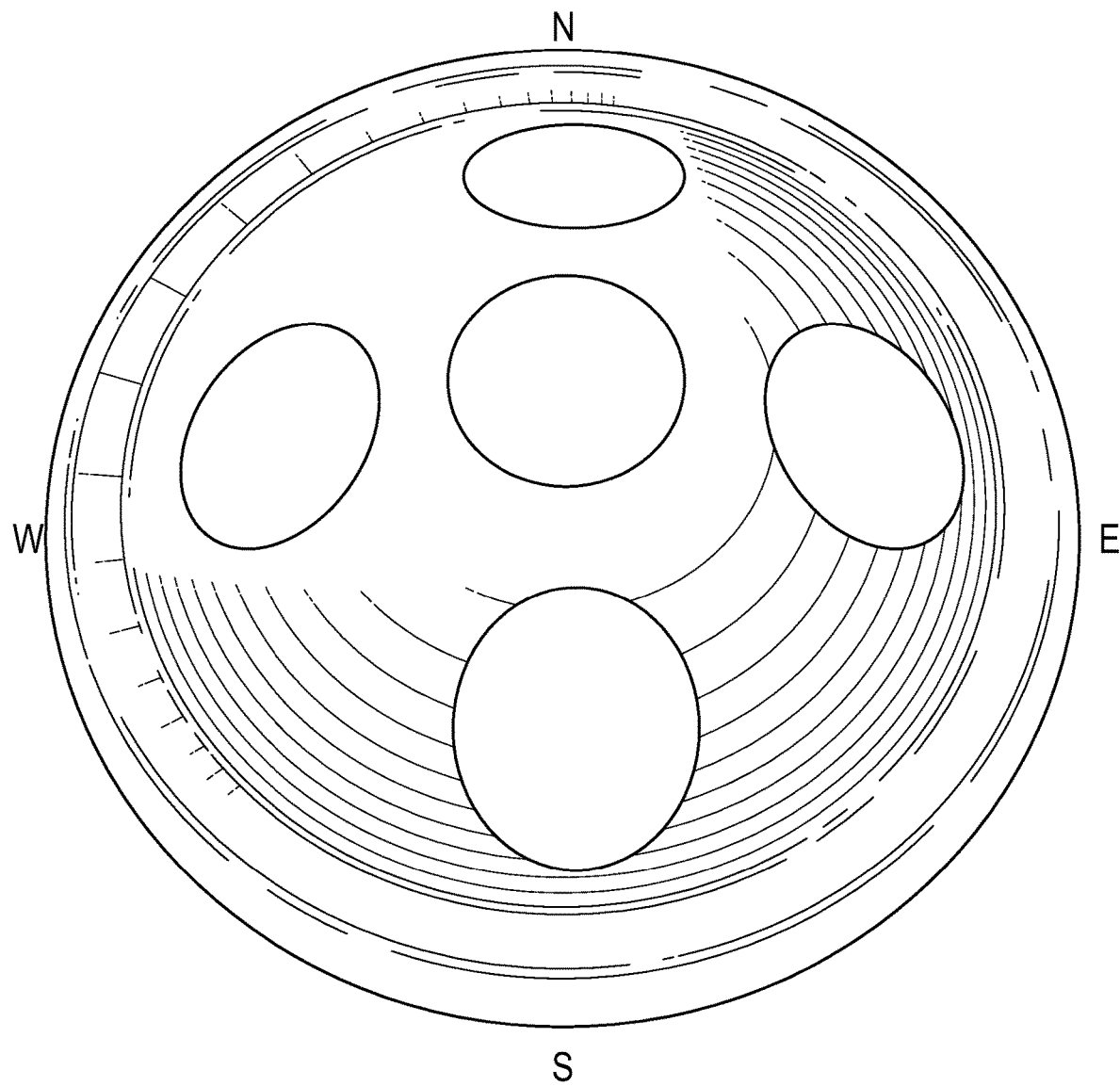
FIG. 30 is a perspective view of a shaped reflective polarizer with five samples cut out of the reflective polarizer.
Figure 31:
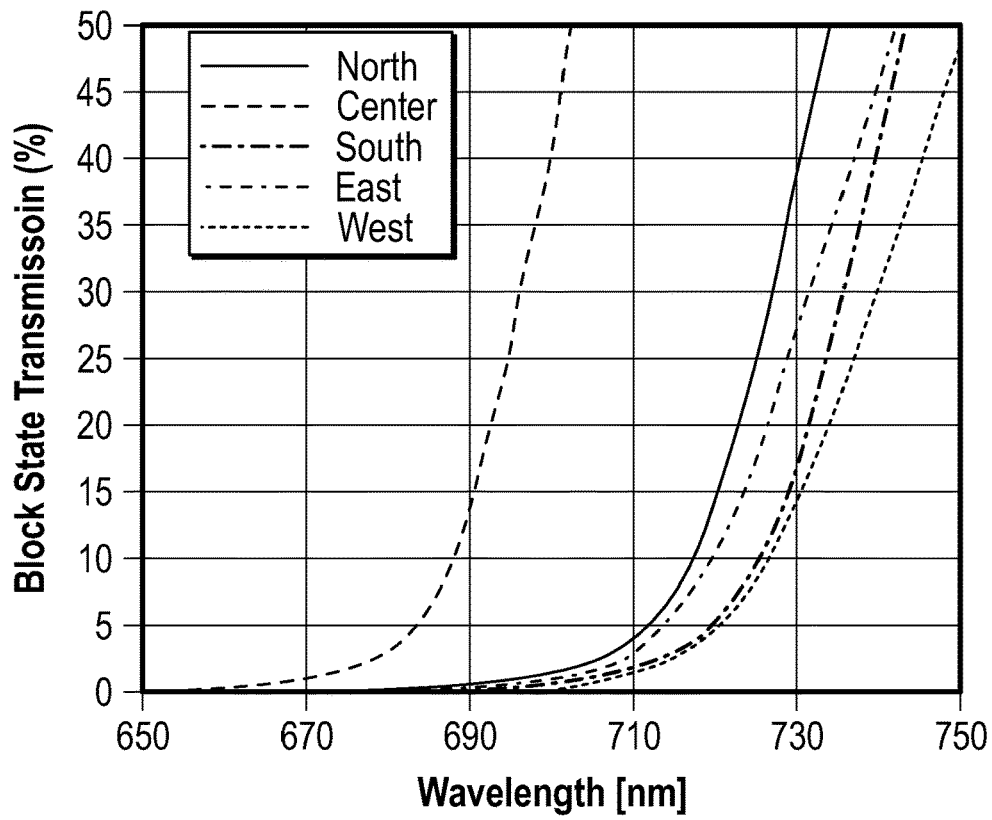
FIG. 31 is a plot of the block state transmission of samples cut from a reflective polarizer shaped in a pressurization process.
Figure 32:
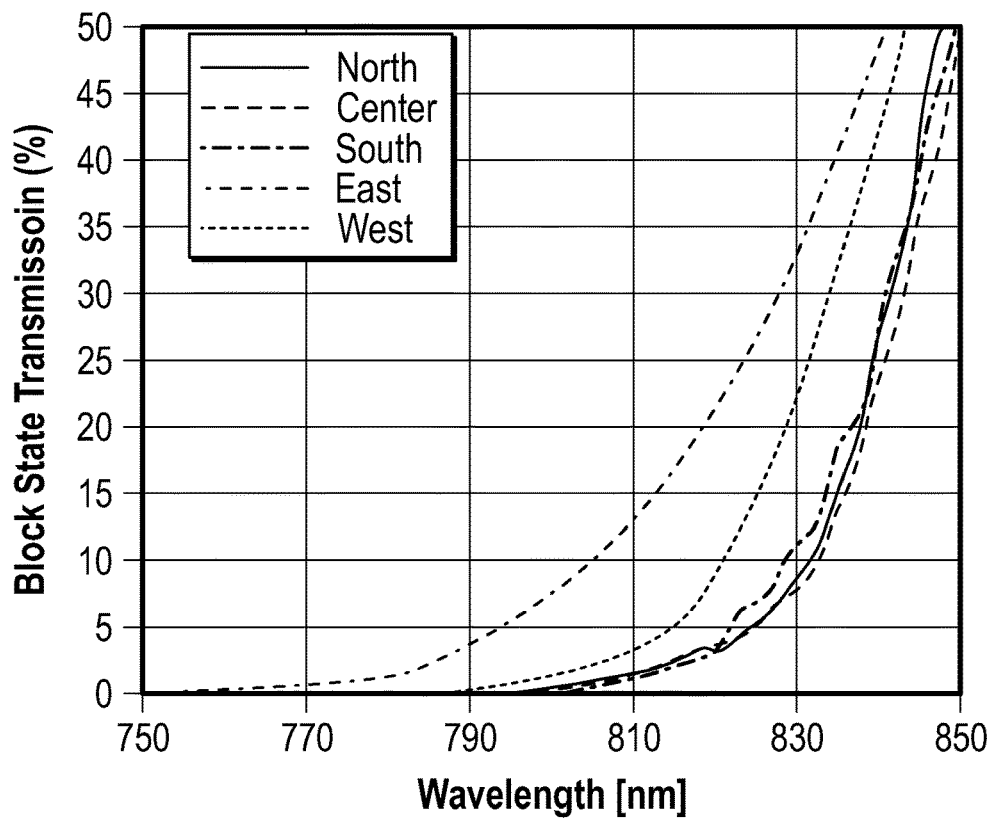
FIG. 32 is a plot of the block state transmission of samples cut from a reflective polarizer shaped in a pulldown process.

22 mm diameter portions were cut from formed reflective polarizer samples in a center (C), north (N), south (S), east (E), and west (W) pattern as illustrated in FIG. 30. The transverse direction (TD) which was the block direction of the reflective polarizer was along the east-west direction at the center. The block state transmission was measured at normal incidence as a function of wavelength using a Lambda 950 spectrophotometer (available from PerkinElmer, Waltham, MA). FIGS. 31-32 show plots of the block state transmission near the long wavelength band edge for the center, north, south, east, and west locations for samples formed using the pressurization and pulldown processes, respectively. The long wavelength band edge was determined as the wavelength where the block state transmission reached 10%. The results for the long wavelength band edge in nm are reported in Table 2.

TABLE 2

Long wavelength band edge (nm)

| Location | Pressurization | Pulldown |
|---|---|---|
| Center | 688 | 831 |
| North | 719 | 804 |
| West | 717 | 831 |
| South | 726 | 821 |
| East | 725 | 828 |

Optical properties of the reflective polarizers formed by the pressurization and pulldown processes were further characterized using an Axometrics AxoScan™ Muller matrix polarimeter (available from Axometrics, Inc., Huntsville, AL). Measurements were performed with the light source directed towards the formed film along a direction parallel to an optical axis through the center of the film. (e.g., incident light 198 of FIG. 1) with the reflective polarizer convex towards the incident light. Various quantities were plotted versus x- and y-axes where the reflective polarizer sample was oriented with the transverse direction (TD) along the y-axis at the center of the sample. The x- and y-axes in the contour and three-dimensional surface plots of the Examples, are Cartesian coordinates measuring, in mm, distances in plan view from a center of the shaped film. First and second samples were formed in both the pressurization and pulldown process. The samples were from different portions of a same reflective polarizer film. For each quantity measured, 20 measurements using an about 2 mm diameter beam were taken at each location and averaged. This averaged value was smoothed by replacing each value at a location with an average of nine measurements in a 3 by 3 grid centered on the location. The reported data covers a region of the formed samples within 30 mm from a center of the formed samples.

Figure 33A:
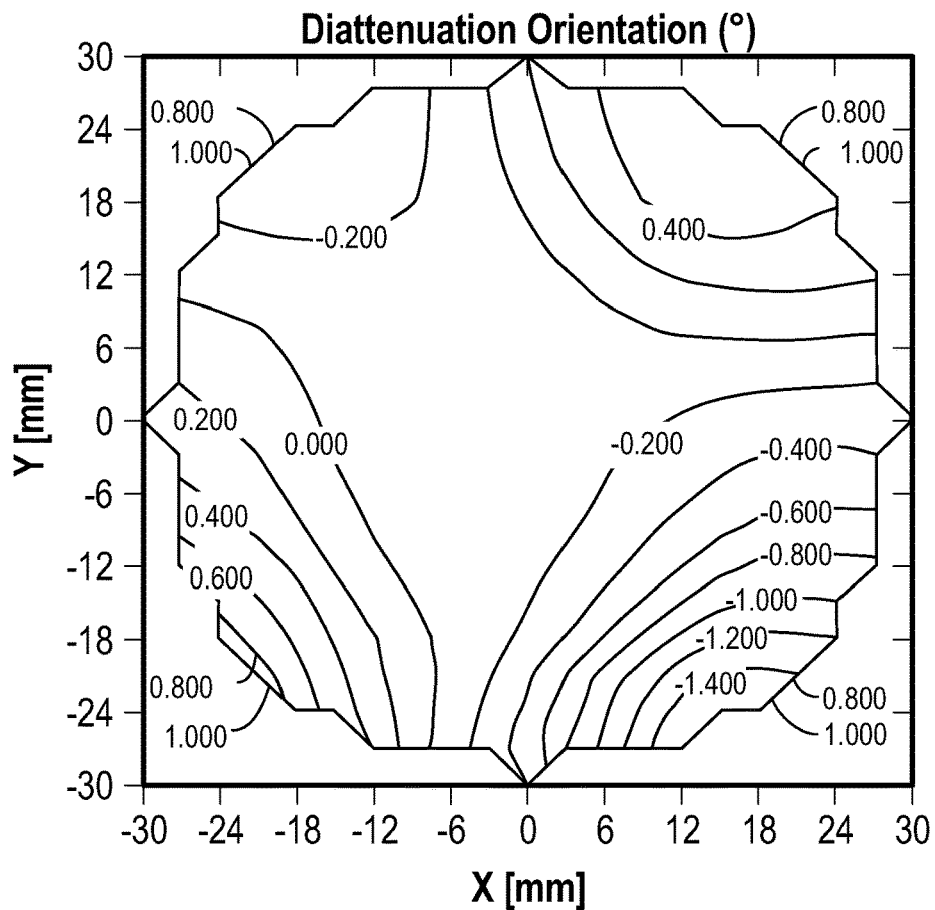
FIGS. 33A-33D are plots of the diattenuation orientations of reflective polarizer samples shaped in a pulldown process.
Figure 33B:
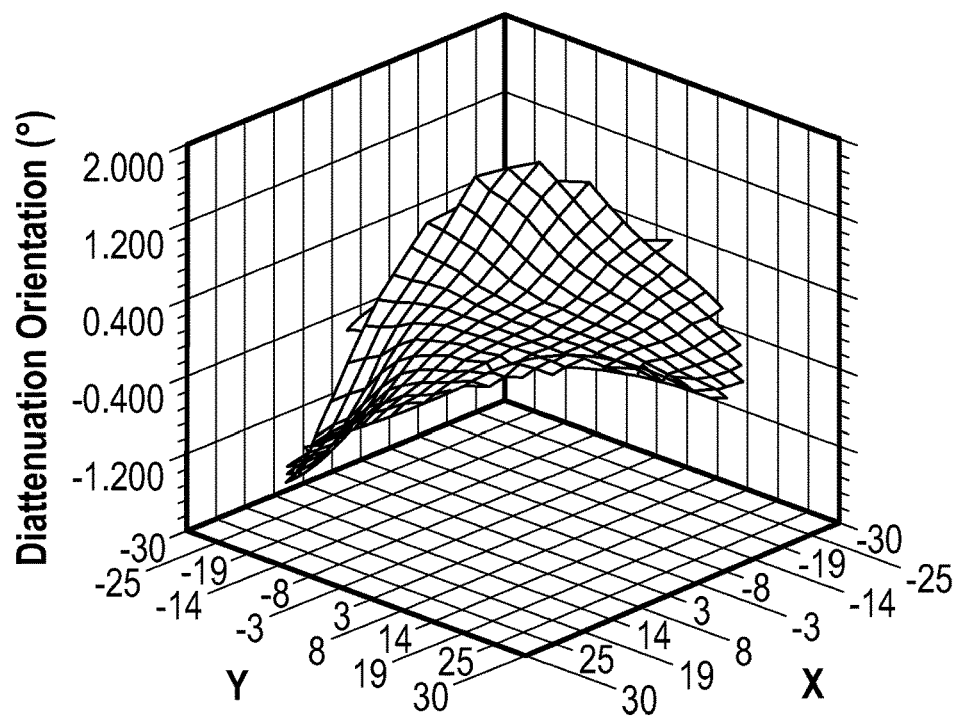
Figure 33C:
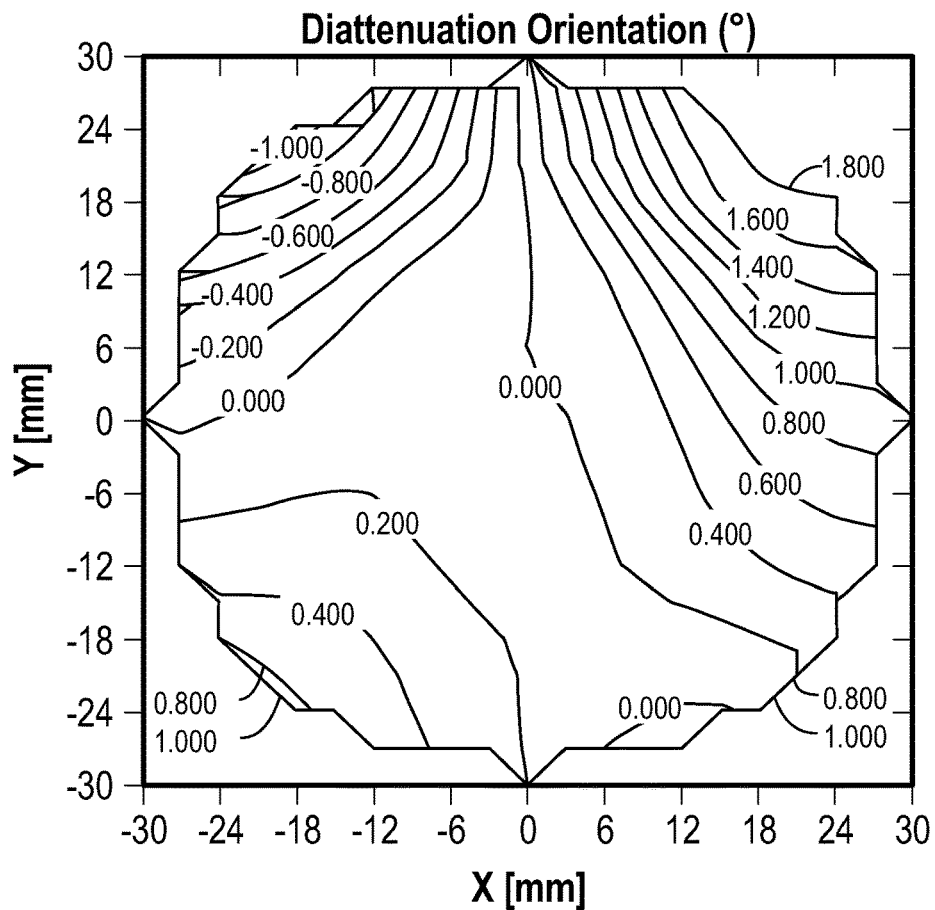
Figure 33D:
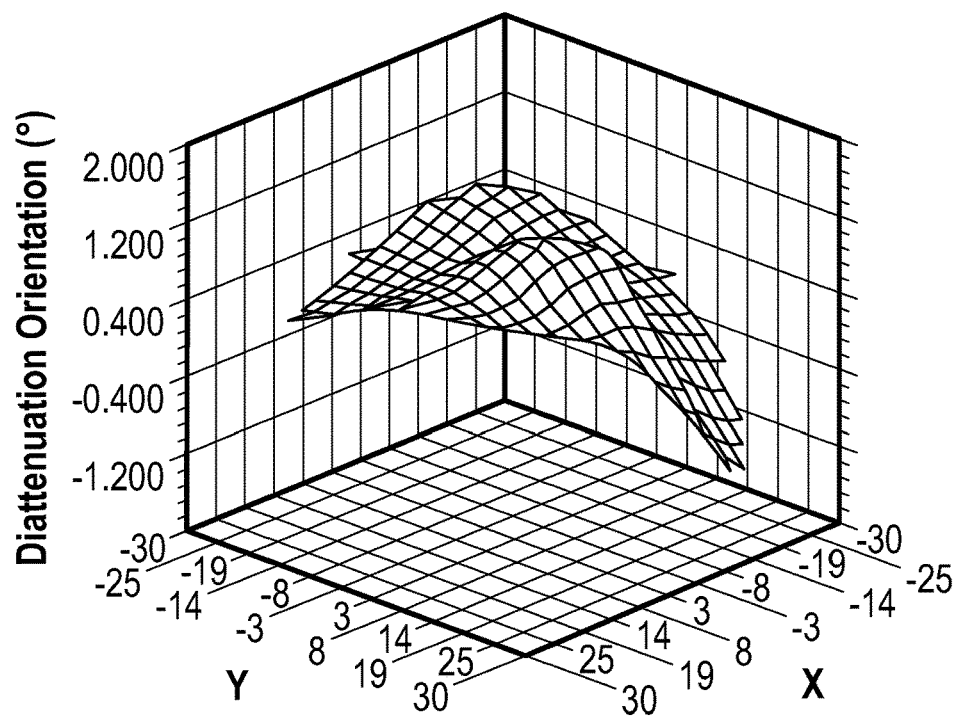

The diattenuation orientations for reflective polarizer samples formed in a pulldown process are shown in FIGS. 33A-33D. FIGS. 33A and 33B are a contour plot and a three-dimensional surface plot, respectively, for a first formed sample, and FIGS. 33C and 33D are a contour plot and a three-dimensional surface plot, respectively, for a second formed sample. The diattenuation orientation is equivalent to the pass axis orientation.

Figure 34A:
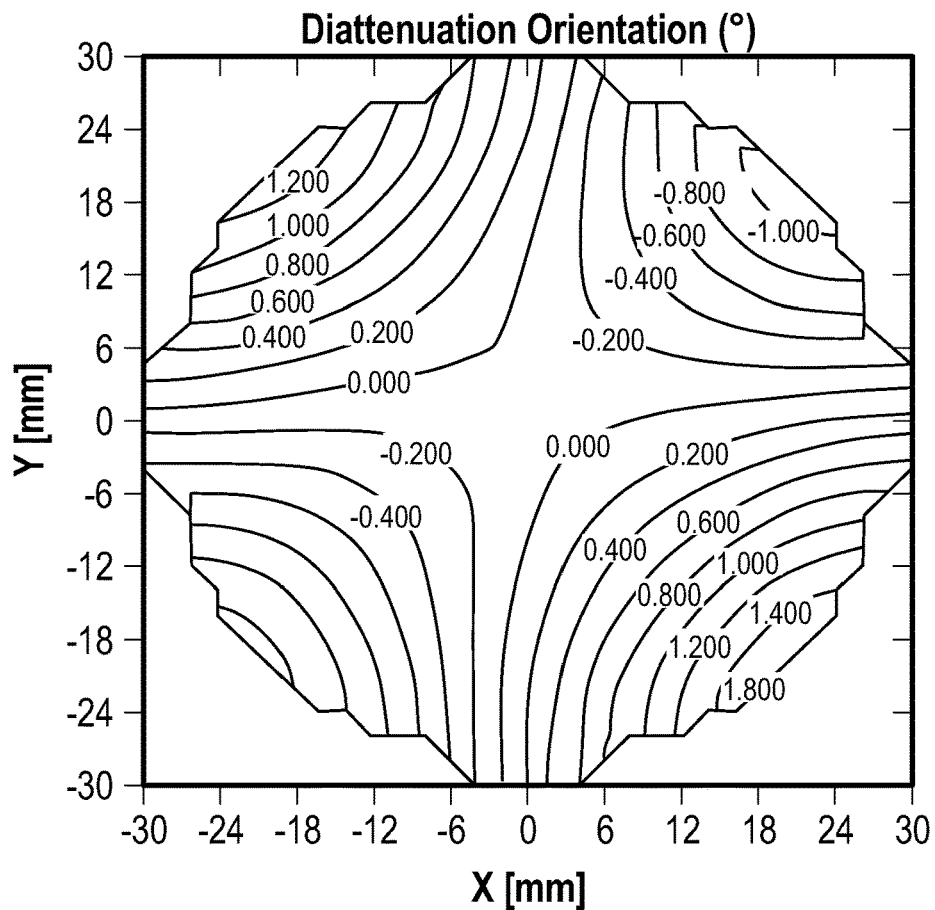
FIGS. 34A-34D are plots of the diattenuation orientation of reflective polarizer samples shaped in a pressurization process.
Figure 34B:
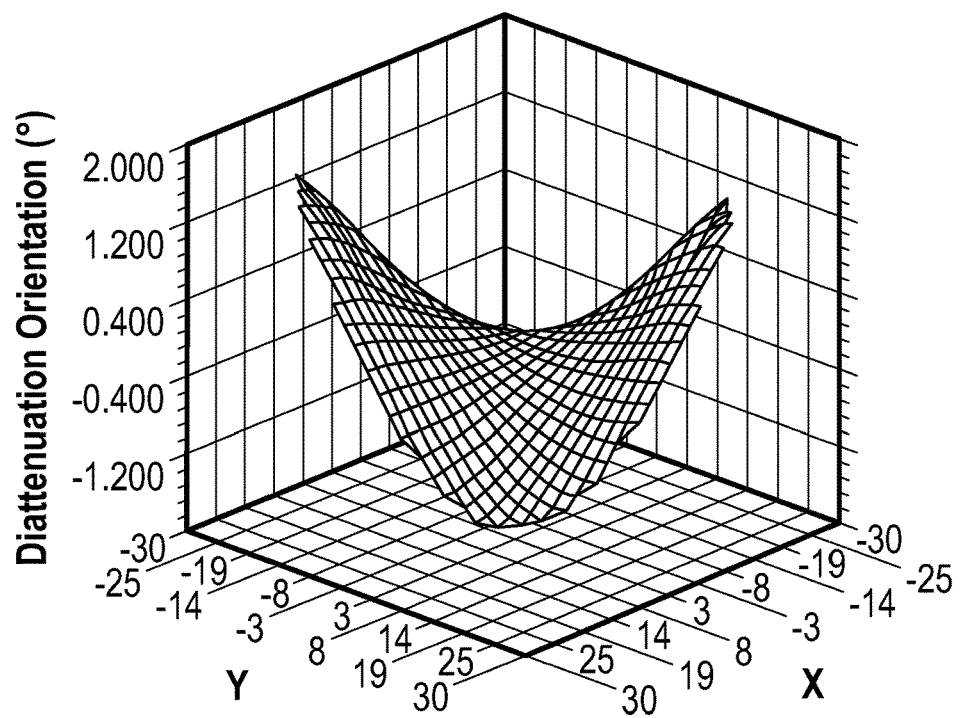
Figure 34C:
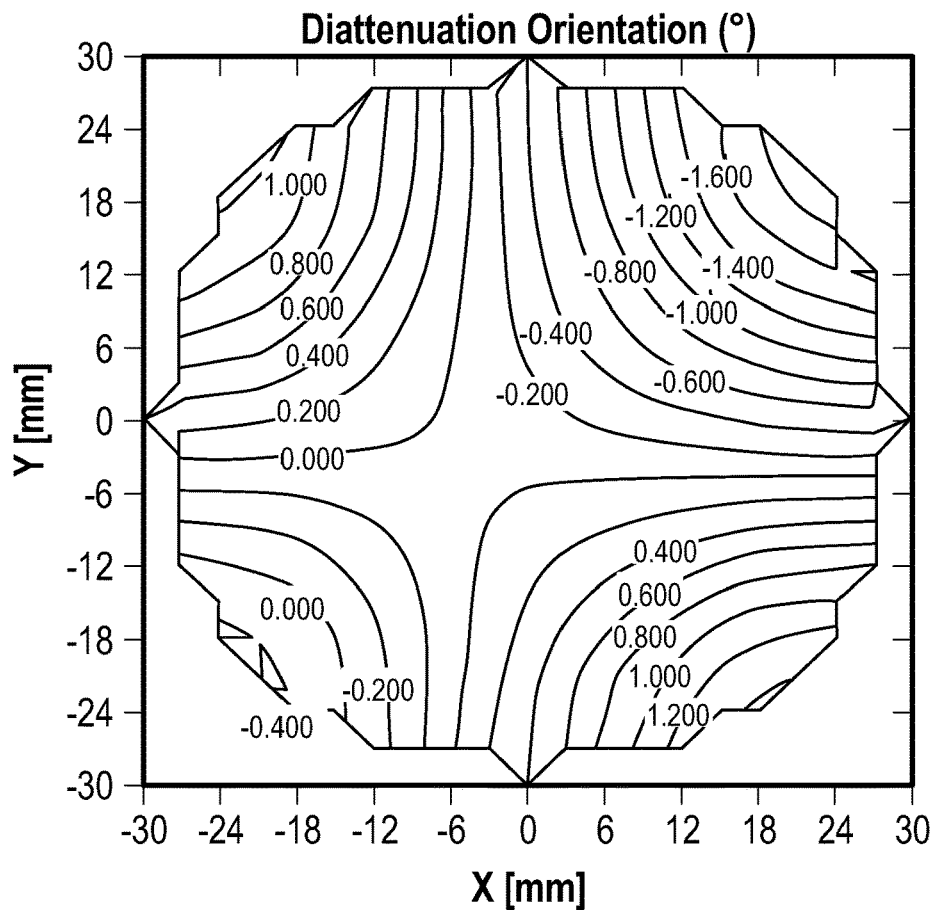
Figure 34D:
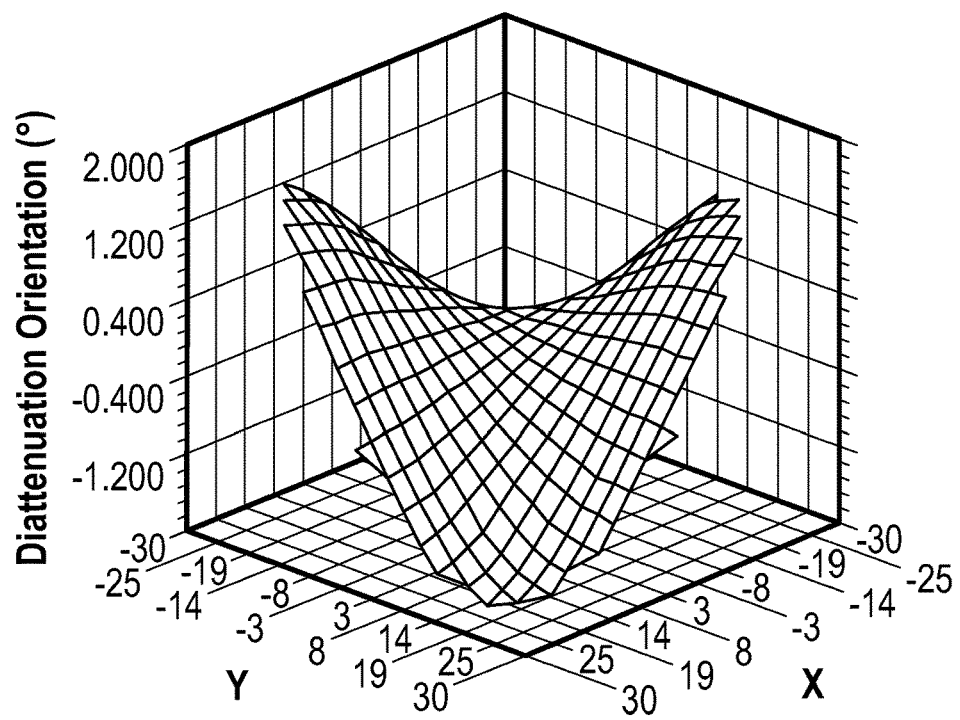

The diattenuation orientation for reflective polarizer samples formed in a pressurization process is shown in FIGS. 34A-34D. FIGS. 34A and 34B are a contour plot and a three-dimensional surface plot, respectively, for a first formed sample, and FIGS. 34C and 34D are a contour plot and a three-dimensional surface plot, respectively, for a second formed sample.

Figure 35:
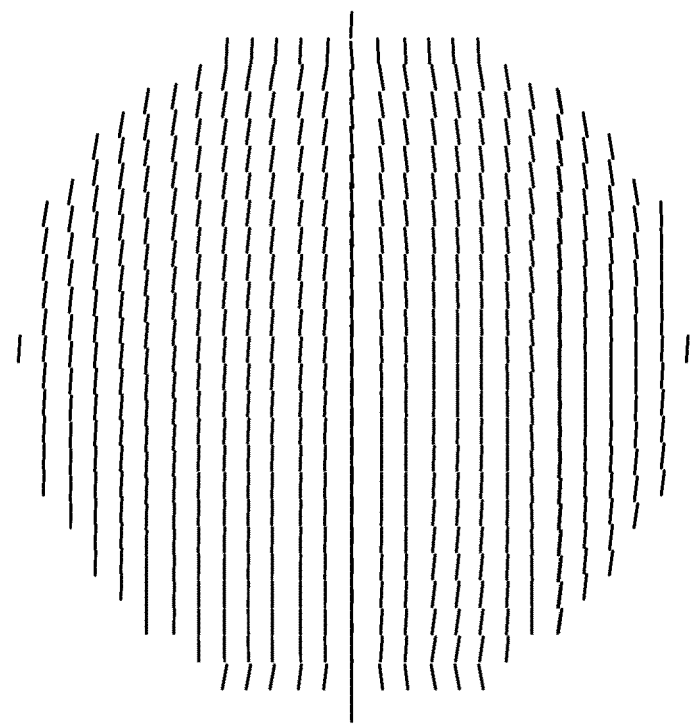
FIG. 35 is a scaled plot of the pass axis variation for a reflective polarizer film shaped in a pulldown process.
Figure 36:
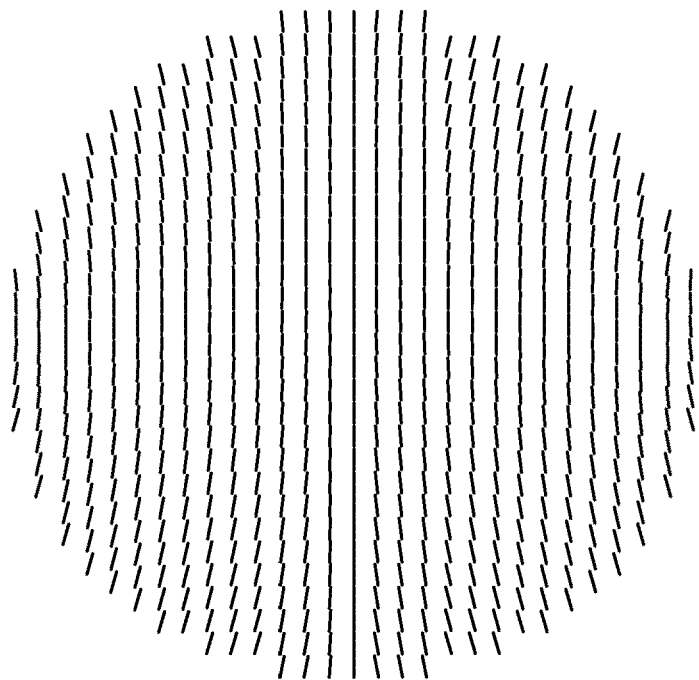
FIG. 36 is a scaled plot of the pass axis variation for a reflective polarizer film shaped in a pressurization process.

FIGS. 35-36 illustrate the pass axis variation for reflective polarizer samples formed in a pulldown process and a pressurization process, respectively. The angular shift is scaled by a factor of 10 (e.g., a line appearing at 10 degrees from vertical is oriented 1 degree from vertical in the shaped film) so that the variation is clearly visible.

Figure 37A:
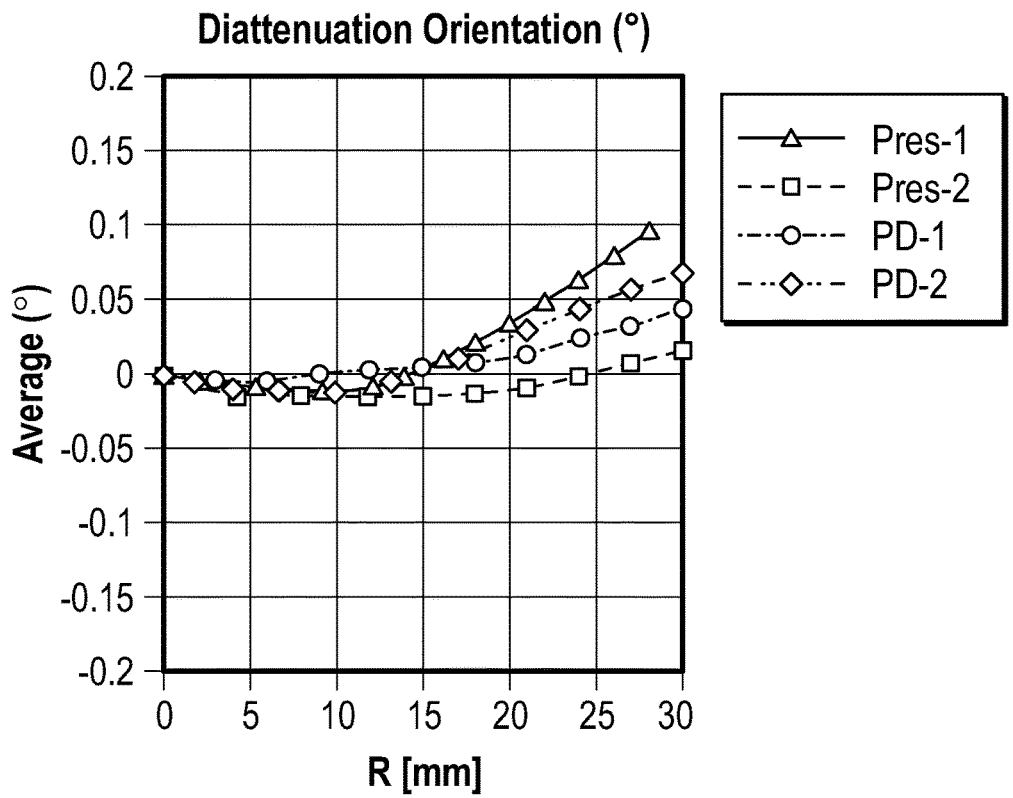
FIG. 37A is a plot of averages in a region having a radius R of the diattenuation orientation of reflective polarizer samples.
Figure 37B:
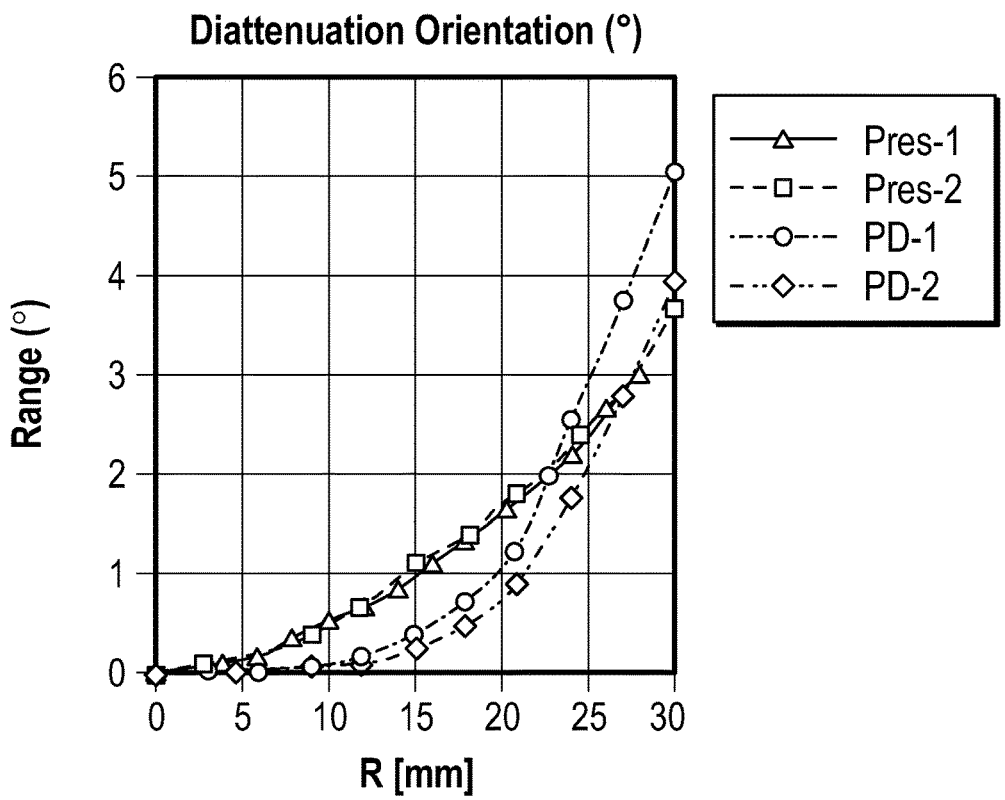
FIG. 37B is a plot of the maximum variation in a region having a radius R of the diattenuation orientation of reflective polarizer samples.

FIG. 37A is a plot of the average diattenuation orientation (in degrees) in a region of formed reflective polarizer samples as a function of the cylindrical radial coordinate R (see FIG. 1, for example) of the region for samples formed by the pressurization process (Pres) and the pulldown process (PD). FIG. 37B is a plot of the maximum variation (maximum minus minimum) of the diattenuation orientation (in degrees) relative to the diattenuation orientation at a center of the reflective polarizer samples in the region as a function of the cylindrical radial coordinate R.

Figure 38A:
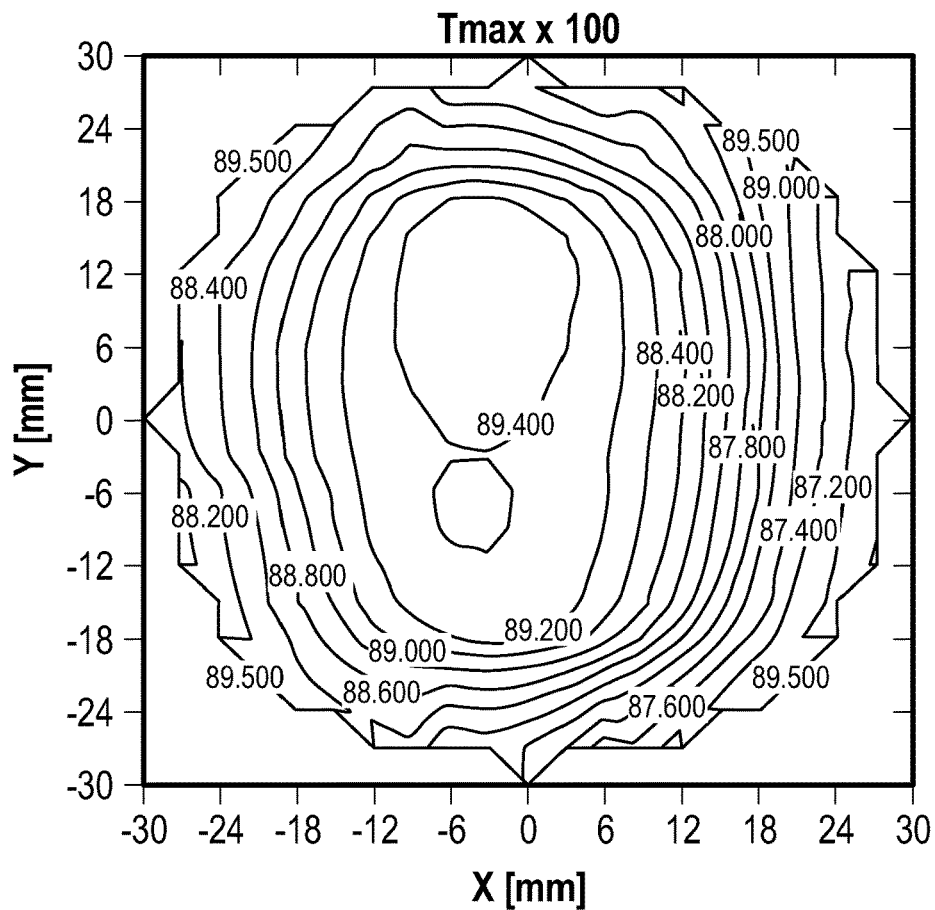
FIGS. 38A-38D are plots of the pass axis transmission of reflective polarizer samples shaped in a pulldown process.
Figure 38B:
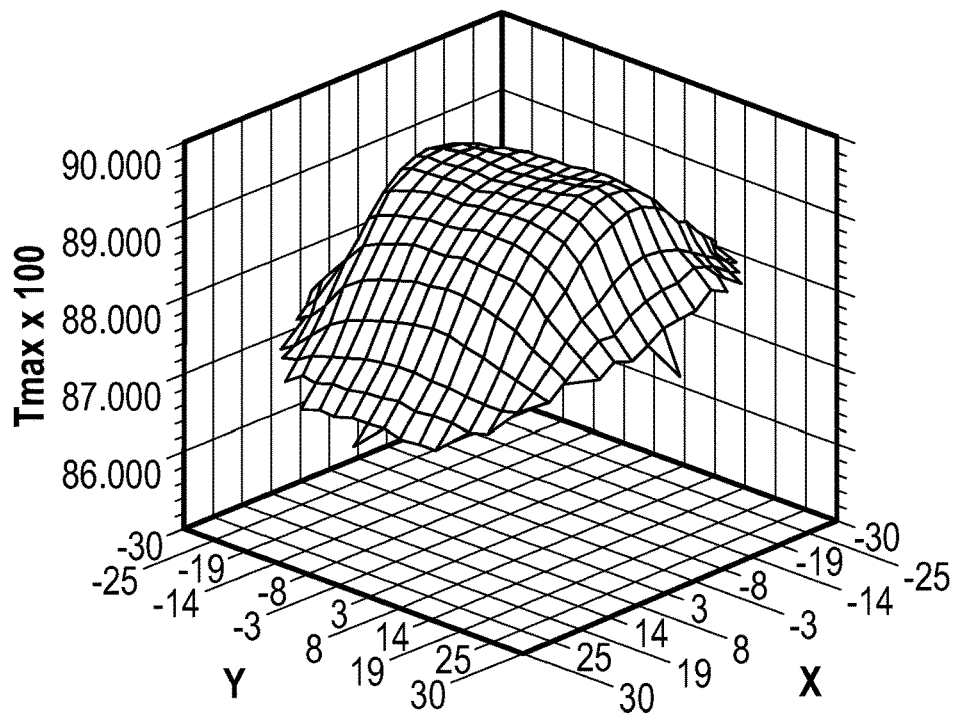
Figure 38C:
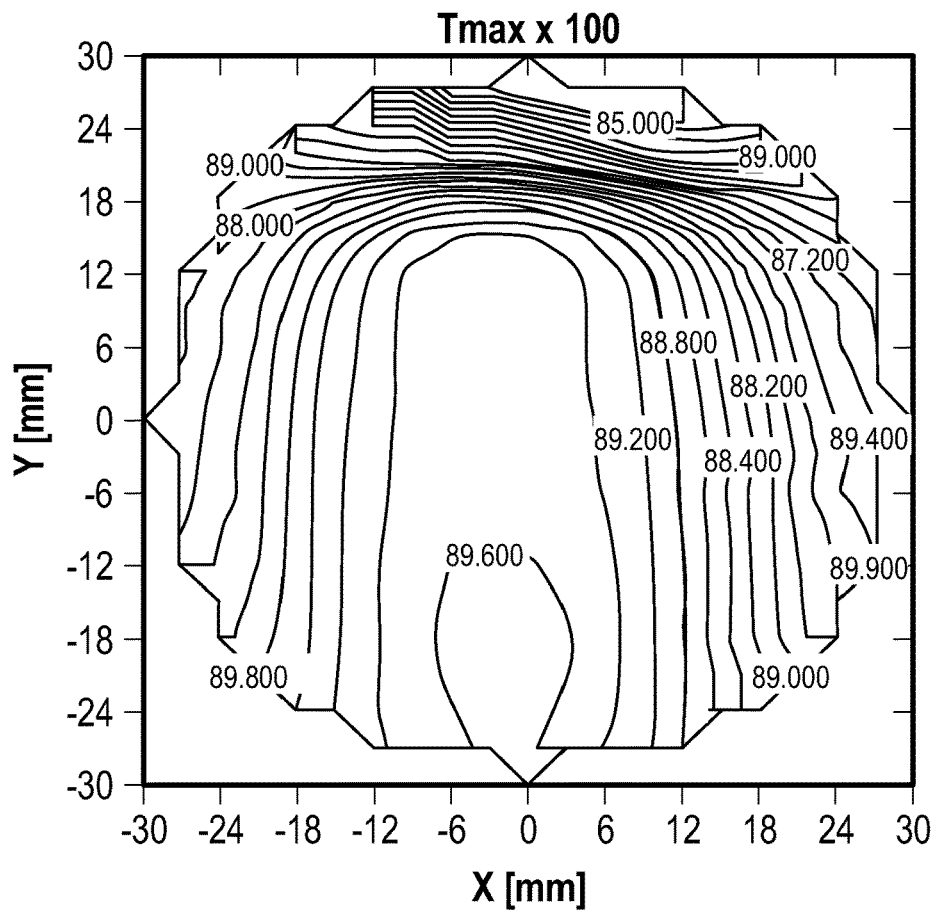
Figure 38D:
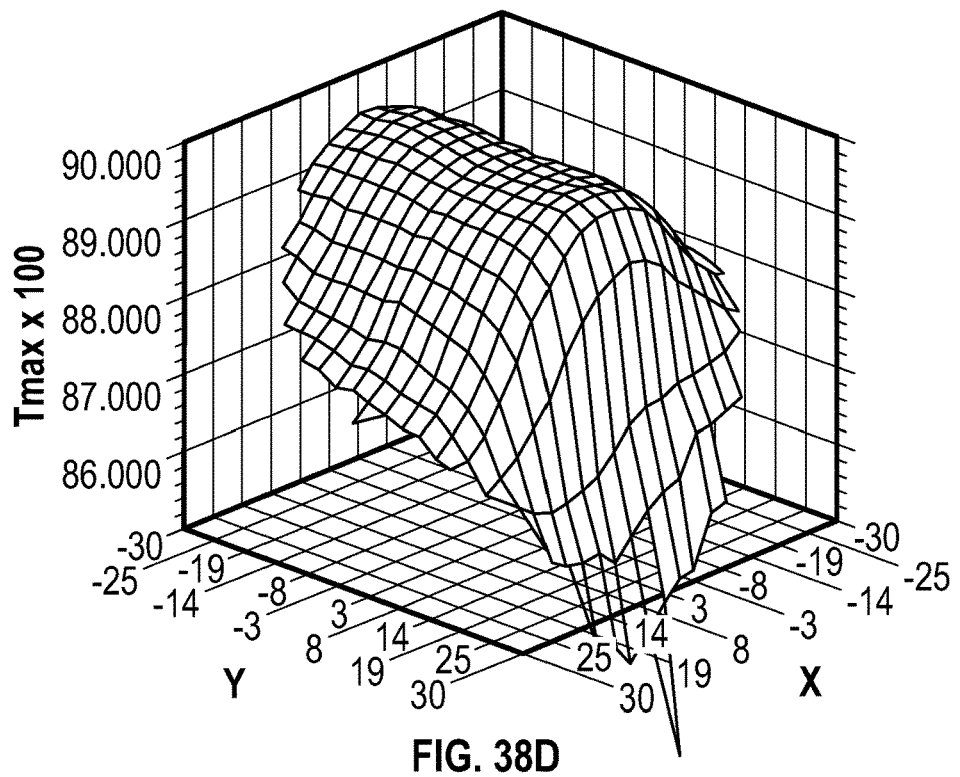

The pass axis transmission (Tmax) for reflective polarizer samples formed in a pulldown process are shown in FIGS. 38A-38D. FIGS. 38A and 38B are a contour plot and a three-dimensional surface plot, respectively, for a first formed sample, and FIGS. 38C and 38D are a contour plot and a three-dimensional surface plot, respectively, for a second formed sample. The plots show Tmax multiplied by 100 so that the numbers represent percents.

Figure 39A:
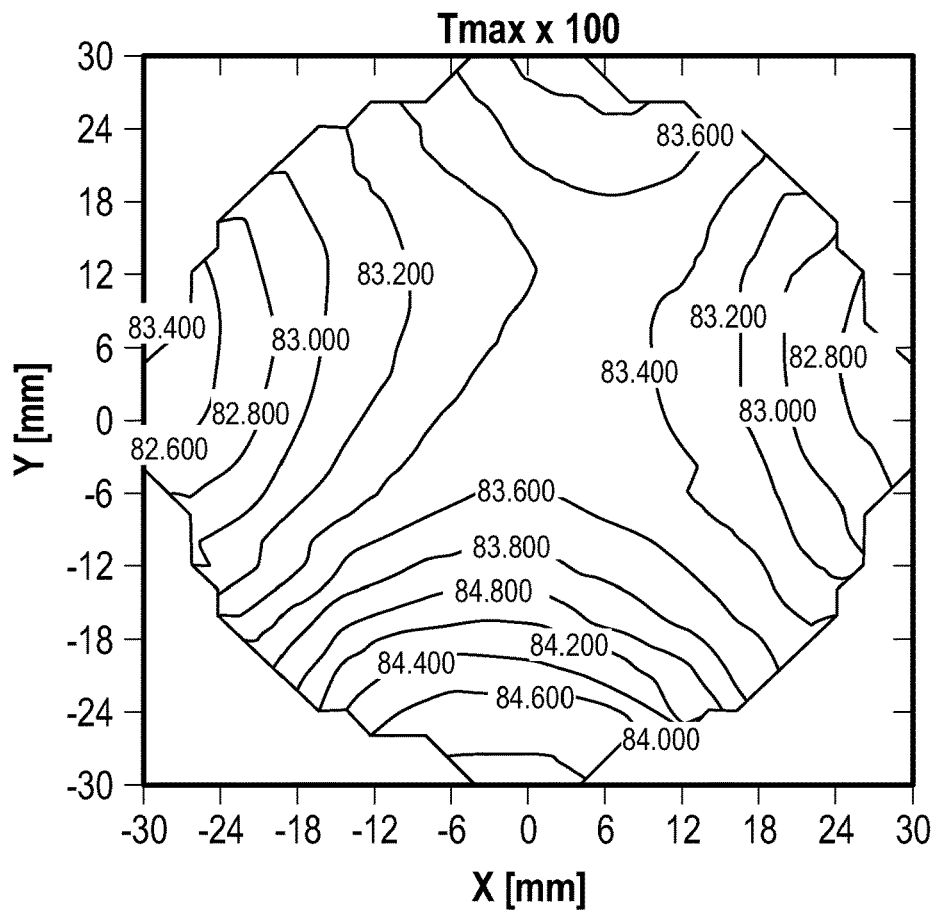
FIGS. 39A-39D are plots of the pass axis transmission of reflective polarizer samples shaped in a pressurization process.
Figure 39B:
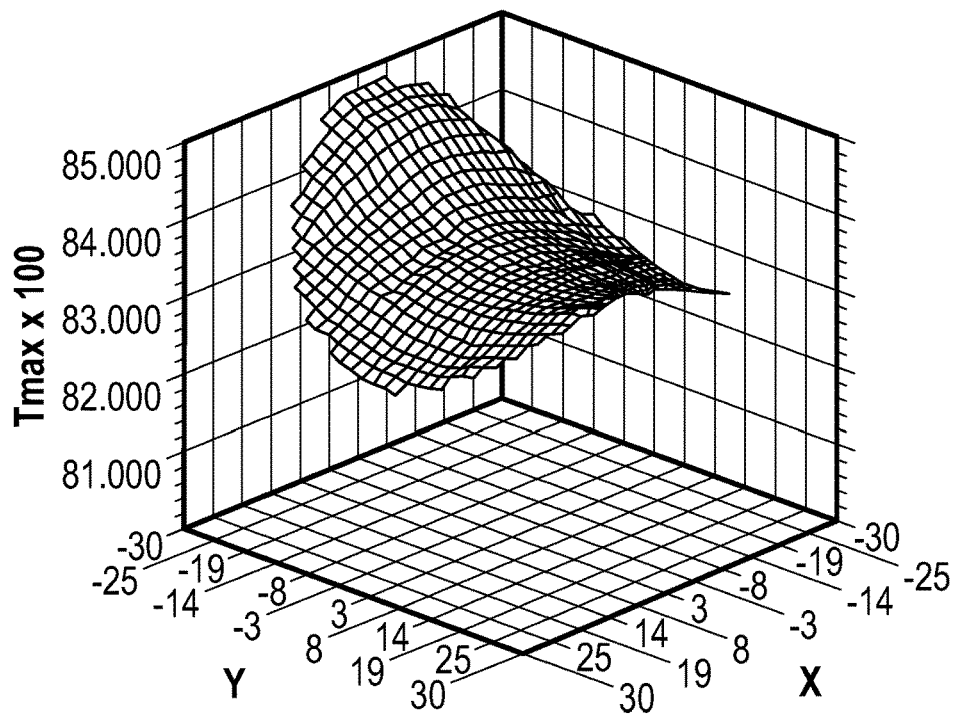
Figure 39C:
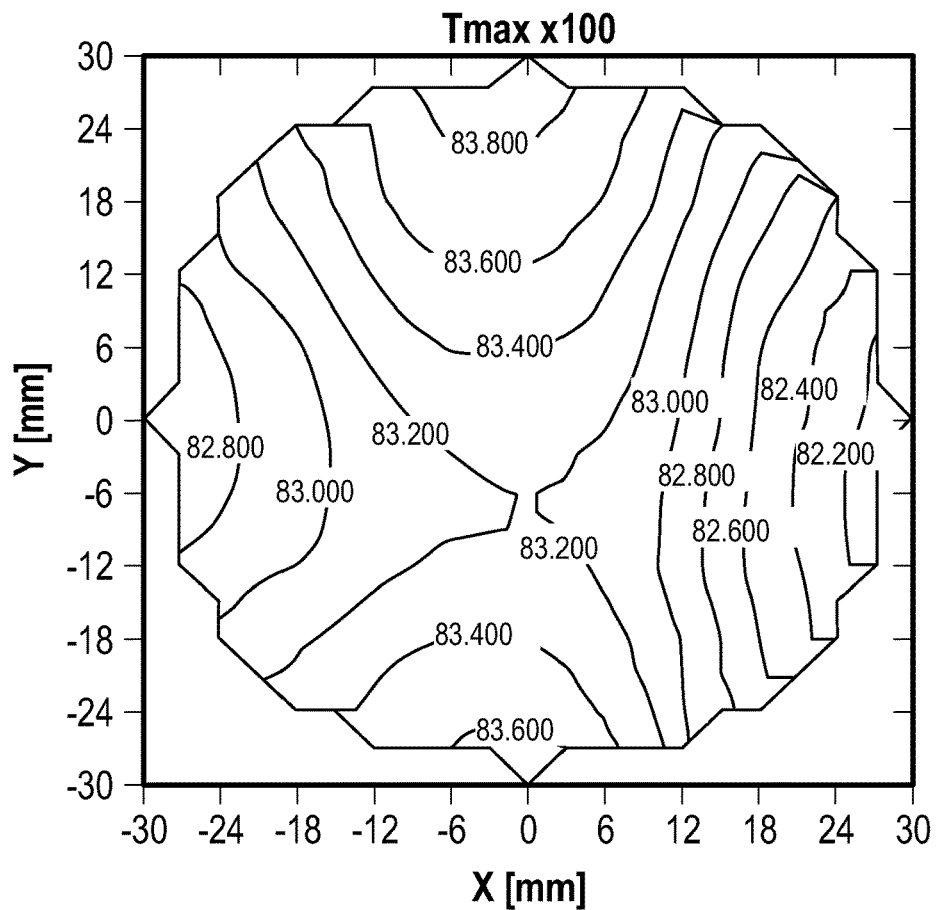
Figure 39D:
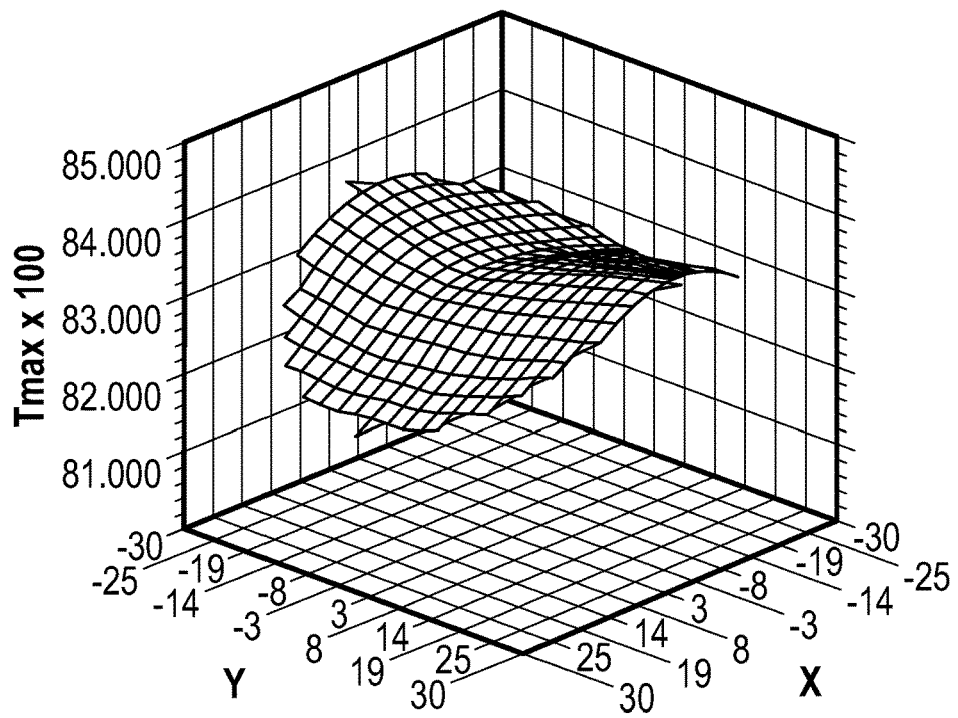

The pass axis transmission (Tmax) for reflective polarizer films formed in a pressurization process are shown in FIGS. 39A-39D. FIGS. 39A and 39B are a contour plot and a three-dimensional surface plot, respectively, for a first formed sample, and FIGS. 39C and 39D are a contour plot and a three-dimensional surface plot, respectively, for a second formed sample. The plots show Tmax multiplied by 100 so that the numbers represent percents.

Figure 40A:
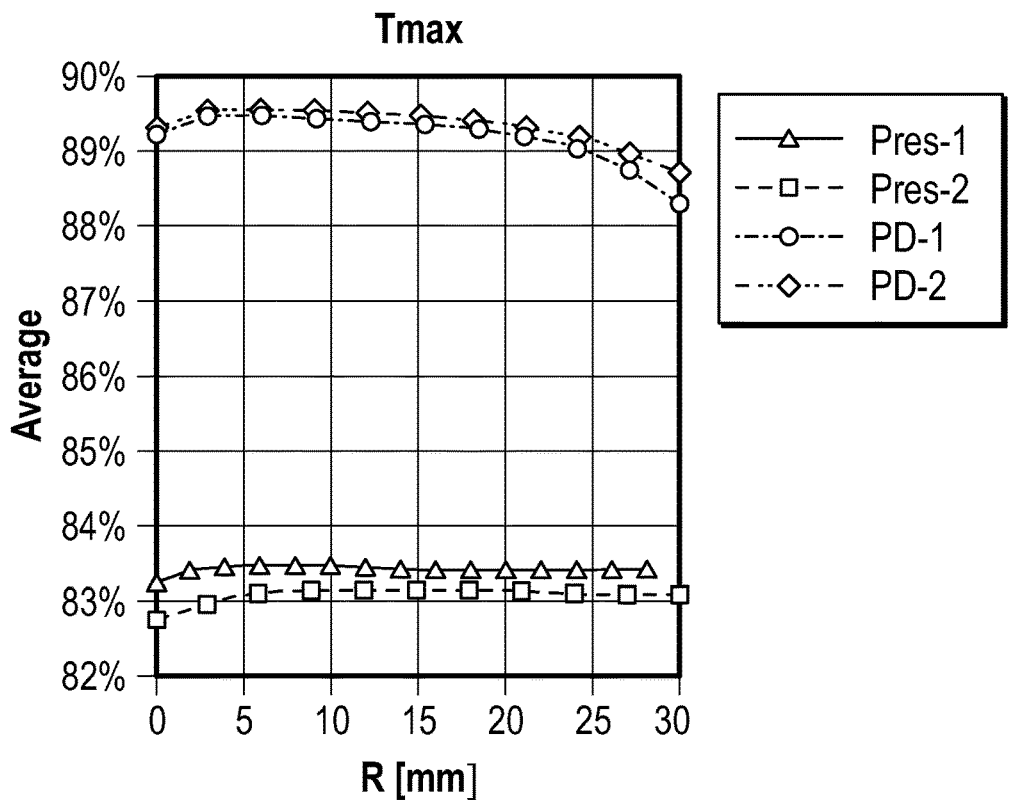
FIG. 40A is a plot of the averages in a region having a radius R of the maximum pass axis transmission of reflective polarizer samples.
Figure 40B:
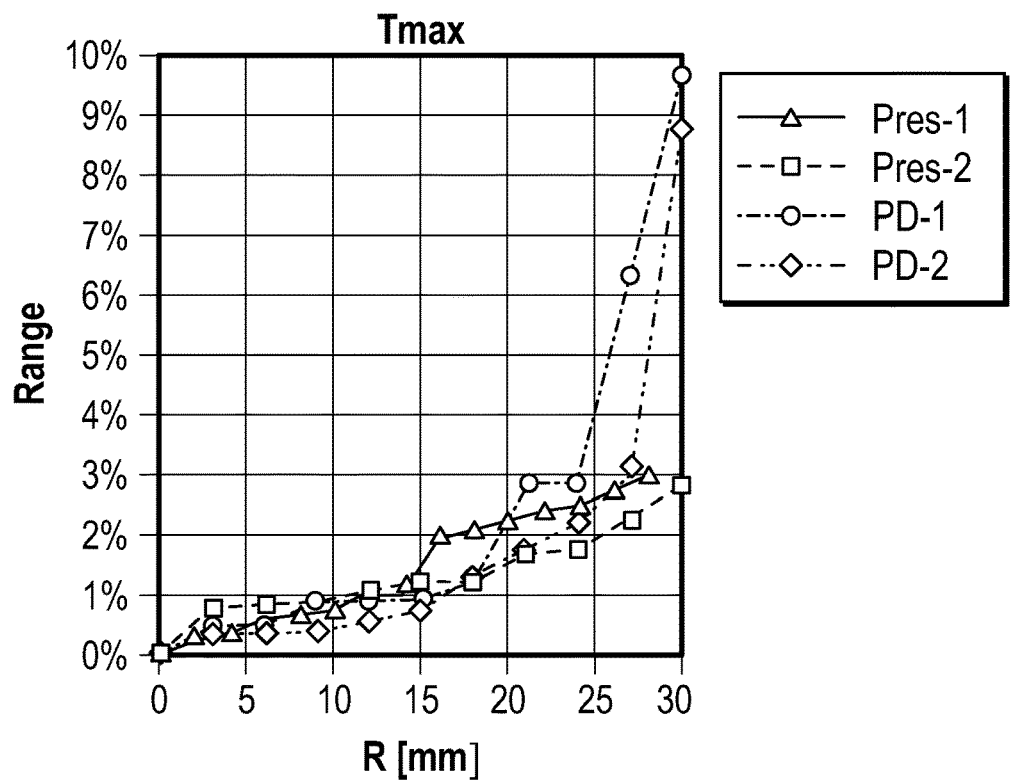
FIG. 40B is a plot of the maximum variation in a region having a radius R of the pass axis transmission of reflective polarizer samples.

FIG. 40A is a plot of the average Tmax (times 100%) in a region of formed reflective polarizer samples as a function of the cylindrical radial coordinate R (see FIG. 1, for example) of the region for samples formed by the pressurization process (Pres) and the pulldown process (PD). FIG.

40B is a plot of the maximum variation of Tmax (maximum Tmax percent minus minimum Tmax percent) in the region as a function of the cylindrical radial coordinate R.

Figure 41A:
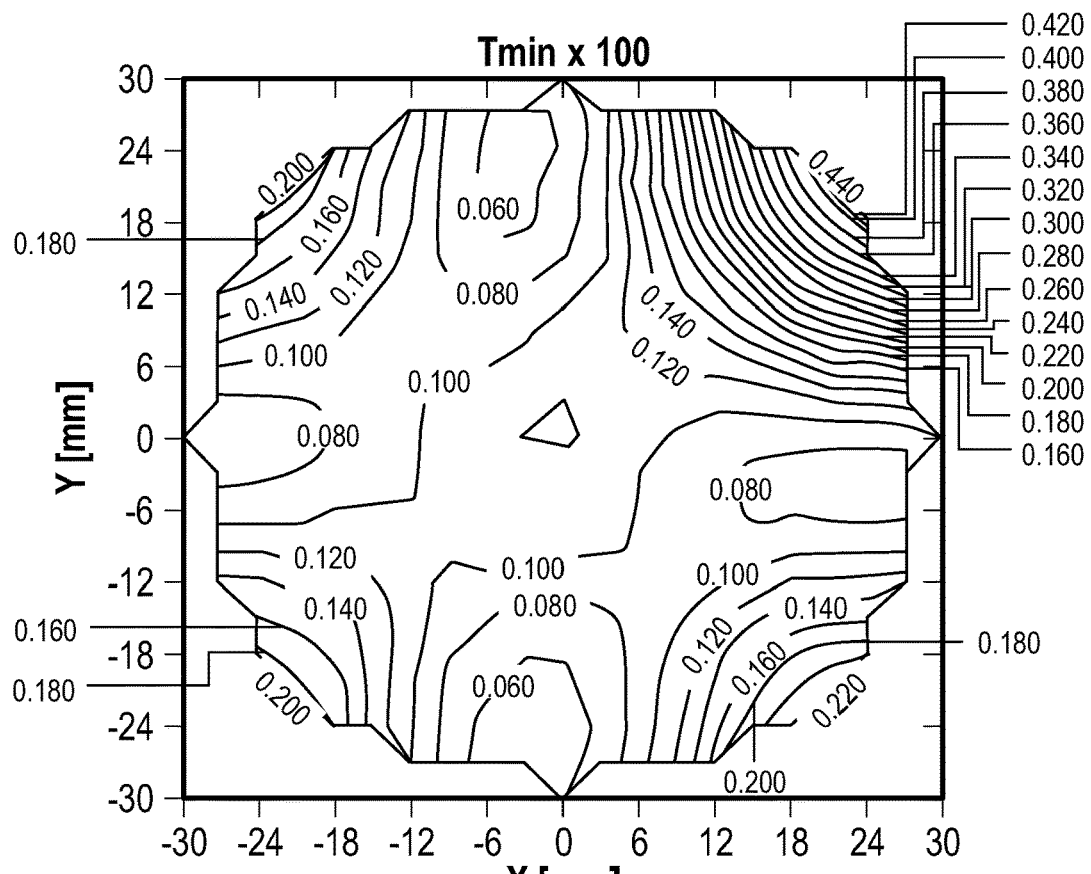
FIGS. 41A-41D are plots of the block axis transmission of reflective polarizer samples shaped in a pulldown process.
Figure 41B:
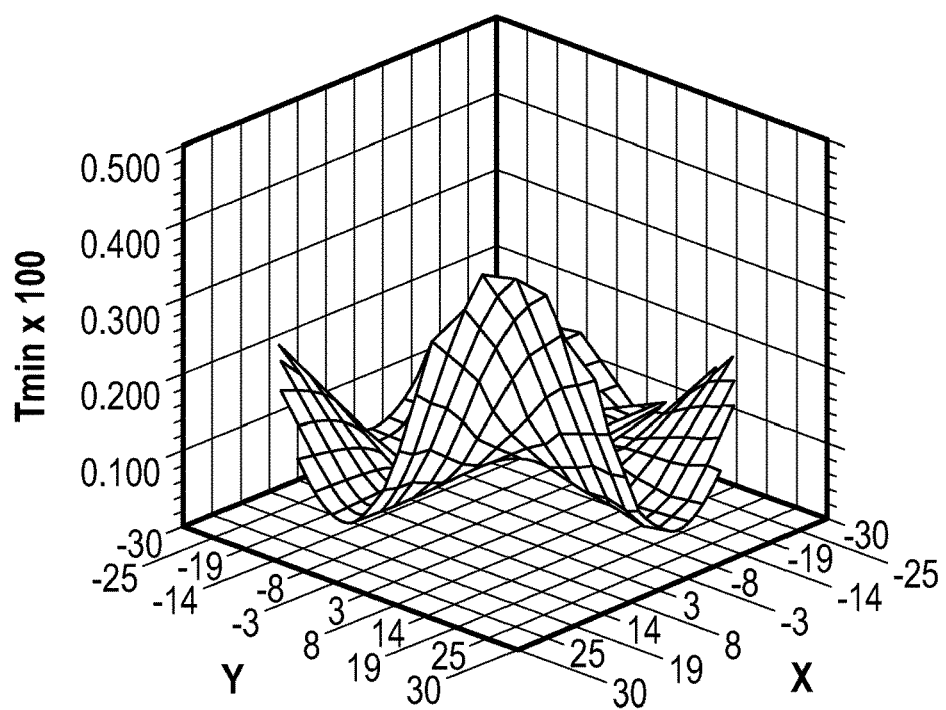
Figure 41C:
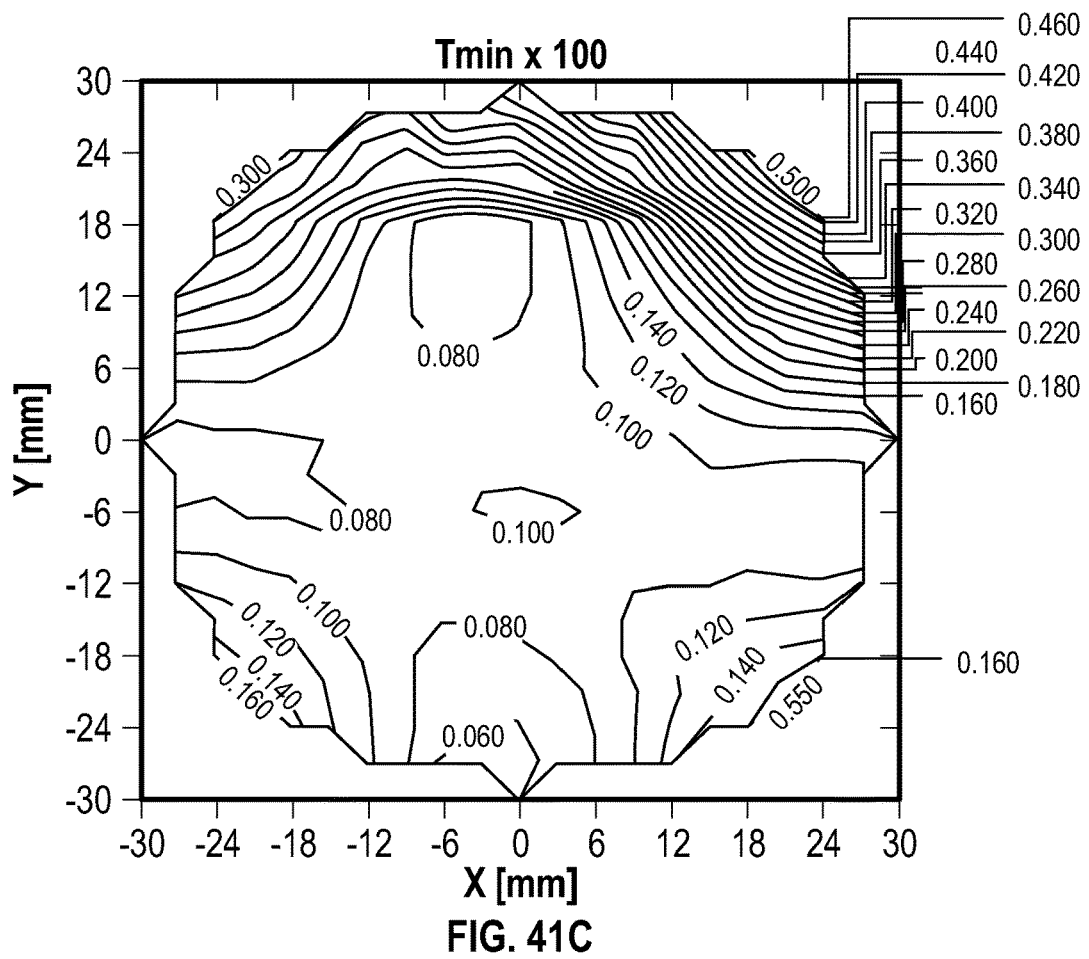
Figure 41D:
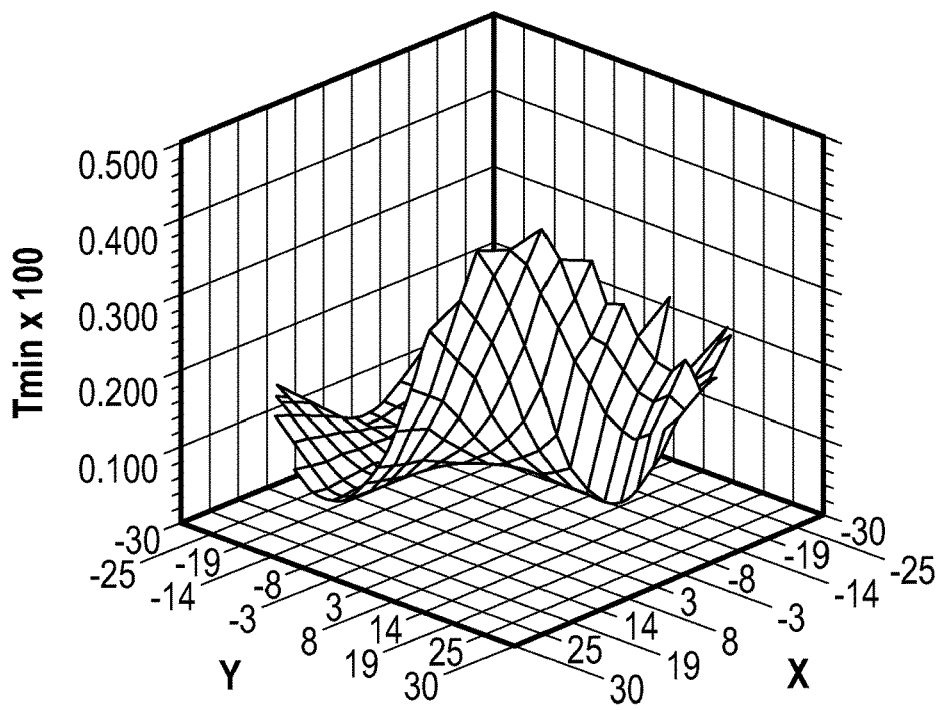

The block axis transmission (Tmin) for reflective polarizer samples formed in a pulldown process are shown in FIGS. 41A-41D. FIGS. 41A and 41B are a contour plot and a three-dimensional surface plot, respectively, for a first formed sample, and FIGS. 41C and 41D are a contour plot and a three-dimensional surface plot, respectively, for a second formed sample. The plots show Tmin multiplied by 100 so that the numbers represent percents. The Tmin measurements from the Axometrics polarimeter were below the reported noise floor of the instrument. However, it is believed that the relative variation in Tmin shown in the plots was primarily a result of the properties of the reflective polarizer samples rather than measurement error.

Figure 42A:
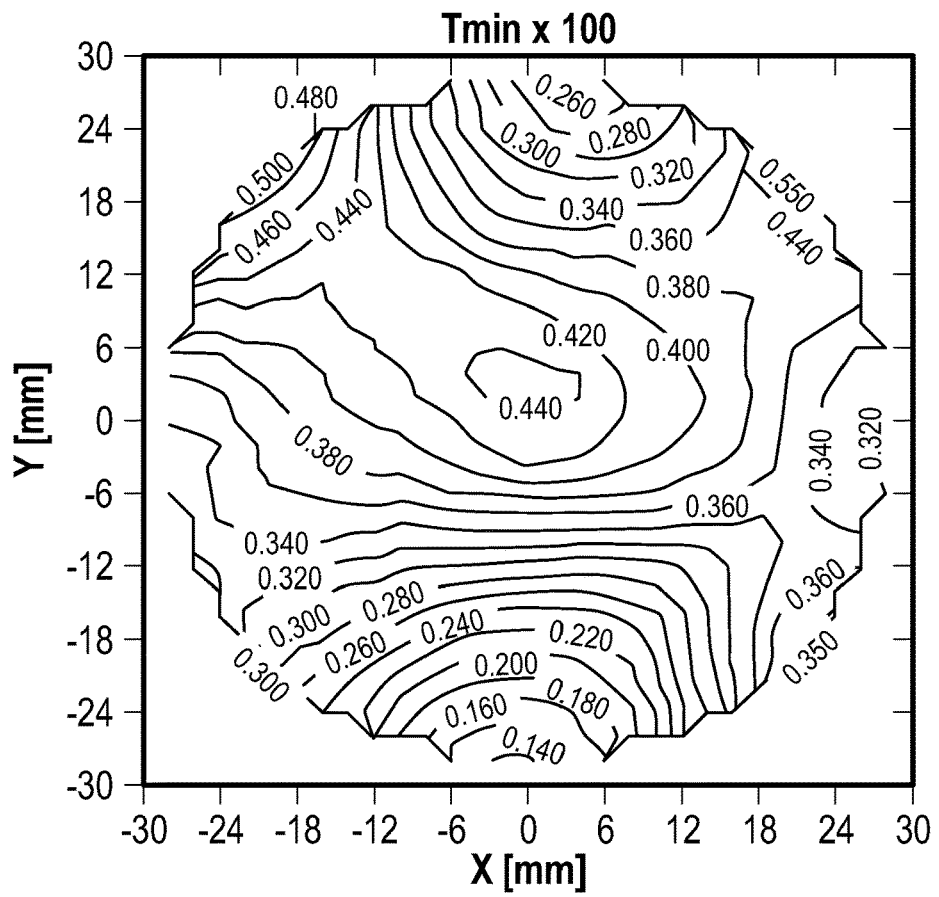
FIGS. 42A-42D are plots of the block axis transmission of reflective polarizer samples shaped in a pressurization process.
Figure 42B:
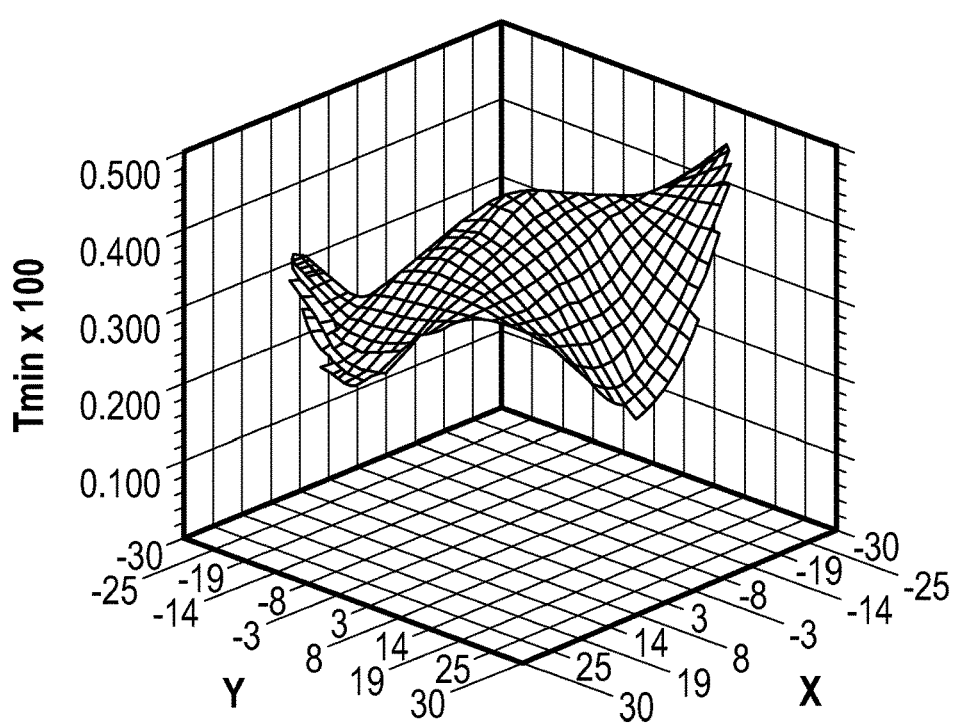
Figure 42C:
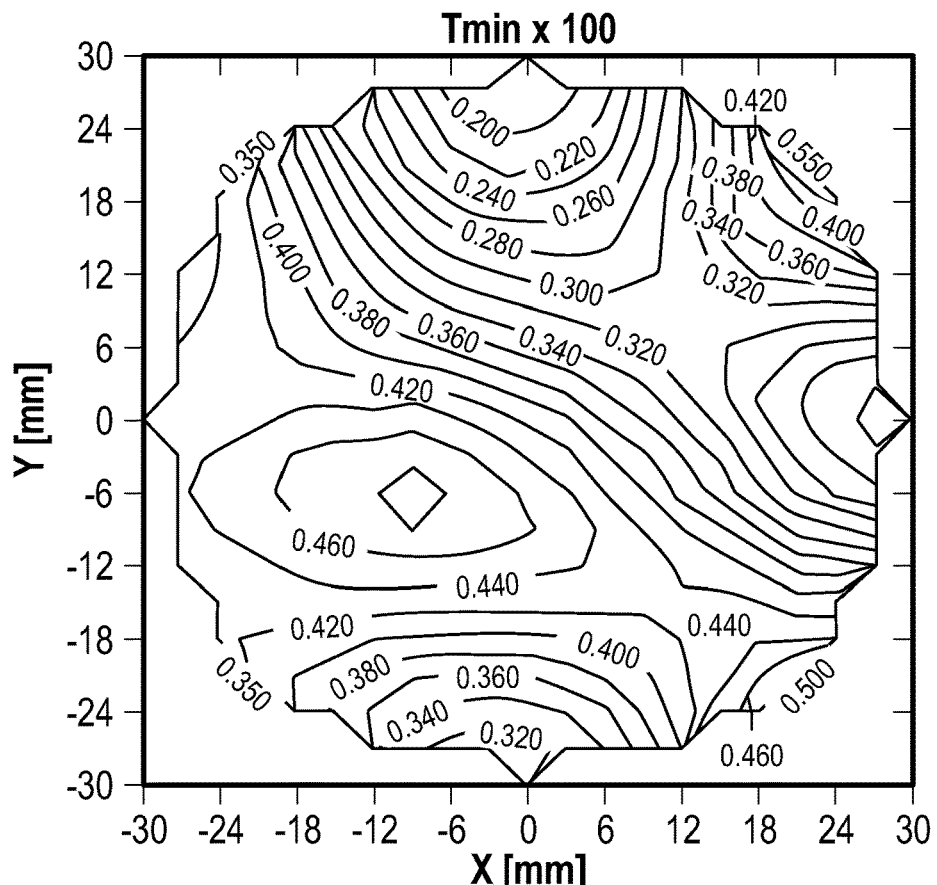
Figure 42D:
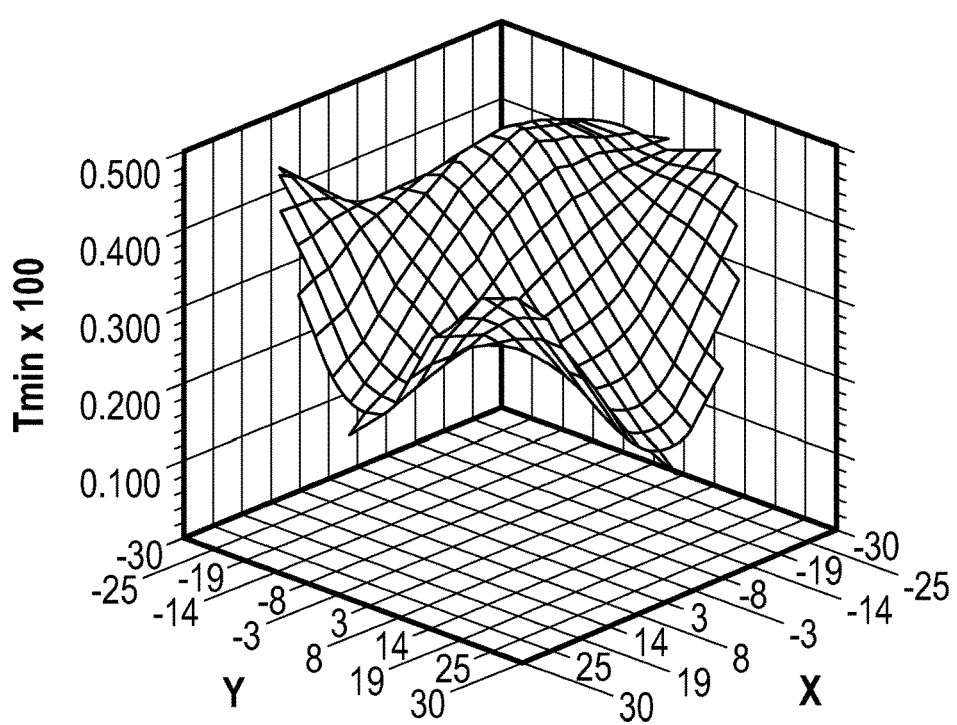

The block axis transmission (Tmin) for a reflective polarizer film formed in a pressurization process is shown in FIGS. 42A-42D. FIGS. 42A and 42B are a contour plot and a three-dimensional surface plot, respectively, for a first formed sample, and FIGS. 42C and 42D are a contour plot and a three-dimensional surface plot, respectively, for a second formed sample. The plots show Tmin multiplied by 100 so that the numbers represent percents.

Figure 43A:
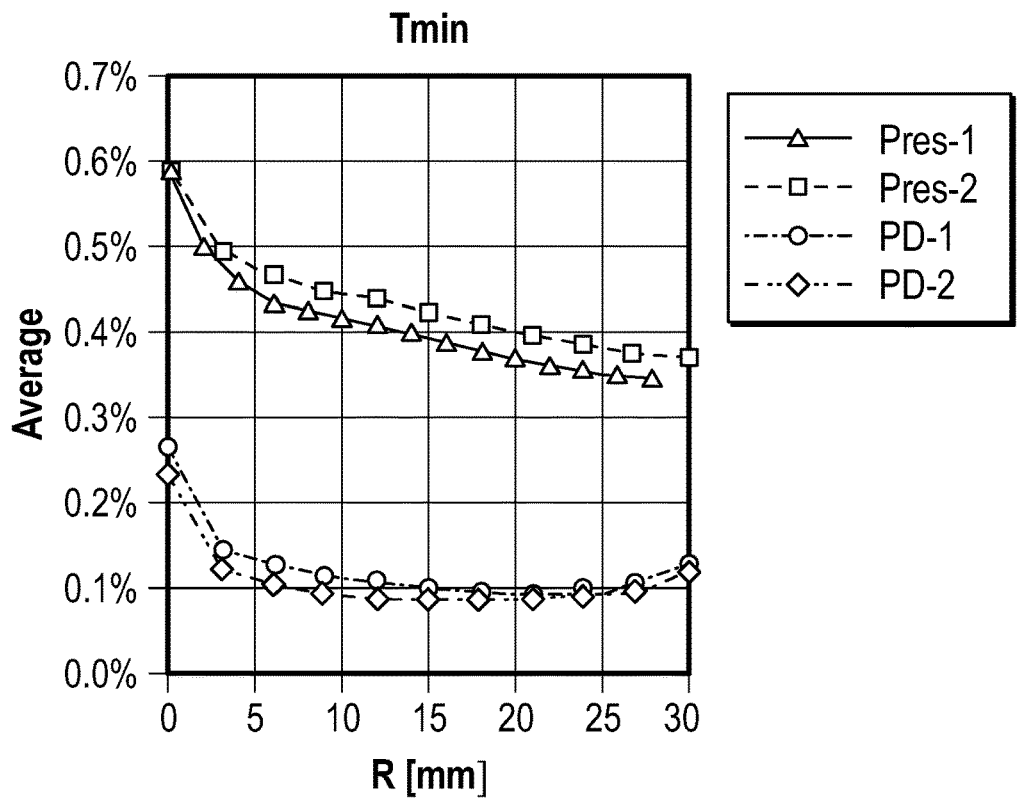
FIG. 43A is a plot of the averages in a region having a radius R of the maximum block axis transmission of reflective polarizer samples.
Figure 43B:
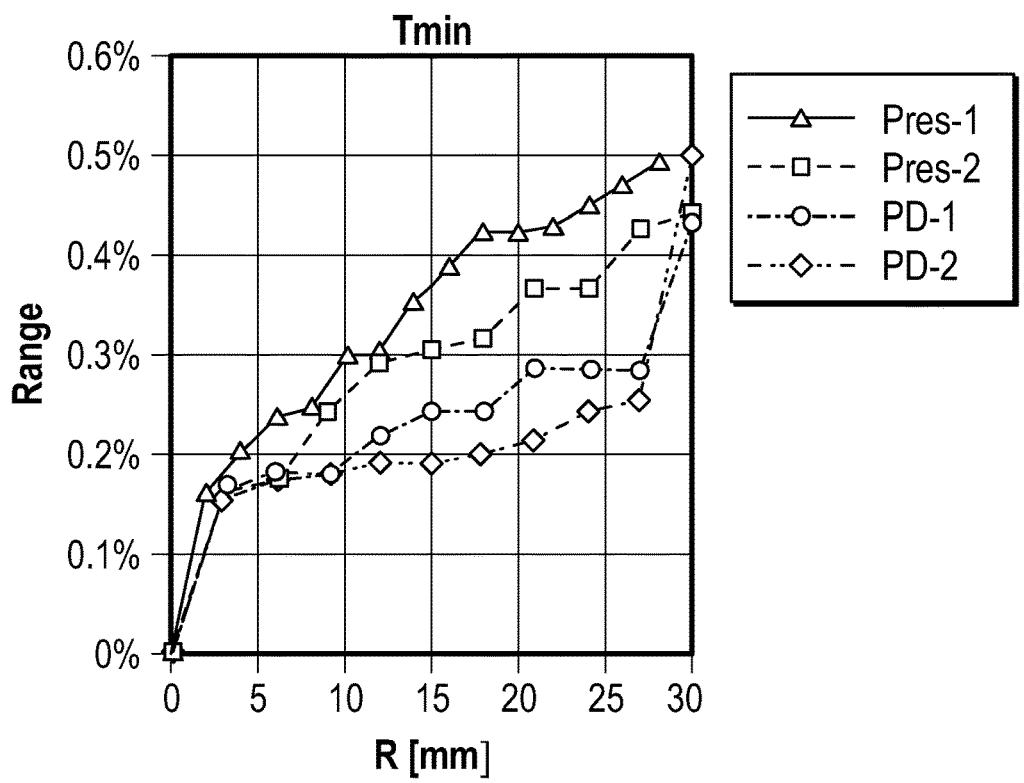
FIG. 43B is a plot of the maximum variation in a region having a radius R of the block axis transmission of reflective polarizer samples.

FIG. 43A is a plot of the average Tmin (times 100%) in a region of formed reflective polarizer samples as a function of the cylindrical radial coordinate R (see FIG. 1, for example) of the region for samples formed by the pressurization process (Pres) and the pulldown process (PD). FIG. 43B is a plot of the maximum variation of Tmin (maximum Tmin percent minus minimum Tmin percent) in the region as a function of the cylindrical radial coordinate R.

Figure 44A:
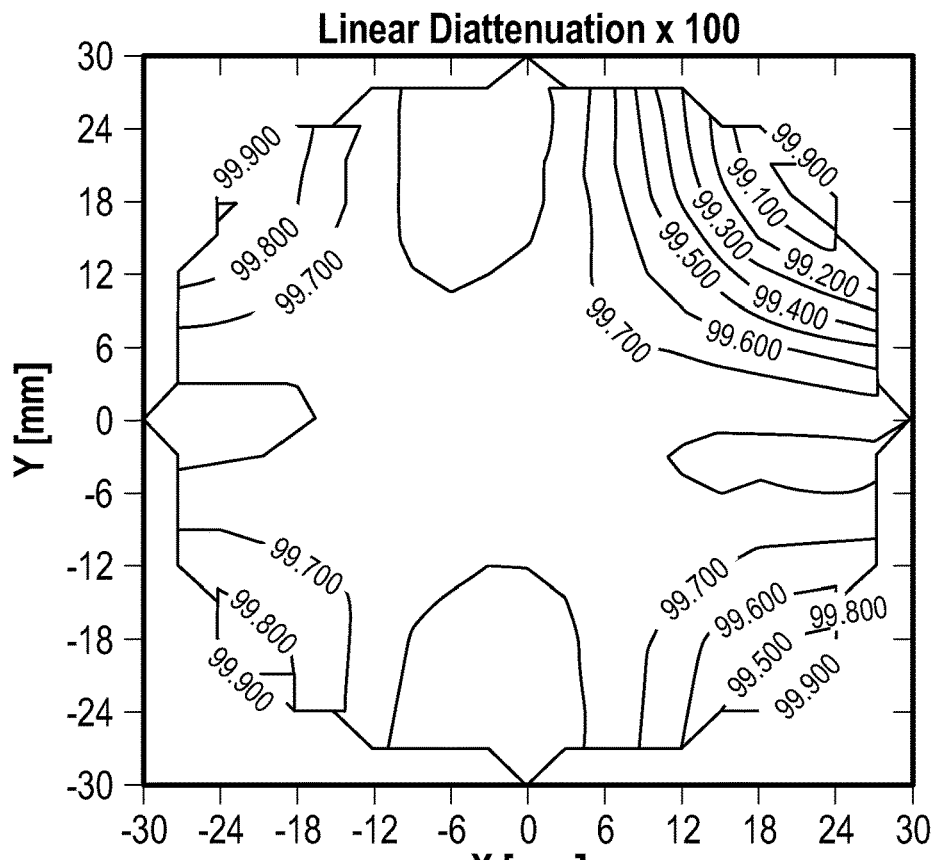
FIGS. 44A-44D are plots of the linear diattenuation of reflective polarizer samples shaped in a pulldown process.
Figure 44B:
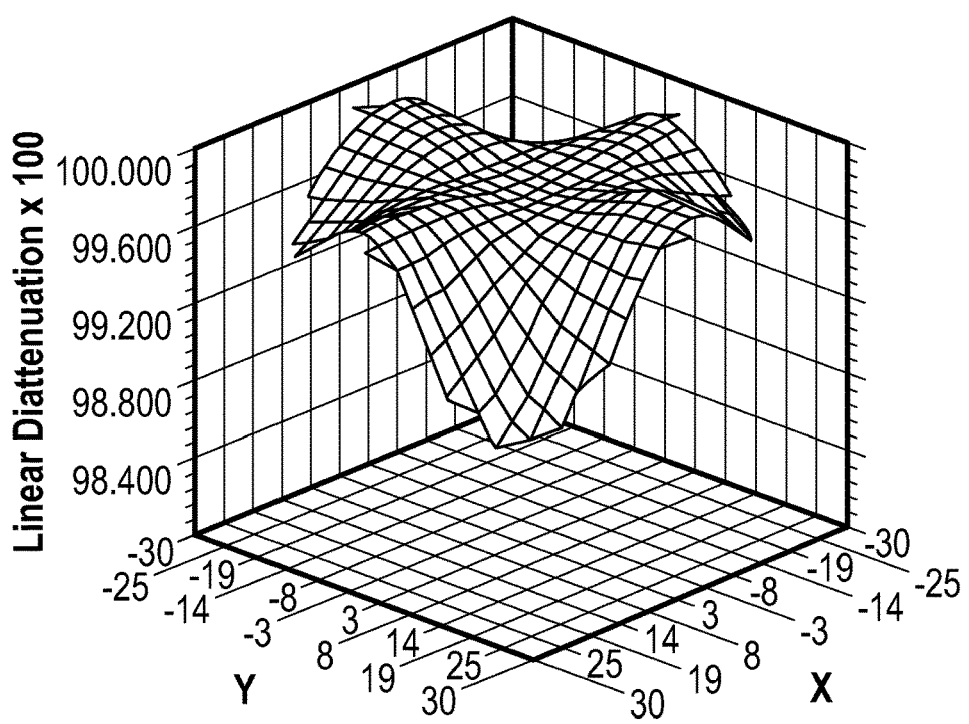
Figure 44C:
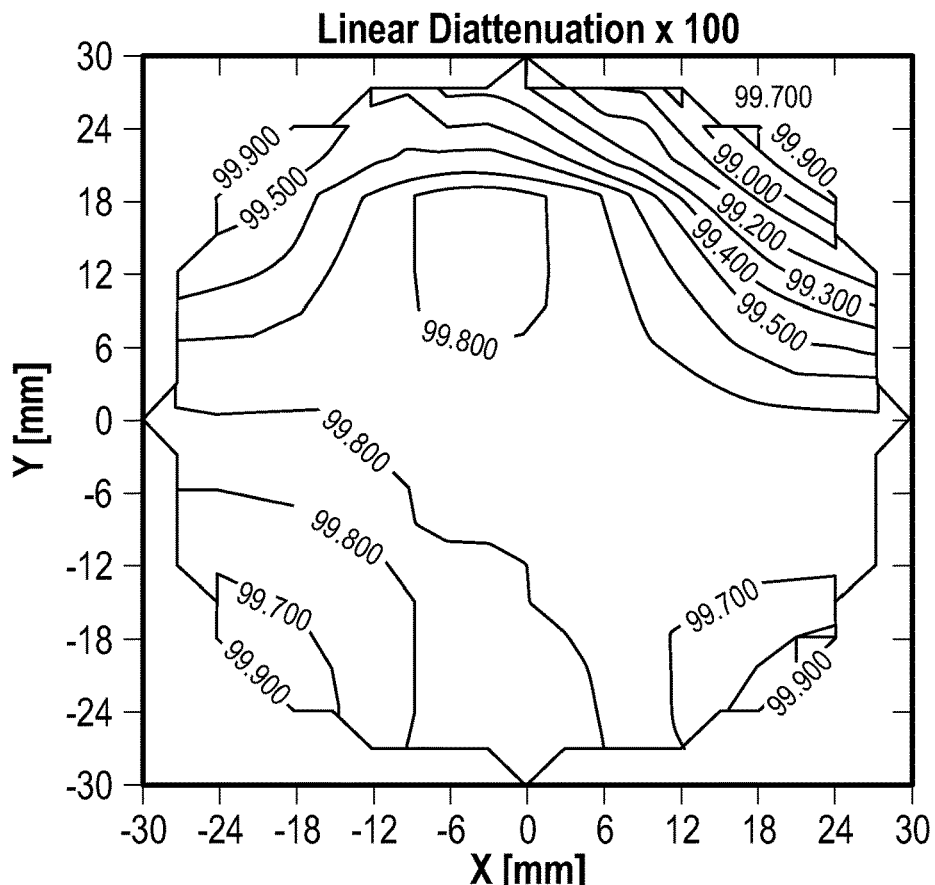
Figure 44D:
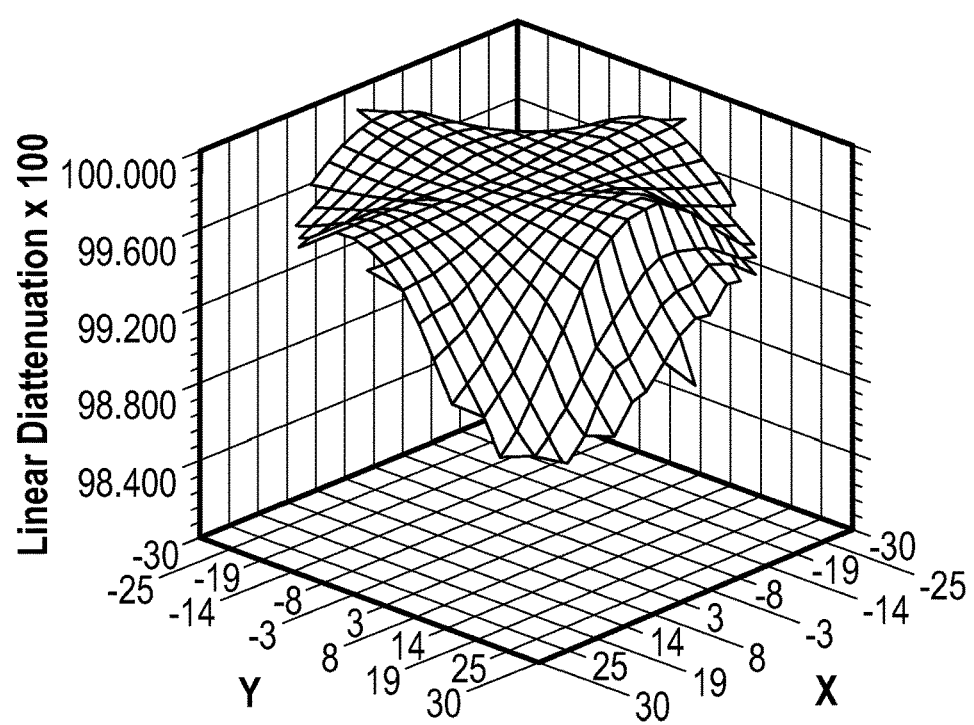

The linear diattenuation for reflective polarizer samples formed in a pulldown process are shown in FIGS. 44A-44D. FIGS. 44A and 44B are a contour plot and a three-dimensional surface plot, respectively, for a first formed sample, and FIGS. 44C and 44D are a contour plot and a three-dimensional surface plot, respectively, for a second formed sample. The plots show the linear diattenuation multiplied by 100.

Figure 45A:
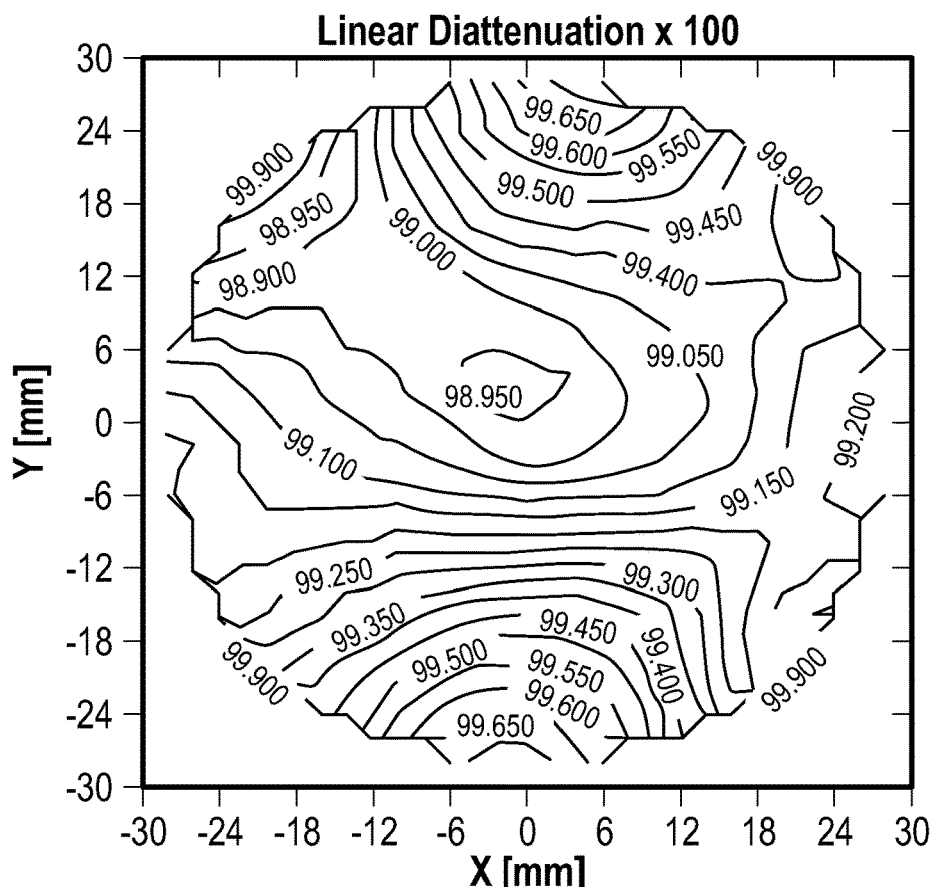
FIGS. 45A-45D are plots of the linear diattenuation of reflective polarizer samples shaped in a pressurization process.
Figure 45B:
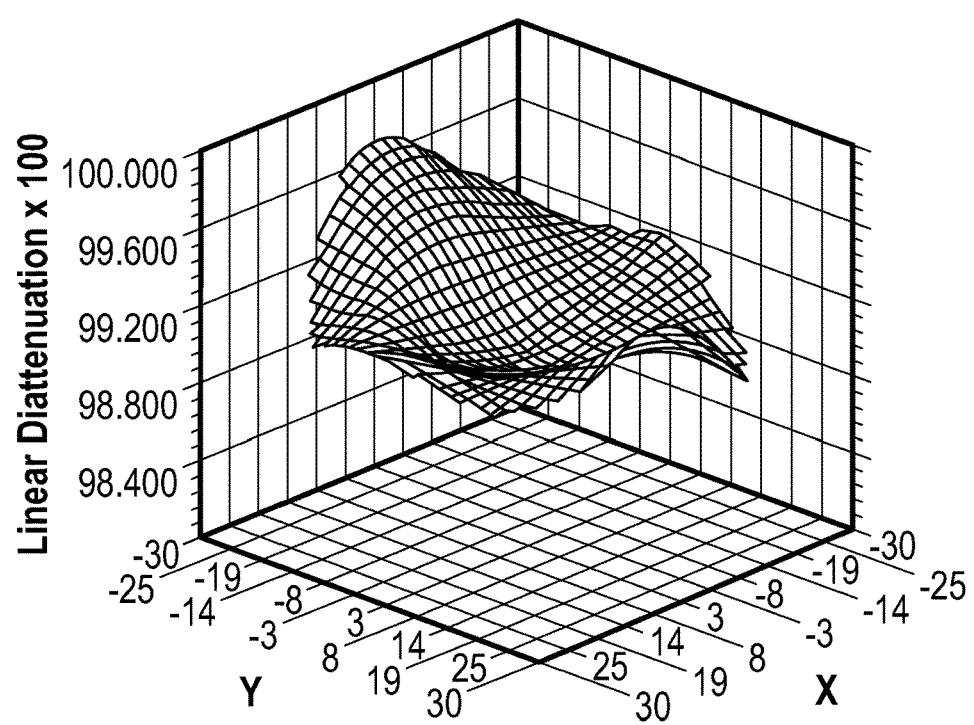
Figure 45C:
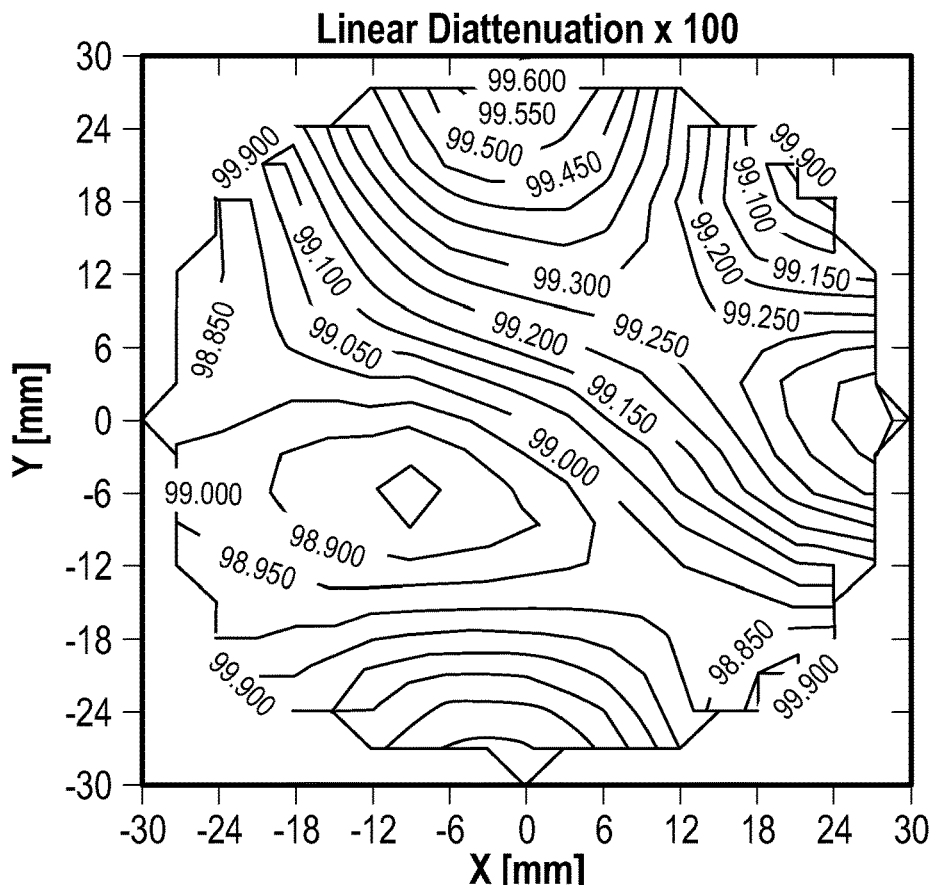
Figure 45D:
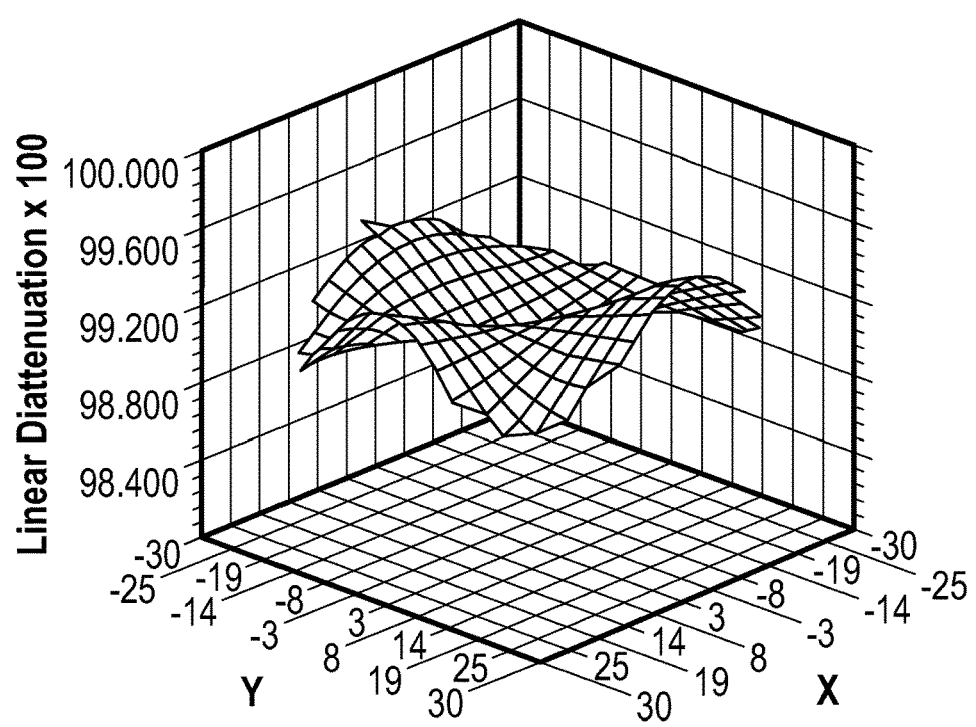

The linear diattenuation for a reflective polarizer film formed in a pressurization process is shown in FIGS. 45A-45D. FIGS. 45A and 45B are a contour plot and a three-dimensional surface plot, respectively, for a first formed sample, and FIGS. 45C and 45D are a contour plot and a three-dimensional surface plot, respectively, for a second formed sample. The plots show the linear diattenuation multiplied by 100.

Figure 46A:
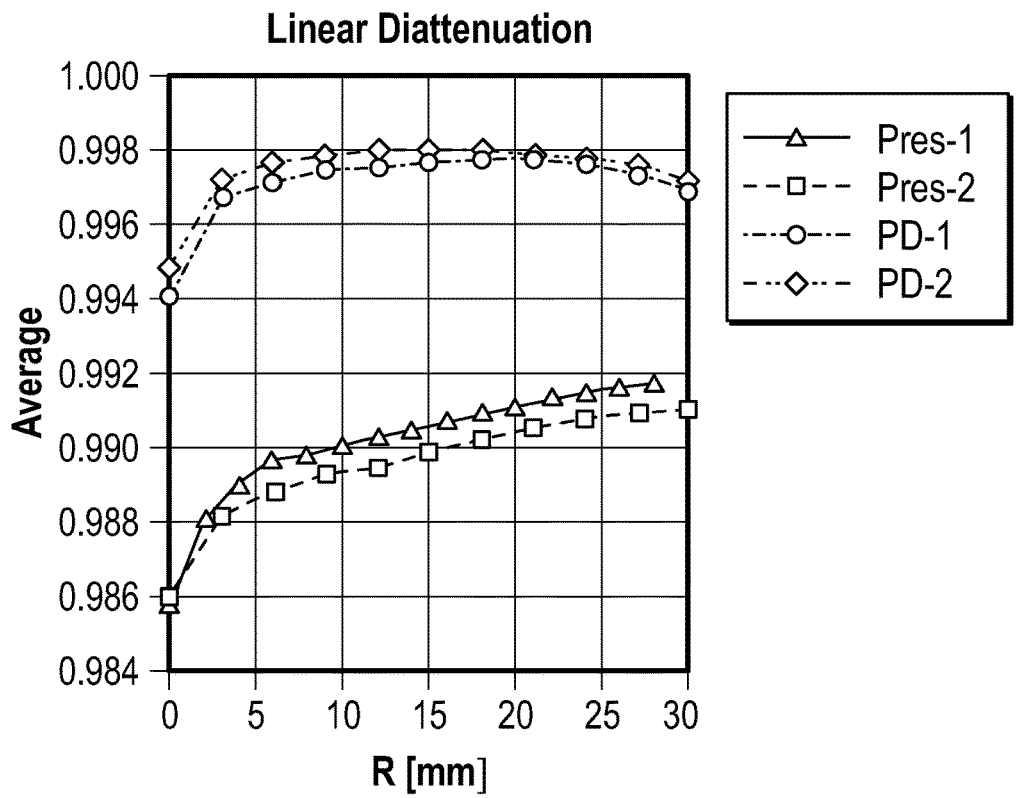
FIG. 46A is a plot of the averages in a region having a radius R of the maximum linear diattenuation of reflective polarizer samples.
Figure 46B:
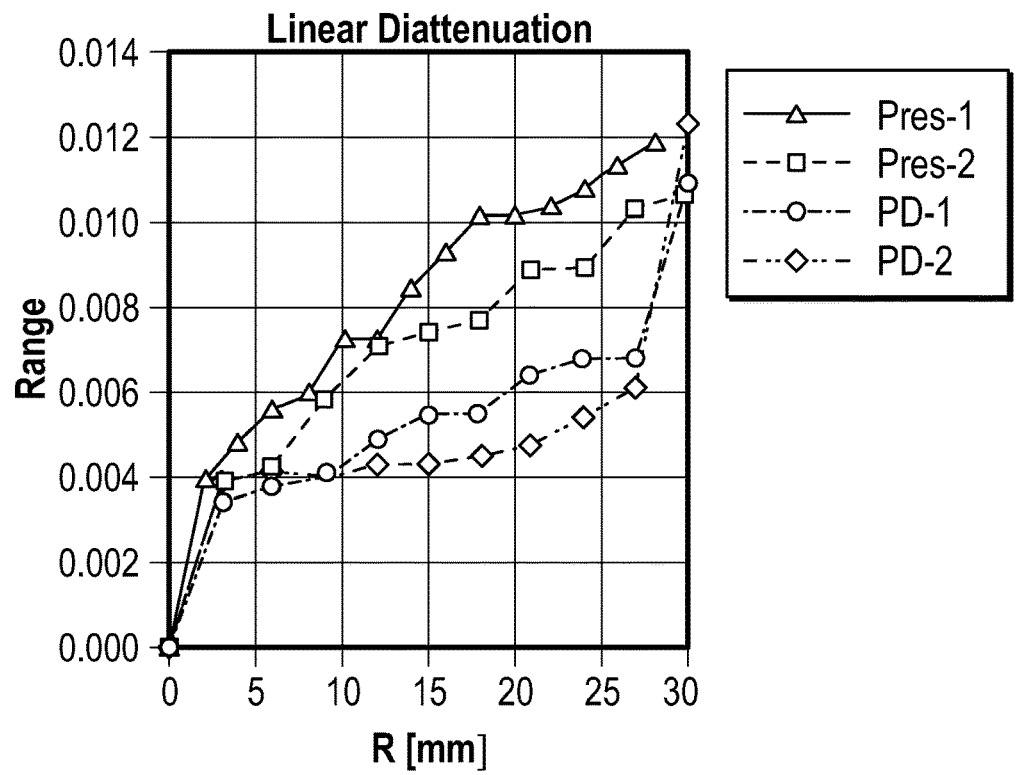
FIG. 46B is a plot of the maximum variation in a region having a radius R of the linear diattenuation of reflective polarizer samples.

FIG. 46A is a plot of the average linear diattenuation in a region of formed reflective polarizer samples as a function of the cylindrical radial coordinate R (see FIG. 1, for example) of the region for samples formed by the pressurization process (Pres) and the pulldown process (PD). FIG. 46B is a plot of the maximum variation (maximum minus minimum) of the linear diattenuation in the region as a function of the cylindrical radial coordinate R.

Figure 47A:
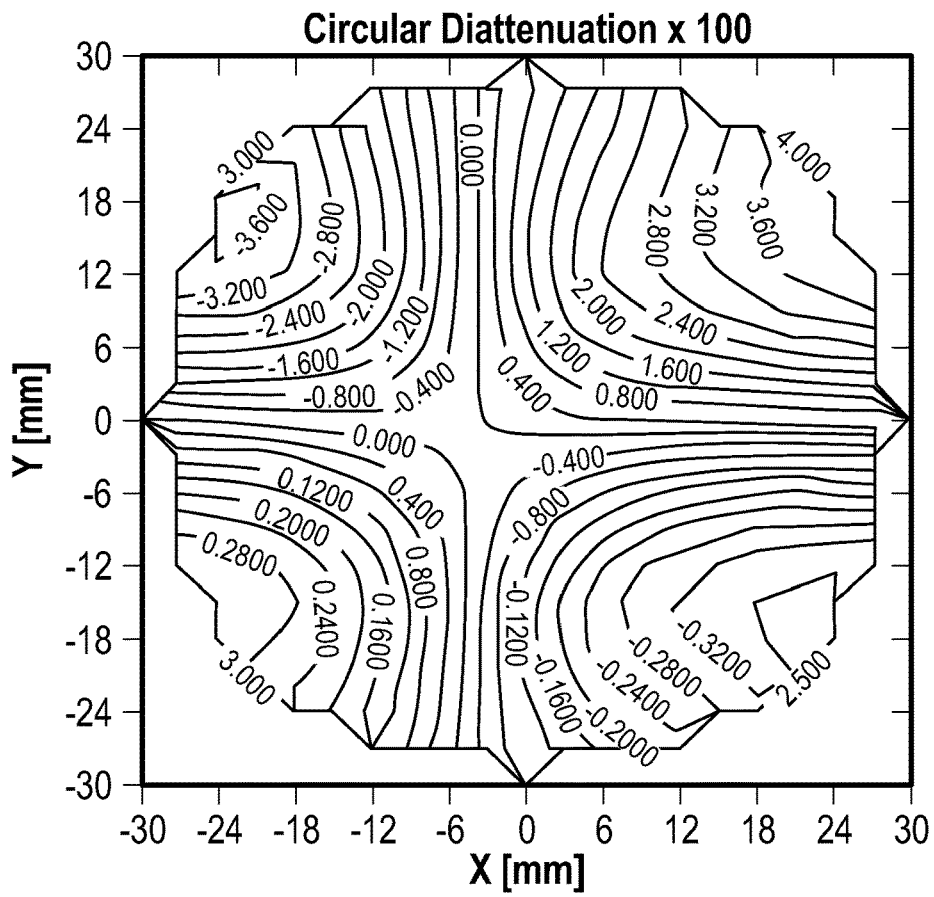
FIGS. 47A-47D are plots of the circular diattenuation of reflective polarizer samples shaped in a pulldown process.
Figure 47B:
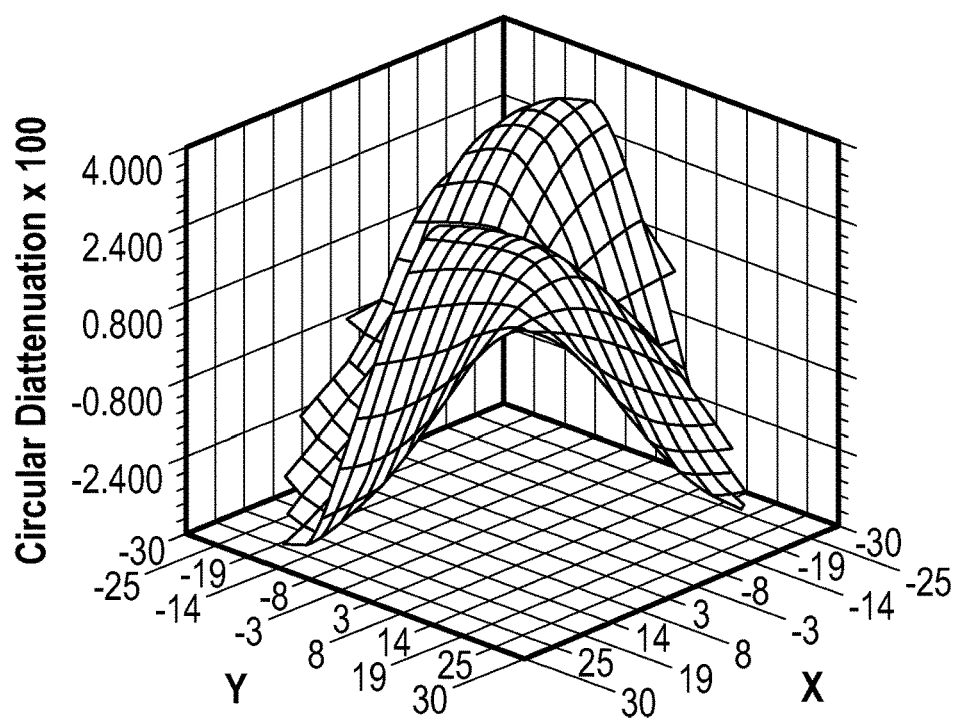
Figure 47C:
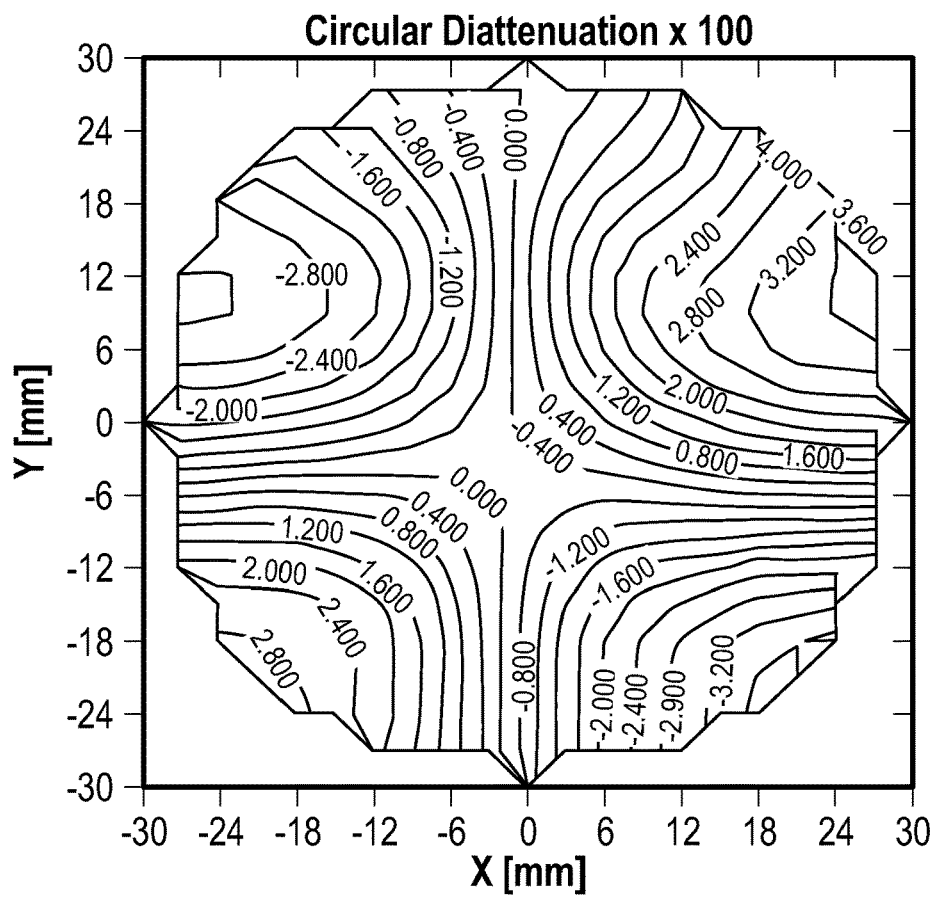
Figure 47D:
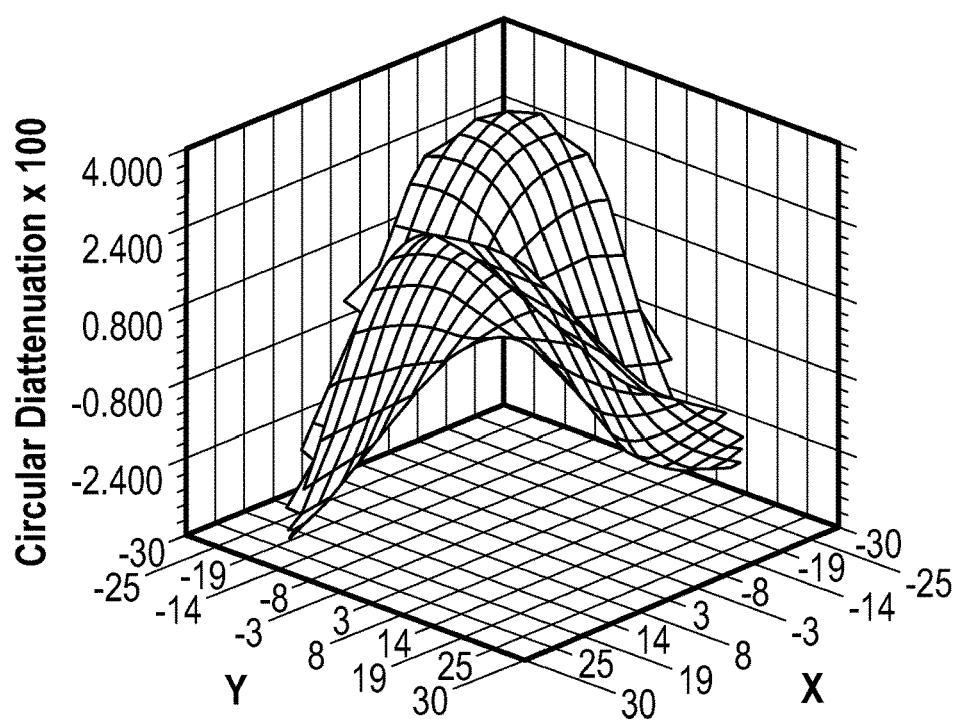

The circular diattenuation for reflective polarizer samples formed in a pulldown process is shown in FIGS. 47A-47D. FIGS. 47A and 47B are a contour plot and a three-dimensional surface plot, respectively, for a first formed sample, and FIGS. 47C and 47D are a contour plot and a three-dimensional surface plot, respectively, for a second formed sample. The plots show the circular diattenuation multiplied by 100.

Figure 48A:
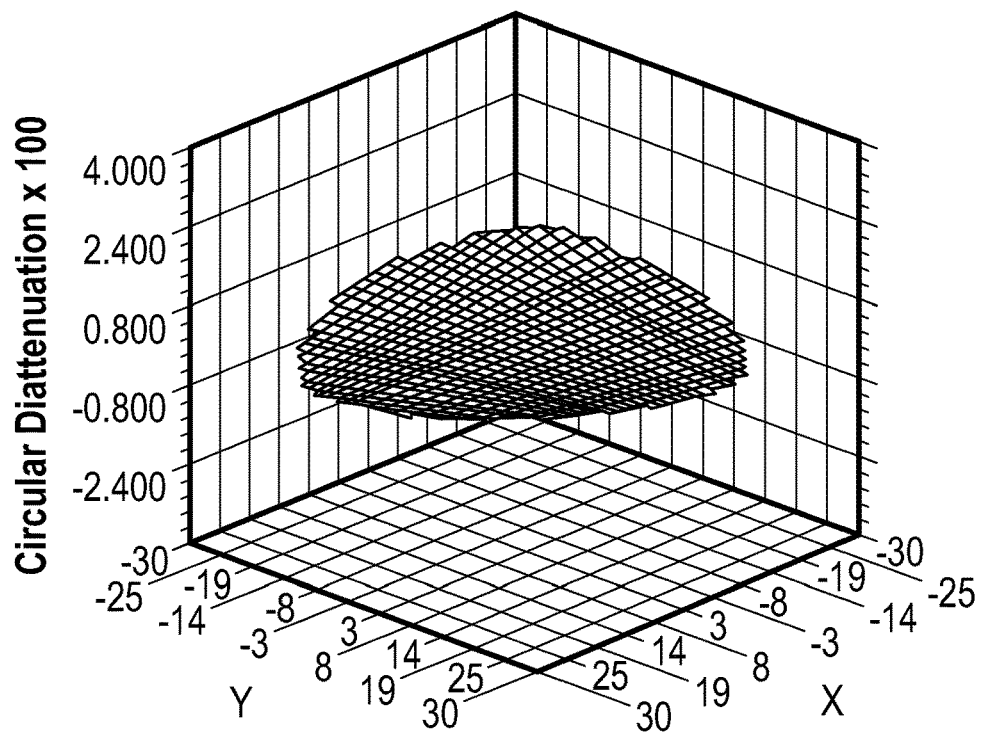
Figure 48B:
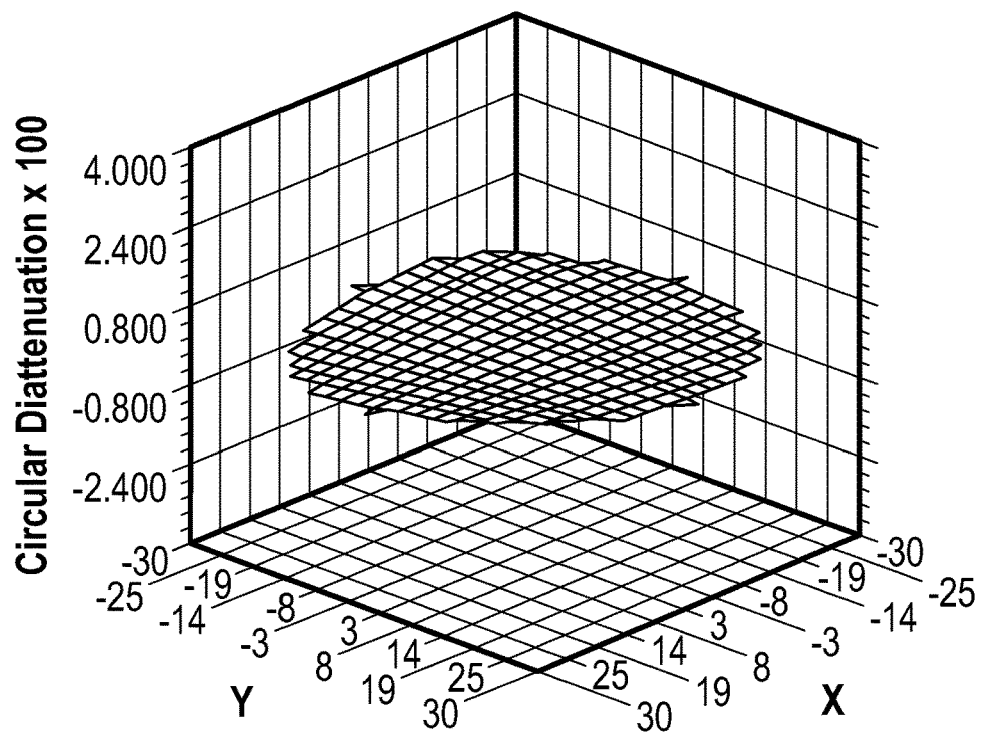

The circular diattenuation for reflective polarizer samples formed in a pulldown process is shown in FIGS. 48A-48B. FIG. 48A is a three-dimensional surface plot for a first formed sample, and FIG. 48B is a three-dimensional surface plot for a second formed sample. The plots show the circular diattenuation multiplied by 100.

Figure 49A:
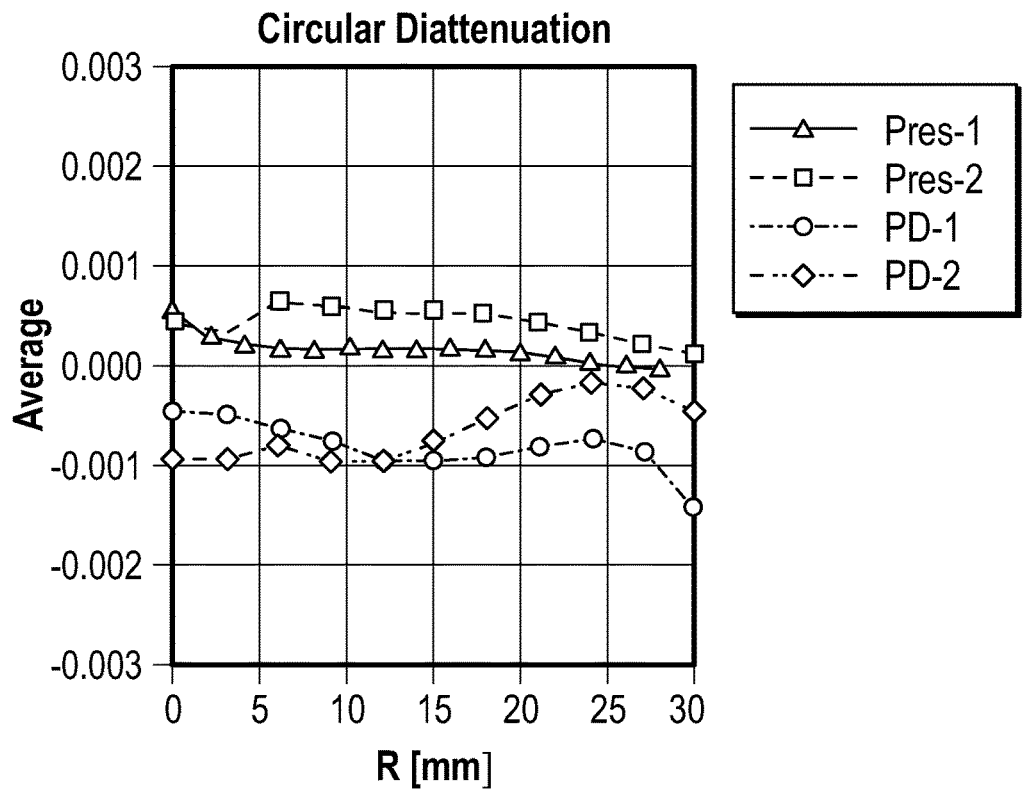
FIG. 49A is a plot of the averages in a region having a radius R of the circular diattenuation of reflective polarizer samples.
Figure 49B:
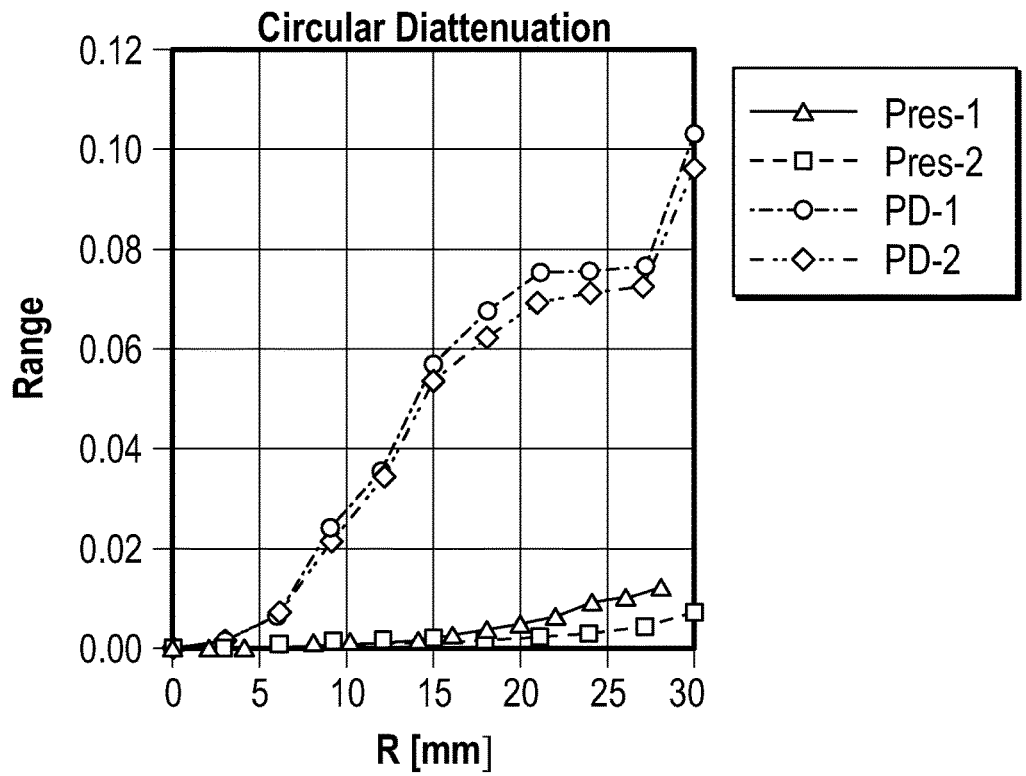

FIG. 49A is a plot of the average circular diattenuation in a region of formed reflective polarizer samples as a function of the cylindrical radial coordinate R (see FIG. 1, for example) of the region for samples formed by the pressurization process (Pres) and the pulldown process (PD). FIG. 49B is a plot of the maximum variation (maximum minus minimum) of the circular diattenuation in the region as a function of the cylindrical radial coordinate R.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A curved reflective polarizer comprising a plurality of alternating polymeric interference layers, each polymeric interference layer reflecting or transmitting light primarily by optical interference, at least one location on the curved reflective polarizer having a radius of curvature in a range from about 6 mm to about 1000 mm, for light having a predetermined wavelength and incident on the reflective polarizer along a direction parallel to an axis normal to and passing through the reflective polarizer at a center location, each location on the reflective polarizer having a maximum reflectance greater than about 70% for a block polarization state, a maximum transmittance greater than about 70% for an orthogonal pass polarization state, and a minimum transmittance for the block polarization state, wherein for a continuous first portion of the reflective polarizer extending between different first and second edges of the reflective polarizer, having a minimum width of at least 3% of a largest lateral dimension of the reflective polarizer, and defining disjoint second and third portions of the reflective polarizer, the minimum transmittance of the reflective polarizer for the block polarization state is higher at each location in at least 70% of the first portion than at each location in at least 70% of the second portion and at each location in at least 70% of the third portion.

2. The curved reflective polarizer of claim 1, wherein the minimum transmittance of the reflective polarizer for the block polarization state is higher at each location in at least 80% of the first portion than at each location in at least 80% of the second portion and at each location in at least 80% of the third portion.

3. The curved reflective polarizer of claim 1, wherein the minimum width of the first portion is at least 5% of the largest lateral dimension of the reflective polarizer.

4. The curved reflective polarizer of claim 1, wherein the minimum width of the first portion is at least 8% of the largest lateral dimension of the reflective polarizer.

5. The curved reflective polarizer of claim 1, wherein the minimum width of the first portion is no more than 80% of the largest lateral dimension of the reflective polarizer.

6. The curved reflective polarizer of claim 1, wherein the minimum width of the first portion is no more than 50% of the largest lateral dimension of the reflective polarizer.

\* \* \* \* \*